United States Patent [19]
Ozaki et al.

[11] Patent Number: 6,044,655
[45] Date of Patent: Apr. 4, 2000

[54] VAPOR COMPRESSION TYPE REFRIGERATING SYSTEM

[75] Inventors: Yukikatsu Ozaki; Yuichi Sakajo; Hisayoshi Sakakibara; Kazuhide Uchida, all of Nishio, Japan

[73] Assignees: Denso Corporation, Kariya; Nippon Soken, Nishio, both of Japan

[21] Appl. No.: 08/916,634

[22] Filed: Aug. 22, 1997

[30] Foreign Application Priority Data

| Aug. 22, 1996 | [JP] | Japan | 8-221461 |
|---|---|---|---|
| Sep. 13, 1996 | [JP] | Japan | 8-243823 |
| Jan. 9, 1997 | [JP] | Japan | 9-001852 |
| Feb. 12, 1997 | [JP] | Japan | 9-028084 |
| Jul. 2, 1997 | [JP] | Japan | 9-177403 |

[51] Int. Cl.$^7$ ........................................... F25B 1/00
[52] U.S. Cl. .................. 62/205; 62/210; 62/225; 62/DIG. 17; 62/502
[58] Field of Search ............... 62/204, 205, 206, 62/210, 211, 212, 222, 223, 224, 225, 502, DIG. 17

[56] References Cited

U.S. PATENT DOCUMENTS

| 4,205,532 | 6/1980 | Brenan | 62/115 |
|---|---|---|---|
| 5,168,715 | 12/1992 | Nakao et al. | 62/206 X |
| 5,182,920 | 2/1993 | Matsuoka et al. | 62/206 |
| 5,245,836 | 9/1993 | Lorentzen et al. | 62/174 |
| 5,694,784 | 12/1997 | Frey et al. | 62/502 X |

FOREIGN PATENT DOCUMENTS

| 61-79947 | 4/1989 | Japan . |
|---|---|---|
| 1-193561 | 8/1989 | Japan . |
| 63-243481 | 10/1989 | Japan . |

*Primary Examiner*—Harry B. Tanner
*Attorney, Agent, or Firm*—Pillsbury Madison & Sutro LLP

[57] ABSTRACT

A refrigerating system, using $CO_2$ as a refrigerant, for an air conditioner for an automobile. A pressure at the outlet of the heat emitter 2 is controlled to a target value in accordance with the temperature of the refrigerant at the outlet of the heat emitter for obtaining an operation of the refrigerating system along the optimum control line $\eta_{max}$. A pressure reducer 4 and a cooler 5 are provided on a branched passageway 28 branched from a refrigerant recirculating passageway 27 for injection. The cooler 5 is for obtaining a heat exchange between a flow of the refrigerant on the branched passageway 28 after being cooled by the pressure reducer and a flow of the refrigerant on the main passageway 27, thereby cooling the refrigerant directed to the evaporator. In a second aspect of the invention, a means is provided for increasing a target value of the pressure at the pressure reducer when a thermal load of the refrigerating system is high. In a third aspect, a series of pressure reducers are arranged on the main recirculating passageway. The second stage pressure reducer is controlled so as to obtain a desired value of degree of super heating at the inlet of the compressor.

13 Claims, 35 Drawing Sheets

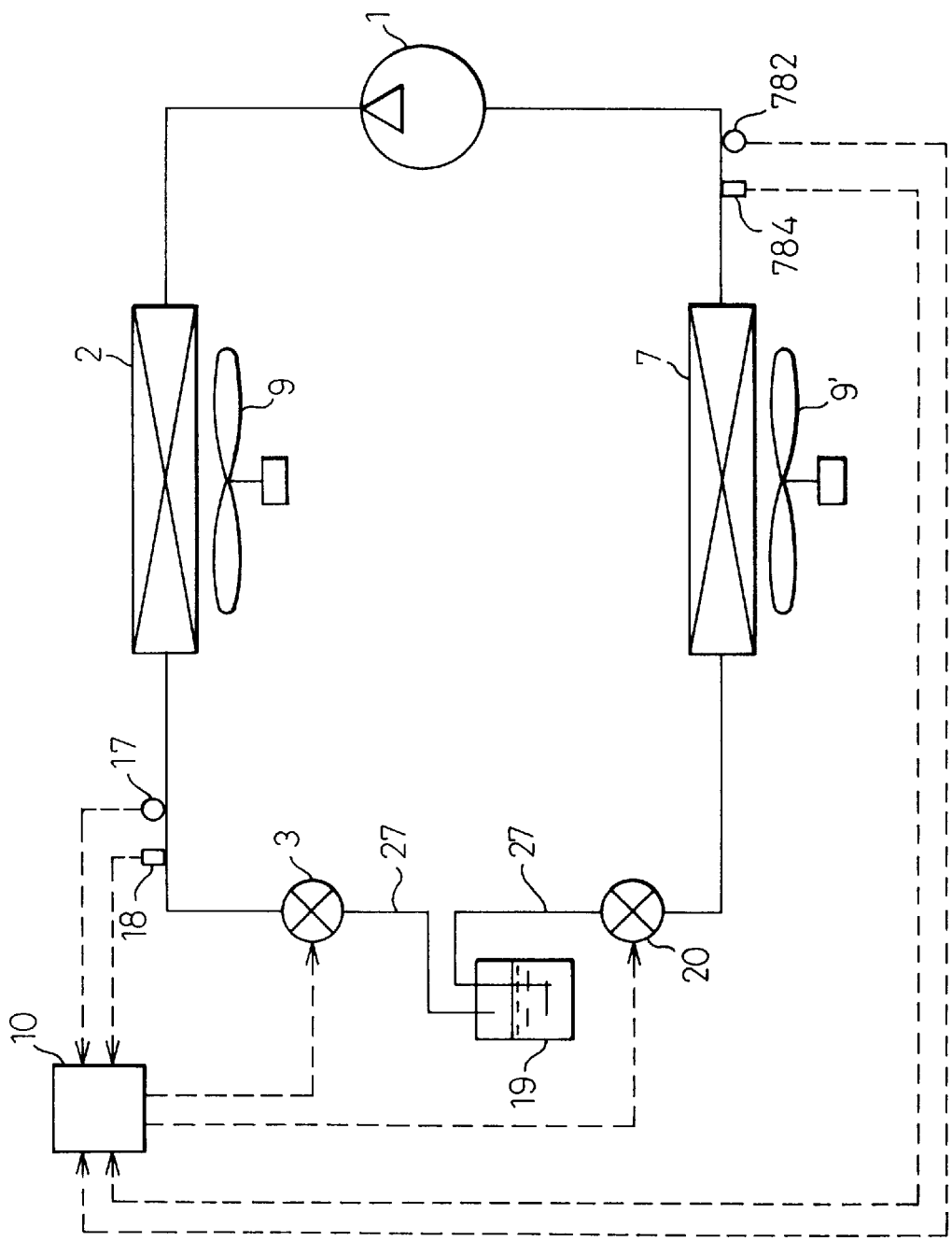

VAPOR COMPRESSION TYPE REFRIGERATING SYSTEM

BACKGROUND OF THE INVENTION

1. Field of the Invention

The present invention relates to a refrigerating system of a vapor compression type and is suitable for a refrigerating system where a cooling medium, such as a carbon dioxide ($CO_2$) is used in a super critical state.

2. Description of Related Art

It has, recently, been strictly required that a refrigerant other than a fluorocarbon (flon) be used in a refrigerating system. Thus, a vapor compression type refrigerating system has been proposed in which carbon dioxide ($CO_2$) is used as a refrigerant in order to execute a refrigerating cycle. See, for example, Japanese Examined Patent Publication (Kokoku) No. 7-18602. This type of a refrigerating system is referred to below as a $CO_2$ refrigerating system.

This $CO_2$ refrigerating system operates, basically, in the same manner that a conventional refrigerating system, using flon as a refrigerant does. However, the $CO_2$ refrigerating system is defective in that a pressure at the outlet of the heat emitter is increased to a value as much as 10 times of that in the conventional refrigerating system using flon when a refrigerating capacity is high due to an increased outside air temperature such as that in a summer season. Such an increase in the pressure at the outlet of the heat emitter means that the strength of parts constructing the compressor must be correspondingly increased over those in the conventional refrigerating system using flon, resulting in an increase in the size of the system.

Furthermore, in the $CO_2$ refrigerating system, the pressure and the temperature of the $CO_2$ at the outlet of the heat emitter are controlled along a so-called optimum control line, which makes the coefficient of performance of the system attain the maximum value. However, the coefficient of performance is calculated as a ratio of the change in an enthalpy at the evaporator to compression work at the compressor. Thus, such control along the optimum control line does not necessarily guarantee a desired refrigerating capacity at a particular condition, such as a cool-down operation.

Furthermore, in the $CO_2$ refrigerating system, the pressure reducer is controlled in such a manner that the pressure at the outlet of the heat emitter is varied in accordance with the temperature of the $CO_2$ at the outlet of the heat emitter. However, such a control may cause the degree of superheating of the refrigerant to be insufficient at the outlet of the evaporator, which may cause a liquid state refrigerant to be sucked by the compressor, thereby damaging the compressor. On the other hand, in a case where the degree of the opening of the pressure reducer is controlled such that a desired degree of the superheat at the outlet of the evaporator is obtained, a relationship between the pressure at the outlet of the heat emitter and the temperature at the outlet of the heat emitter deviates from the optimum control line, thereby reducing an efficiency of a refrigerating cycle using $CO_2$.

SUMMARY OF THE INVENTION

A first object of the present invention is to provide a vapor compression type refrigerating system where is pressure of the refrigerant at the heat emitter larger than critical pressure, capable of preventing the size of the system from being increased while keeping a desired refrigerating capacity.

A second object of the present invention is to provide a vapor compression type refrigerating system capable of obtaining a desired refrigerating capacity even in a condition such as a cool-down where a thermal load is high.

A third object of the present invention is to provide a vapor compression type refrigerating system, capable of maintaining an increased efficiency during the execution of the refrigerating system while preventing the compressor from being damaged.

In the first aspect of the present invention, the refrigerant issuing from the heat emitter is divided into a first flow to a first pressure reducer and to an evaporator and a second flow to a second pressure reducer for gas injection to the compressor, and a heat exchange is generated between the first and second flows of the refrigerant. As a result, the first flow to the first pressure reducer and the evaporator is cooled by the second flow for injection.

The above method allows the specific enthalpy of the refrigerant at the inlet of the first pressure reducer to be reduced without increasing the pressure of the refrigerant at the outlet of the heat emitter. Thus, a difference in the specific enthalpy between the inlet and outlet of the evaporator is increased. Thus, a minimum operating pressure during the execution of the refrigerating cycle is decreased while keeping a desired refrigerating capacity, thereby preventing the size of the system from being increased. In other words, a small size of parts for constructing the compression system is obtained.

Furthermore, the second flow of the refrigerant is introduced or injected into the compressor. When the first flow the refrigerant is introduced into the compressor, the injected second flow of the refrigerant causes the temperature (specific enthalpy) of the refrigerant to be decreased in the compressor. Thus, after the injection, the condition of the refrigerant is determined by an isentropic line at reduced temperature. After the completion of the injection, the isentropic line has an increased gradient over the isentropic line prior to the injection. Thus, according to the invention where an injection is done during a compression stroke in the compressor, a decrease in the compression work is obtained in comparison with the case where the compression is done without a gas injection. Thus, according to present invention, an increase in the coefficient of performance during the execution of the refrigerating cycle is obtained.

In the first aspect of the present invention, a means is preferably provided for varying a cooling performance at the cooler by controlling a degree of the opening of the second pressure reducer. Namely, control of the second pressure reducer allows the specific enthalpy of the refrigerant to be controlled at the inlet of the evaporator. In other words, a control of the refrigerating capacity of the system is executed without controlling an operating condition of the compressor.

Preferably, the control of the cooling capacity by the cooling means is such that the degree of an opening of the second pressure reducer is increased when it is determined that an increase in the cooling ability is necessary and that the degree of an opening of the second pressure reducer is reduced when it is determined that a decrease in the cooling ability is necessary.

Preferably, adjustment of the degree of the opening of the first pressure reducer is such that the pressure of the refrigerant at the outlet of the heat emitter is controlled to a predetermined target value which is determined in accordance with the temperature of the refrigerant at the outlet of the heat emitter.

Preferably, for the refrigerant, carbon dioxide is used.

Preferably, the ratio of the pressure difference $\Delta P_s$ between the pressure $P_i$ of the refrigerant introduced, after being subjected to a pressure reduction by the first pressure reducing means, into said location of the compressor where the refrigerant is partly compressed and a pressure $P_s$ of the refrigerant sucked from the evaporator into the compressor, to the pressure difference $\Delta P_d$ between the pressure $P_d$ of the refrigerant discharged from the compressor and a pressure $P_i$ of the refrigerant introduced, after subjected to a pressure reduction by the first pressure reducing means into said location of the compressor where the refrigerant is partly compressed is in a range between 0.6 to 0.9. By co this construction, an increase in a coefficient of a performance is obtained at an execution of the refrigerating cycle in the vapor compression type refrigerating system.

In order to attain a second object, in the second aspect of the present invention, the degree of the opening of said pressure reducer is, first, controlled in such a manner that a ratio of the refrigerating capacity at the evaporator to the compression work at the compressor is increased when a thermal load at the evaporator is smaller than a predetermined value. The degree of the opening of said pressure reducer is, second, controlled in such a manner that a degree of the opening of the pressure reducer is reduced in accordance with the increase in the thermal load when a thermal load at the evaporator exceeds said predetermined value.

Due to the first feature, the vapor compression type refrigerating cycle is executed while maintaining an increased coefficient of a performance when the thermal load is smaller than a predetermined value.

In the second feature, a commencement of a rapid cooling operation is detected by the thermal load of the evaporator exceeding the predetermined value. In this case, the degree of the opening of the pressure reducer is reduced in accordance with the increase in the thermal load of the evaporator, thereby obtaining a desired refrigerating capacity even at an increased thermal load condition during the execution of the rapid cooling mode. Thus, an execution of the refrigerating cycle is done at a high efficiency, while obtaining a sufficient refrigerating capacity even at a large thermal load due to execution of a rapid cooling mode.

In the vapor compression type refrigerating system where the refrigerant such as flon is used at a pressure lower than the critical pressure, a variation of the pressure as discharged from the compressor is small compared to a vapor compression type refrigerating system where the refrigerant such as $CO_2$ is operated at a pressure higher than the critical pressure. Thus, in the conventional refrigerating system using flon, a control of a refrigerating capacity is done by controlling a mass flow amount of the refrigerant recirculated in the system. In other words, the refrigerating capacity is determined only by the maximum mass flow amount. Thus, a determination of the compression capacity only by the maximum mass flow amount causes the size of the compressor to be increased. Contrary to this, in the vapor compression type refrigerating system according to the present invention, a control of the refrigerating capacity is done mainly by controlling the pressure at the outlet of the heat emitter. Thus, the capacity of the compressor can be determined based on the mass flow amount of the refrigerant when the thermal load to the evaporator is low, i.e., the system is under a steady state. Thus, according to present invention, the size of the compressor is prevented from being increased.

Preferably, said first controlling means controls the degree of the opening of the pressure reducer so that the pressure of the refrigerant at the heat emitter is controlled to a first target value which is determined in accordance with a temperature of the refrigerant at the outlet of the heat emitter, and wherein said second controlling means controls the degree of the opening of the pressure reducer so that the pressure of the refrigerant at the heat emitter is controlled to a second target value which is determined in accordance with a value of the thermal load and the temperature of the refrigerant at the outlet of the heat emitter.

Preferably, the control of the pressure reducer is done such that a pressure difference between the outlet of the heat emitter and the inlet of the evaporator is equal to a target pressure difference determined in accordance with the temperature of the refrigerant at the outlet of the heat emitter.

The pressure of the refrigerant at the outlet of the heat emitter is increased or decreased in accordance with the increase or decrease of the thermal load. Thus, when the thermal load of the evaporator is increased, the pressure of the refrigerant at the outlet of the heat emitter is increased, thereby increasing the refrigerating capacity. Contrary to this, when the thermal load of the evaporator is reduced, the pressure at the outlet of the heat emitter is reduced, which causes the refrigerating capacity to be reduced. In this case, the pressure difference is controlled to a target value which is determined in accordance with the temperature of the refrigerant at the outlet of the heat emitter, which allows the refrigerating cycle to be executed at an increased efficiency. Thus, without provision of a separate means for detecting a thermal load of the evaporator, a similar effect is obtained, thereby simplifying the construction of the system and reducing the production cost.

Preferably, in the second aspect of the invention, as the refrigerant, carbon dioxide is used.

In order to attain a third object of the present invention, as a third aspect of the present invention, a series of a first and a second pressure reducer is provided. The first pressure reducer is for reducing the pressure of the refrigerant from the heat emitter, the first pressure reducer being for controlling the pressure at the outlet of the heat emitter in accordance with the temperature of the refrigerant at the outlet of the heat emitter. The second pressure reducer is for reducing the pressure from the separating means, the second pressure reducer being for controlling the flow amount of the refrigerant in such a manner that a degree of a super heat at the inlet of the compressor is controlled to a predetermined value. Furthermore, a separator for phase separation of the liquid phase and the gaseous phase of the refrigerant is provided, which is arranged between the first and second pressure reducer.

In the third aspect of the present invention, due to the provision of the first pressure reducer, a control of the refrigerant pressure in accordance with the temperature of the refrigerant at the outlet of the heat emitter is possible, which allows the efficiency of the refrigerating system to be increased. Furthermore, the second pressure reducer allows the degree of super heating to be maintained to a predetermined value at the inlet of the compressor, thereby preventing a liquid phase of the refrigerant from being sucked to the compressor, which would otherwise cause the compressor to be damaged.

Furthermore, the degree of super heating at the inlet of the compressor is controlled to a predetermined value, which would otherwise necessitate an accumulator at the outlet of the evaporator for phase separation of the gaseous phase from the liquid phase. Due to the elimination of the accumulator, a lubricant included in the refrigerant is prevented from being stored in the accumulator. In other words, the lubricant, which is of a reduced flowability is entrained by a high speed flow of gaseous refrigerant sucked into the compressor, which allows a large amount of the lubricant to be fed to the compressor. Thus, according to present invention, a sufficient amount of lubricant is fed to the compressor, thereby, on one hand, preventing the compressor from seizing and, on the other hand allowing the refrigerating system to be operated at an increased efficiency.

Preferably, provision is made of a third pressure reducer for reducing the pressure of the second flow of the refrigerant, and a cooling means for obtaining a heat exchange between the first flow of the refrigerant directed to the first pressure reducer and the second flow after being subjected to a pressure reduction by the third pressure reducer, thereby cooling the first flow of the refrigerant. The refrigerant issued from the heat emitter is subjected to the cooling by the cooler, which allows a specific enthalpy to be reduced at the inlet of the first pressure reducer, thereby increasing a difference in the specific enthalpy between the inlet and outlet of the evaporator. Thus, an increase in the refrigerating capacity of the vapor compression type refrigerating system is obtained.

Preferably, said cooling means is integrated with at least one of the first, second and third pressure reducers. As a result of this structure, a reduction of number of parts constructing the system is obtained, and a number of working steps for assembling the system is reduced. Thus, a reduction of a production cost is obtained.

Preferably, a conduit is provided for introducing, into the compressor, a gaseous phase of the refrigerant separated at the separating means at a pressure between a pressure inside the heat emitter and a pressure at the evaporator. Due to this construction, a liquid phase of the refrigerant separated from the separating means and at a pressure intermediate between the heat emitter and the pressure at the evaporator is introduced into the compressor. As a result, a liquid phase of refrigerant having an enthalpy lower than that of a saturated liquid introduced into the second pressure reducer, which allows the enthalpy difference to be increased between the inlet and the outlet of the evaporator. Furthermore, an introduction of a gaseous phase of the refrigerant at an intermediate pressure is introduced into the compressor, thereby reducing the compression work at the compressor.

In short, in the third aspect of the present invention, an increase in an enthalpy difference is obtained between the inlet and the outlet of the evaporator, while reducing a compression work at the compressor and increasing a coefficient of performance of the refrigerating cycle using $CO_2$.

Finally, in this aspect, as for the refrigerant, carbon dioxide may also be used.

BRIEF EXPLANATION OF ATTACHED DRAWINGS

FIG. 44 shows a construction of the refrigerating system in an eighteenth embodiment.

DETAILED EXPLANATION OF EMBODIMENTS

First Aspect of the Invention

First Embodiment

Figure 1:
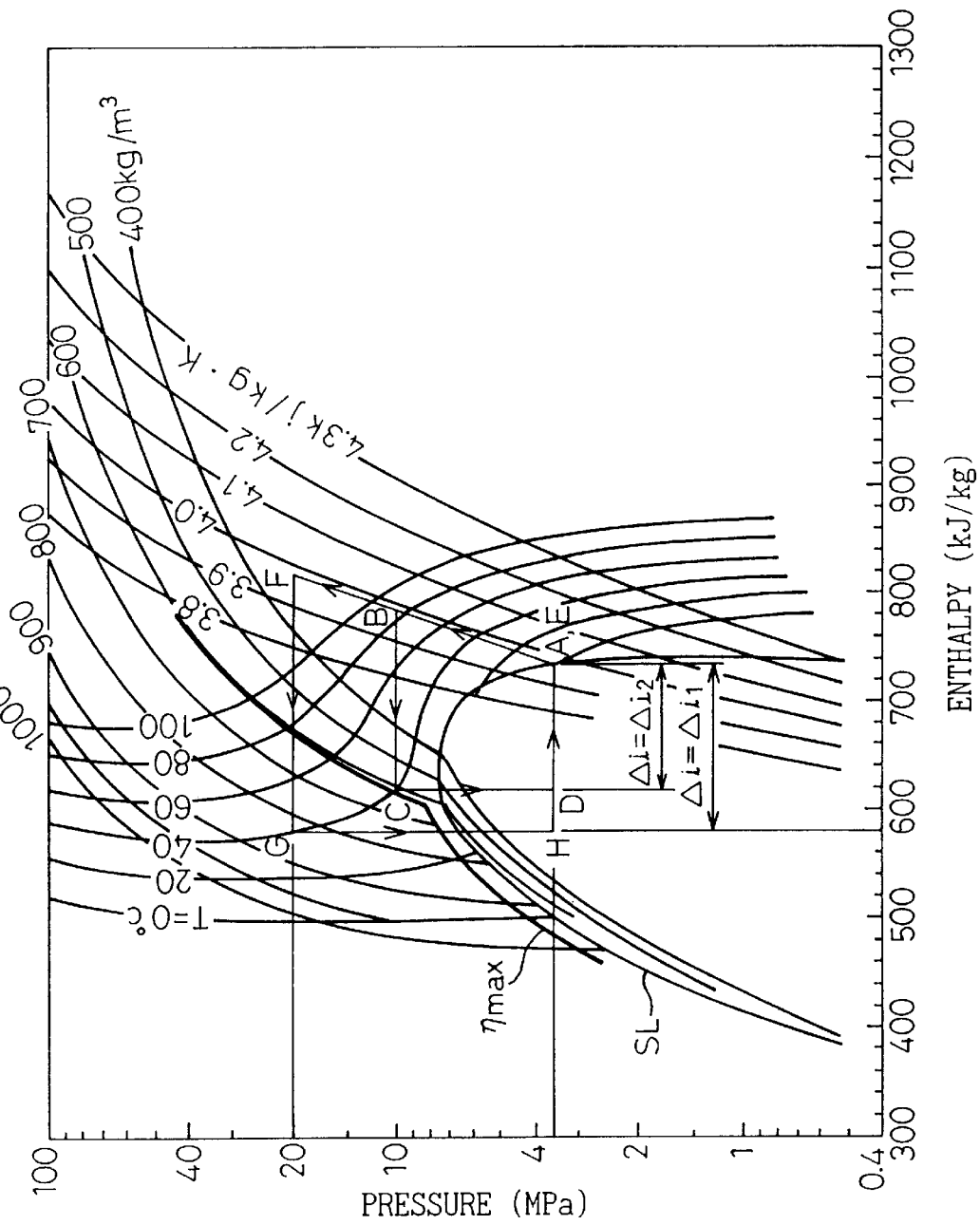
FIG. 1 shows a Mollier chart for $CO_2$.

FIG. 1 is a Mollier chart illustrating an operation of the refrigerating system using $CO_2$ as a refrigerant. In a compressor, compression of the refrigerant ($CO_2$) of a gaseous state is done, so that a change of a state from a point A to a point B occurs. At the point B, the $CO_2$ gas is under a condition of a high temperature and a high pressure, i.e., is in a super critical condition. The compressed refrigerant from the compressor 1 is subjected to a cooling at the heater (gas cooler), so that a state change between a point B to a point C is obtained. Thus, at the point D, the $CO_2$ is in a gas-liquid combined state. Then, at an evaporator, the gas-liquid combined state refrigerant is subjected to an evaporation, so that a state change between the points D and A occurs. During the evaporating stage at the evaporator, a heat corresponding a latent heat of evaporation is removed from the outside air contacting the evaporator, thereby cooling the outside air. In a well known manner, during pressure reduction at the pressure reducer, i.e., a phase change between the points C and D, a gas-liquid combined stage is obtained when the pressure is lowered below the saturated liquid pressure, i.e., the pressure at the crossing point between the line CD and the saturated liquid line SL. In the case where a change between the state C and the state D occurres slowly, a phase change from the super critical state to a gas-liquid combined state occurres by way of the liquid state of the liquid state of the $CO_2$. In the above operation, the super critical condition refers a condition of the $CO_2$, where, irrespective of density of the $CO_2$ which is roughly equal to the density at a liquid state, particles of $CO_2$ move as they do in the gaseous state.

However, carbon dioxide has a critical temperature of about 31° C., which is lower than that of a flon such as HFC-134a at 101° C., so that it may be possible that the temperature at the outlet of the heat emitter is larger than the critical temperature of $CO_2$, which prevents the latter being condensed at the outlet of the heat emitter. This means that the line BC in FIG. 1 is prevented from crossing the saturating line SL. On the other hand, the state at the outlet of the heat emitter, i.e., the point C in FIG. 1 is determined by the discharging pressure of the compressor as well as the temperature of the $CO_2$ at the outlet of the heat emitter. The temperature of the $CO_2$ at the outlet of the heat emitter is determining by the heat emission capacity at the heat emitter as well as the atmospheric air temperature. It is certain that a control the atmospheric air temperature is impossible, and therefore a control of the condition at the outlet of the heat emitter by means of the temperature of the $CO_2$ at the outlet of the heat emitter is substantially impossible.

In view of the above, a control of the state at the outlet of the heat emitter, i.e., the state of the point C in FIG. 1 is only done by controlling the discharging pressure of the compressor, i.e., the pressure at the outlet of the heat emitter. Namely, during a condition of an increased atmospheric air temperature, i.e., an increased thermal load as in the summer season, a refrigerating cycle as illustrated by E-F-G-H in FIG. 1 is executed, so as to obtain an increased pressure at the outlet of the heat emitter. Due to an increased pressure at the outlet of the heat emitter (a pressure at the point G), a desired refrigerating capacity, which corresponds to the change in an enthalpy $\Delta i = \Delta i$, during an evaporating phase H-E, is maintained. Contrary to this, during a condition of a reduced atmospheric air temperature as compared with that in a summer season, a refrigerating cycle as illustrated by A-B-C-D in FIG. 1 is executed, so as to obtain a reduced pressure at the outlet of the heat emitter. Due to a reduced pressure at the outlet of the heat emitter (a pressure at the point C), a refrigerating capacity, which corresponds to the change in an enthalpy $\Delta i = \Delta i_2$ during an evaporating phase D-A, is reduced.

It is well known that compared to the critical pressure of $CO_2$ of 7.4 MPa, flon has a lower critical pressured. For example, HFC-134a has a critical pressure of 4.07 MPa. Furthermore, in the conventional refrigerating system using flon as a refrigerant, the maximum pressure during the execution of the refrigerating cycle does not exceed the critical pressure of the flon.

Contrary to this, in the refrigerating cycle using the $CO_2$, in order to increase a refrigerating capacity during a condition of an increased outside atmospheric air temperature (thermal load) condition as occurred during a summer season, the pressure at the outlet of the heat emitter must be as large as about 10 times of the maximum pressure in the refrigerating system using flon. Such a highly increased pressure in the refrigerating system using $CO_2$ necessitates the strength of various parts constructing the system to be larger than that of the conventional system. This is the reason why size of the refrigerating system using $CO_2$ is larger than that using the flon.

Figure 2:
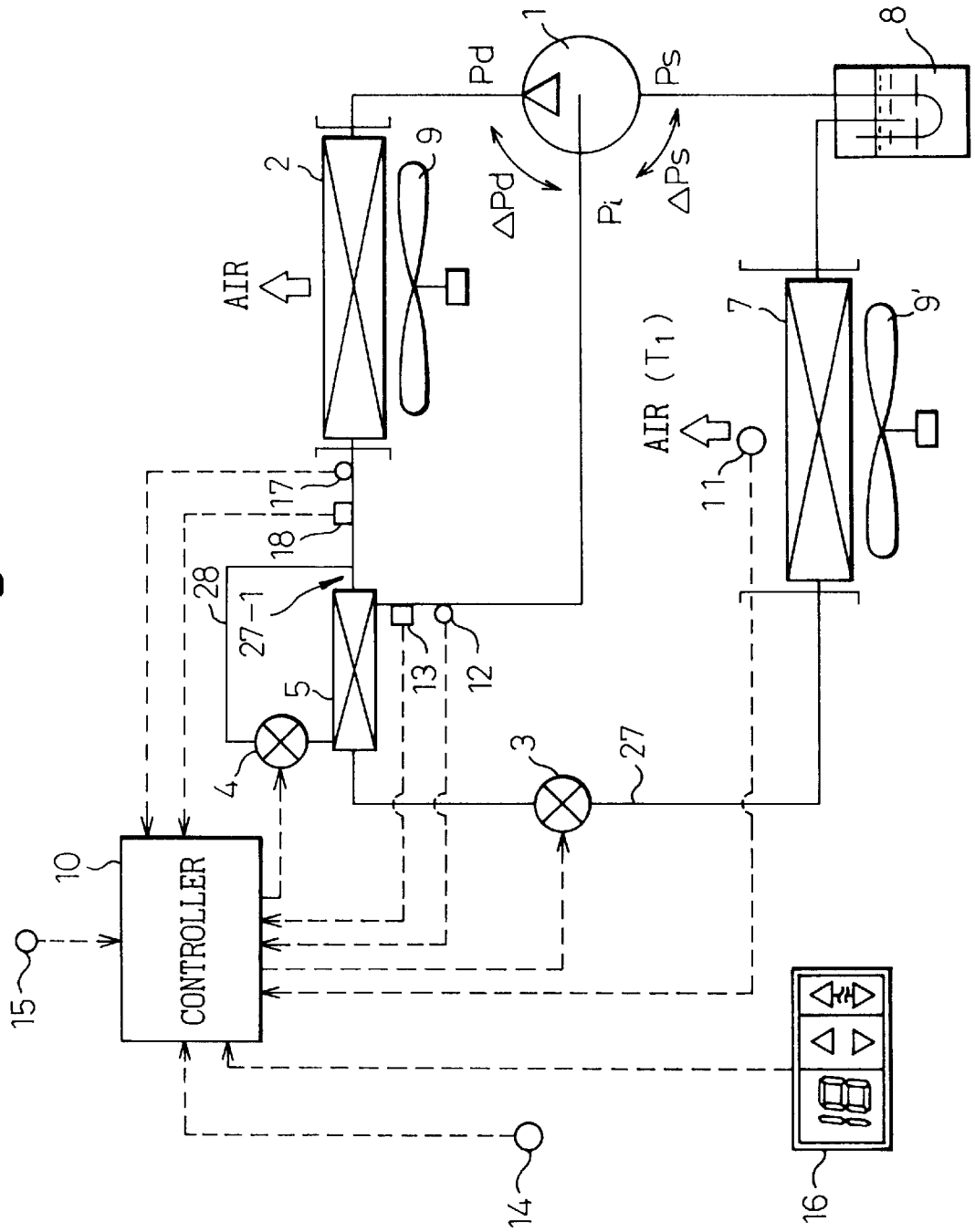
FIG. 2 is a schematic view illustrating a first embodiment of the present invention.

FIG. 2 generally and schematically illustrates, as a first embodiment of the present invention, an air conditioning apparatus for a vehicle provided with a $CO_2$ refrigerating system where a refrigerating cycle is executed while using the carbon dioxide as a refrigerant.

The refrigerating system is includes a compressor 1, a heat emitter 2, a main pressure reducer 3, an additional pressure reducer 4, a cooler 5, an evaporator 7 and an accumulator 8. The heat emitter 2, the cooler 5, the pressure reducer 3, the evaporator 7 and the accumulator 8 are located on a main recirculating conduit 27. The compressor 1 is kinematically connected with a rotating movement source such as a crankshaft of an internal combustion engine. In a well known manner, an electromagnetic clutch is provided for a selective transmission of the rotating movement to the compressor 1. Namely, an engagement of the clutch causes a rotating movement from the engine to be transmitted to the compressor 1, so that a refrigerant issued from an evaporator 7 is sucked into the compressor 1 and the sucked refrigerant is compressed in the compressor 1. As for the compressor 1 in the first embodiment, a type as disclosed in the Japanese Unexamined Patent Publication (Kokai) No. 61-79947 or Japanese Unexamined Patent Publication (Kokai) No. 63-243481 can be employed, where a two stage compression is done in one and the same compressor.

The heat emitter or gas cooler 2 is arranged downstream from the compressor 1, and is for executing a heat exchange between the $CO_2$ as compressed at the compressor 1 and an outside air, so that the refrigerant is cooled, i.e., the heat of the refrigerant is emitted to the atmosphere.

A branch point 27-1 is arranged at the outlet of the heat emitter 2, so that, from the main recirculating passageway 27 for the refrigerant, a branched passageway 28 is branched, so that a flow of the refrigerant ($CO_2$) from the heat emitter 2 is divided into a first flow in the main passageway 27 and a second flow of the refrigerant ($CO_2$) in the sub passageway 28. The sub pressure reducer 4 is arranged in the branch passageway 28, so that the pressure of the $CO_2$ is reduced to a predetermined value $P_1$. A cooler 5 is arranged, so that a heat exchange occurres between the first flow of $CO_2$ of a high temperature in the main passageway 27 and the second flow of the $CO_2$ of a low temperature from the pressure reducer 4 in the sub passageway 28. Thus, the first flow in the main passageway 27 is cooled by the second flow of $CO_2$ at a low temperature in the branched passageway 28 after passed through the sub pressure reducer 4. The first flow of the $CO_2$ in the main passageway 27 is referred herein as a "refrigerating $CO_2$". The second flow of the $CO_2$ in the sub-passageway 28 is referred herein as an "injecting $CO_2$". In a well known manner, the heat exchange of the injecting $CO_2$ with respect to the refrigerating $CO_2$ causes the temperature of the injecting $CO_2$ in the sub-passageway 27 to be increased. The flow of the refrigerant (injecting $CO_2$) of an increased temperature is via the sub-passageway 28 introduced into the compressor 1 and is subjected to a second stage compression at the compressor 1 as well known by those skilled in this art.

The main pressure reducer 3 is arranged in the main passageway 27 at a location downstream from the heat exchanger 5. The main pressure reducer 3 functions to reduce the pressure of the refrigerant to a predetermined value $P_2$, which is lower than the predetermined value $P_1$ at the passageway 28. After the pressure reduction at the pressure reducer 3, the refrigerant is returned to the compressor 1 for a repetition of a cycle.

As will be explained fully later, the degree of opening of the first pressure reducer 4 is controlled by the controller 10. The controller 10 functions as a capacity control means for controlling a cooling performance of the refrigerating $CO_2$ at the cooler 5 by controlling the degree of the opening of the pressure reducer 4. In more detail, an increase in the degree of the opening of the pressure reducer 4 causes a temperature difference to be reduced between the injecting $CO_2$ after being subjected to a pressure reduction and the refrigerating $CO_2$ prior to the pressure reduction, i.e., a temperature difference between the gases to be subjected to the heat exchange at the heat exchanger 5. However, an increased cooling capacity (heat exchange capacity) is obtained due to the fact that an increase in a mass flow rate of the gases overcoming the effect of the decrease in the temperature difference is obtained. Contrary to this, a reduction in the degree of the opening of the pressure reducer 4 causes a temperature difference to be increased between the injecting $CO_2$ after being subjected to a pressure reduction at the sub pressure reducer 4 and the refrigerating $CO_2$ prior to the pressure reduction at the main pressure reducer 3. However, a decrease in the cooling performance is obtained due to the fact that a decrease in a mass flow rate of the gases overcomes the effect of the increase in the temperature difference.

As shown in FIG. 2, an accumulator 8 is arranged in the main recirculating conduit 27 at a location between the evaporator 7 and the compressor 1. The accumulator 8 functions to reserve an excessive amount of $CO_2$ in the recirculating system and to effect a separation between the gaseous phase and a liquid phase, so that only the gaseous phase of the $CO_2$ is sucked by the compressor 1. Furthermore, as shown in FIG. 2, fans 9 and 9' are arranged to face the heat emitter 2 and the evaporator 7, respectively. As a result, a forced flow of the air contacting with the heat emitter 2 or the evaporator 7 is obtaining, thereby enhancing the heat exchanging performance.

The controller 10 as a microcomputer system is constructed for effecting a control of the degree of the opening of the first pressure reducer 4 in accordance with air conditioning factors, including a thermal load in the evaporator 7, i.e., a capacity of the refrigerant required for effecting a desired air conditioning operation of the cabin. Electrically connected to the controller 10 are various sensors for issuing signals directed to the controller 10 indicating various operating conditions, which include a temperature sensor 11 for detecting the air temperature (air temperate after subjected to the cooling) at a location of the air passageway downstream from the evaporator 7, a temperature sensor 12 for detecting a temperature of the $CO_2$ for an injection after being subjected to heating, a pressure sensor 13 for detecting the pressure of the $CO_2$ for the injection issued from the cooler 5, a temperature sensor 14 for detecting the atmospheric air temperature in the cabin of the vehicle, a temperature setter 16 for setting a temperature in the cabin desired by a driver or passenger in the cabin, a temperature sensor 17 for detecting a temperature of the $CO_2$ at the outlet of the heat emitter 2 and a pressure sensor 18 for detecting the pressure of the $CO_2$ at the outlet of the heat emitter 2. In accordance with the detected signals by the above-mentioned sensors and the setter and programs stored in the controller 10, the latter executes a control of the degree of the opening of the pressure reducers 3 and 4.

Figure 3:
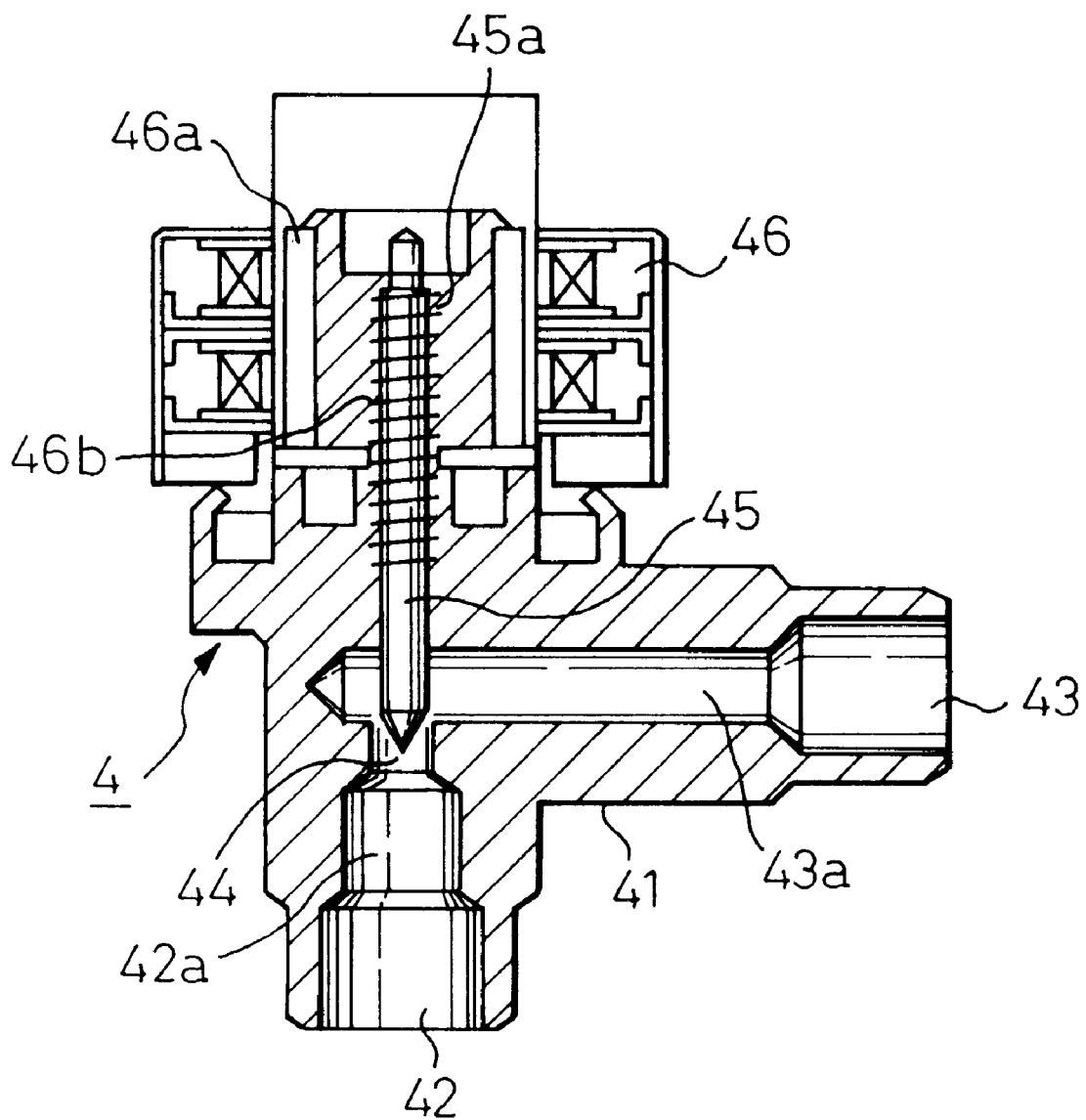
FIG. 3 is a transverse cross-sectional view of a pressure reducer valve in FIG. 2.

FIG. 3 illustrates a detail of the first pressure reducer 4 in the first embodiment of the present invention. The pressure reducer 4 is constructed basically by a housing 41 defining an inlet 42 in connection with the outlet of the heat emitter 2 for receiving the refrigerant therefrom, an outlet 43 in connection with the inlet of the cooler 5 for discharging the refrigerant thereto, a valve port 44 in connection with the outlet 43 and a chamber 42a for connecting the valve port 44 with the inlet 42. The pressure reducer 4 is further constructed by a needle valve 45, which is arranged in such a manner that a degree of the opening of the valve port 44 is controlled in accordance with a lift of the needle valve 45 and by a step motor 46 for controlling the lift of the needle valve 45. The step motor 46 includes a magnet rotor 46a having an inner, female screw thread portion 46b which is in a screw engagement with an outer, male screw thread portion 45a of the needle 45, while the needle 45 is in a spline engagement with the housing 41, so that the needle 45 is axially slidable with respect to the housing 41. As a result, a rotating movement of the rotor 46a of the step motor 46 causes the needle valve 45 to be moved axially, so that the degree of the opening of the valve port 44 is continuously varied between a fully closed condition and a fully opened condition.

The pressure reducer 3 may have a construction which is substantially identical with the pressure reducer 4. As a result, a rotating movement of a step motor (not shown) of the main pressure reducer 3 causes the degree of the opening to be continuously varied between a fully closed condition and a fully opened condition.

Figure 4:
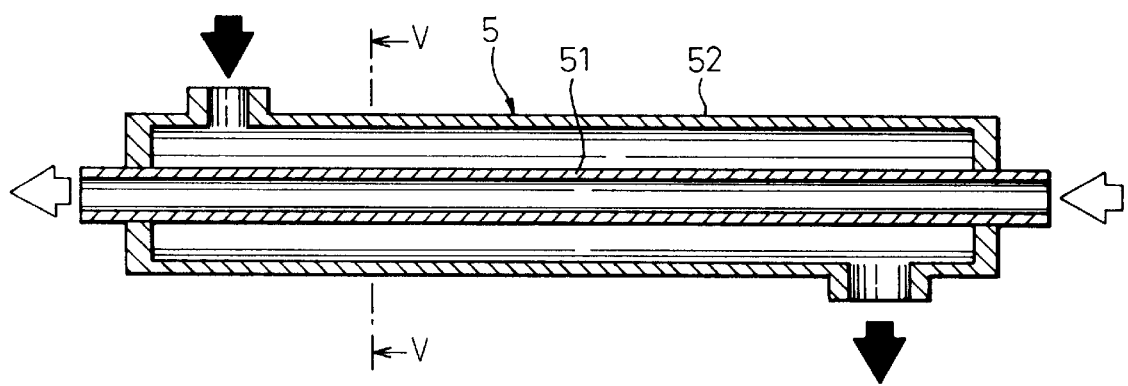
FIG. 4 is a longitudinal cross-sectional view of a cooler (heat exchanger) in FIG. 4.
Figure 5:
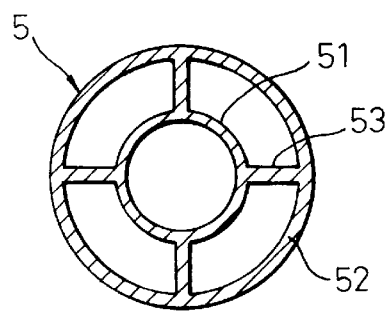
FIG. 5 is a transverse cross-sectional view taken along line V—V in FIG. 4.

FIGS. 4 and 5 show a detail of the cooler 5 which is formed as a double circular tube structure. Namely, the cooler 5 includes an inner tube 51 for a passage of the flow of the refrigerating $CO_2$, an outer tube 52 for a passage of the flow of the injecting $CO_2$, and radially co extending fins 53 arranged between an outer cylindrical surface of the inner tube 51 and an inner cylindrical surface of the outer tube 52. In order to increase a heat exchange capacity, it is preferable that an inner tube 51 is made from a metal material of an increased heat conduction factor such as an aluminum and the outer tube 52 is made of a metal material of a reduced heat conduction factor.

However, it is also possible that the inner and outer tubes 51 and 52 and the radially extending fins 53 are made integrally from an aluminum by, for example, an extrusion process. However, in such an integrated structure from the same material (aluminum), in order to prevent a heat emission at the outer tubular part, it is desirable that a heat insulating layer of a heat insulating material, such as a foamed resin, is provided at the surface of the outer tubular part 52.

Figure 6:
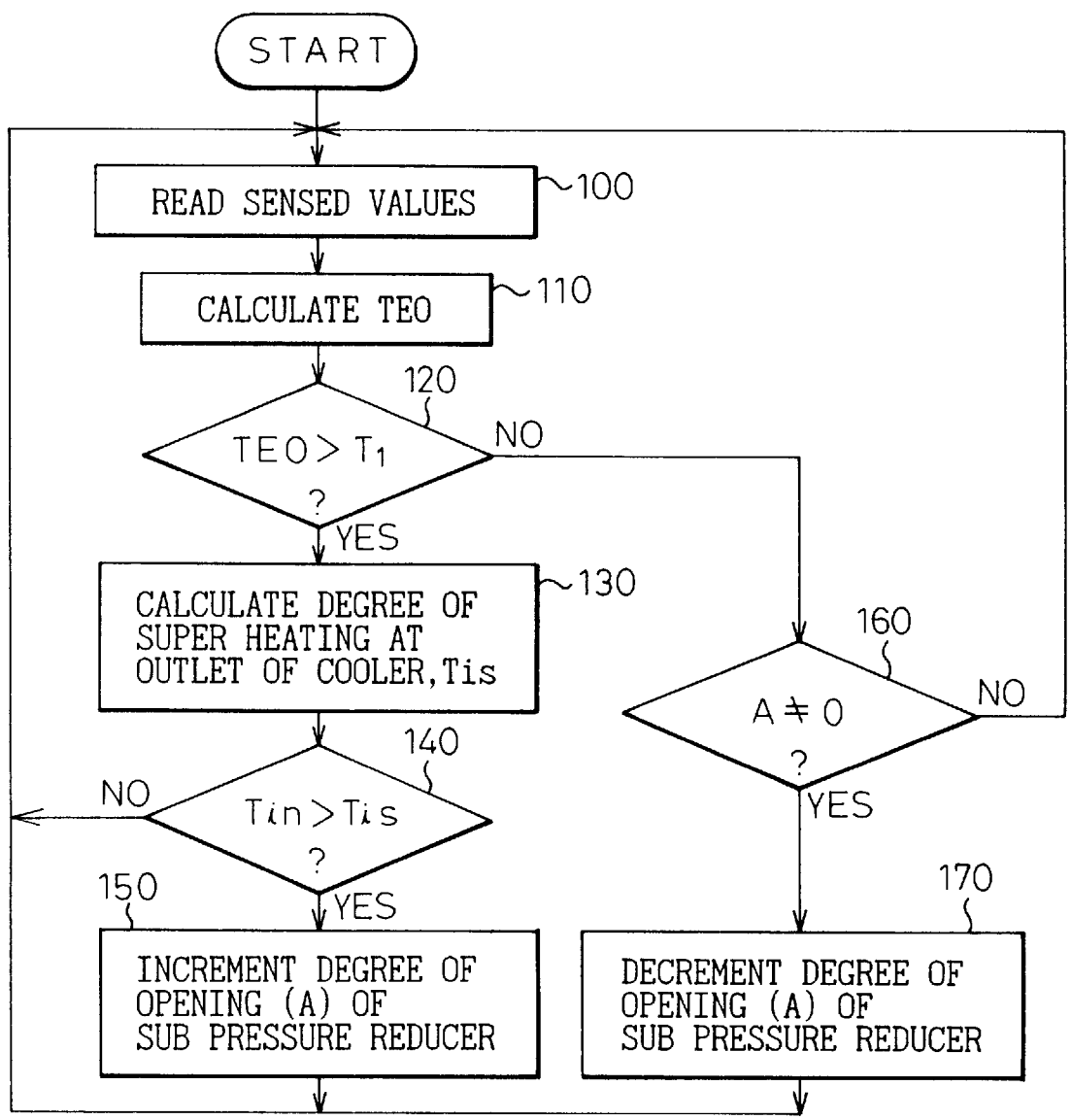
FIG. 6 is a flow chart illustrating an operation of a sub pressure reducer in FIG. 2.

Now, an operation of the sub pressure reducer 4 will be explained with reference to a flow chart in FIG. 6. A depression of a start switch (not shown) causes the $CO_2$ refrigerating cycle to commence and the routine in the flowchart in FIG. 6 to commence. At step 100, the control circuit 10 reads data as detected by the sensors 11 to 15. At the following step 100, a calculation of a target temperature (TEO) of cooled air for obtaining a desired air conditioning effect is done based on the detected signals from the inside air temperature sensor 14, the outside air temperature sensor 15 and the temperature setter 15.

The routine goes, then, to step 110, where a determination is done if the target air temperature TEO calculated at step 110 is higher than the temperature $T_1$ of the air at the outlet of the evaporator 7 detected by the evaporator downstream air temperature sensor 11. A determination of TEO>$T_1$ means that a thermal load is high and the refrigerating capacity is lacking. In this case, the routine goes to step 130, where a calculation of the degree $T_{is}$ of the super heating at the outlet of the cooler 5 is done in accordance with the temperature of the $CO_2$ at the outlet of the cooler 5 by the temperature sensor 12 and the pressure of the $CO_2$ at the outlet of the cooler 5 by the pressure sensor 13. Then, the routine flows into a step 140, where it is determined if a predetermined degree of super heating, $T_{in}$ is higher than the target value of the super heating degree $T_{is}$ calculated at the step 130. A determination of $T_{in}$>$T_{is}$ causes the routine to go to step 150, where an increase of a predetermined value in the degree of the opening A of the sub pressure reducer 4 is obtained. Then, the routine goes back to the step 100 for a repetition of the operation.

When it is determined $T_{in}$<$T_{is}$ at step 140, the degree of the opening of the first pressure reducer 4 is unchanged.

When it is determined that the target air temperature TEO calculated at step 110 is equal to or less than the temperature $T_1$ of the air at the outlet of the evaporator 7 detected by the sensor 11, the routine goes to step 160, where a determination is done if the degree of the opening A of the first pressure reducer 4 is not zero, i.e., the first pressure reducer is not fully closed, the routine goes to step 170, where a decrease of a predetermined value in the degree of the opening A of the sub pressure reducer 4 is obtained and the routine goes back to the step 100 for the repetition of the operation.

Figure 7:
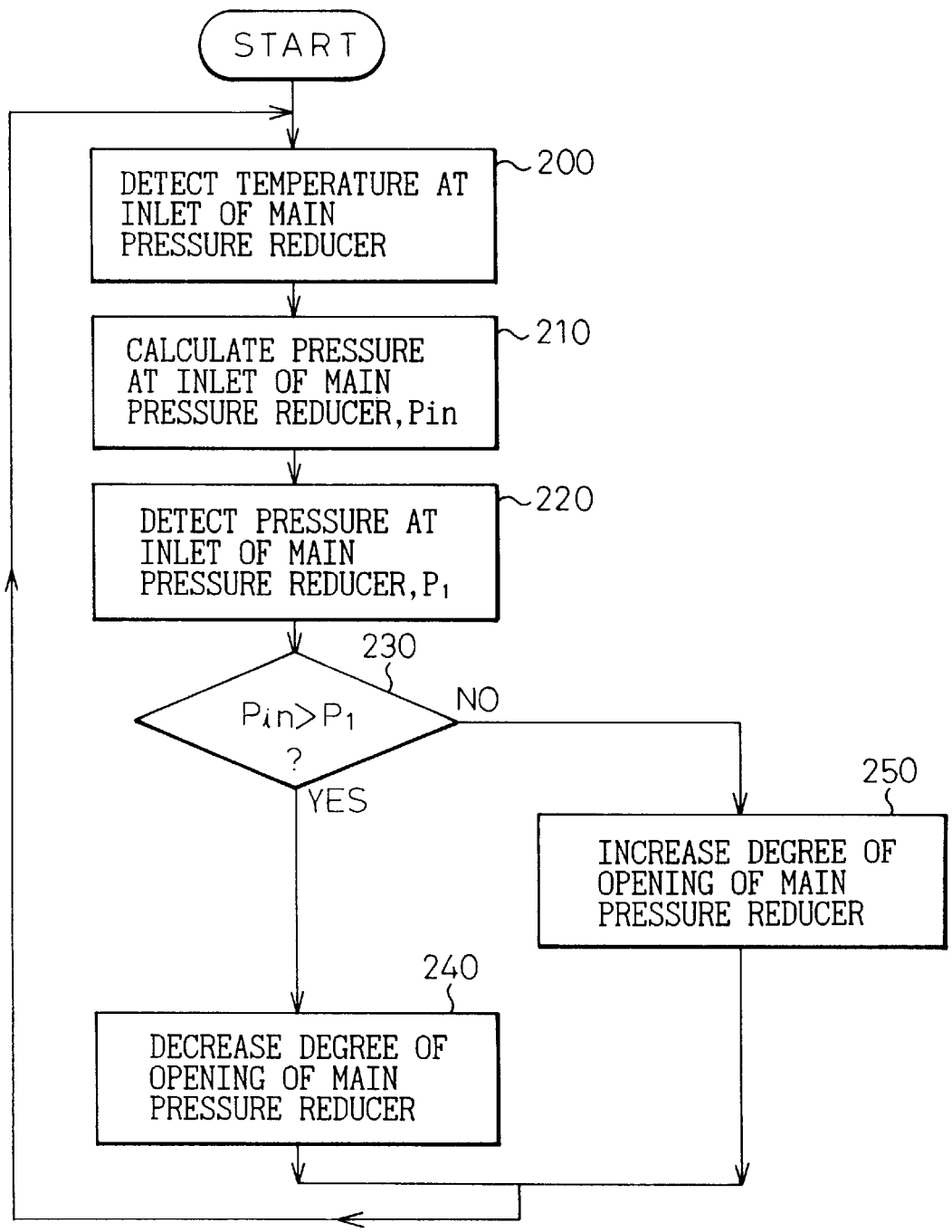
FIG. 7 is a flow chart illustrating an operation of a main pressure reducer in FIG. 2.
Figure 8:
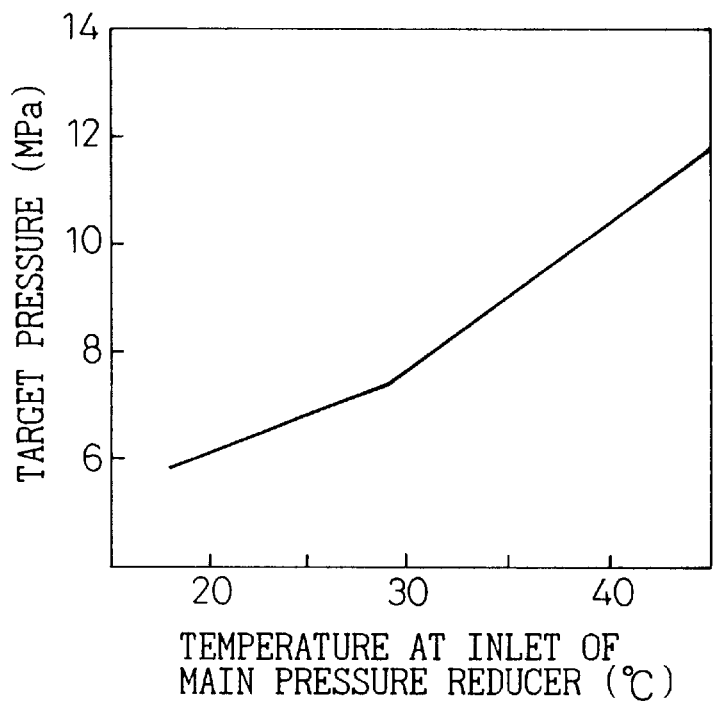
FIG. 8 is a relationship between a temperature at the inlet of a pressure reducer and a target pressure.

An operation of the main pressure reducer 3 will be explained with reference to a flowchart in FIG. 7. Namely, the commencement of the operation of the refrigerating system by the start switch (not shown) causes the routine to go to step 200, where detected values by the temperature sensor 17 are read out, and then to step 210, where a calculation of a target value ($P_{in}$) of the pressure at the inlet of the main pressure reducer 3 is done. Namely, a map is stored in the ROM of the control circuit 10 which corresponds to a relationship between the temperature of the refrigerant at the inlet of the main pressure reducer 3 and a pressure of the refrigerant at the inlet of the main pressure reducer 3 as shown in FIG. 8. An interpolation is done using the map in FIG. 8 to obtain a value of the pressure $P_{in}$ at the inlet of the pressure reducer 3 corresponding to the detected temperature of the $CO_2$ by the sensor 17.

At step 220, a pressure $P_1$ of the refrigerant at the inlet of the main pressure reducer 3 detected by the sensor 18 is read out. Then, at step 230, it is determined if $P_{in}$>$P_1$. If it is determined that the target value $P_{in}$ of the pressure at the inlet of the main pressure reducer 3 is higher than the detected pressure P1 at the inlet of the pressure reducer 3, the routine goes to a step 240, where the degree of the opening of the main pressure reducer 3 is decreased to a predetermined value. Contrary to this, if it is determination that the target value $P_{in}$ of the pressure at the inlet of the main pressure reducer 3 is equal to or less than the detected pressure P1 at the inlet of the pressure reducer 3, the routine goes to a step 250, where the degree of the opening of the main pressure reducer 3 is increased for a predetermined value. Then, the routine goes back to the step 200 for a repetition of the above process.

As explained above with reference to FIG. 1, in order to obtain an increase in the refrigerating capacity, an increase in the pressure of the $CO_2$ is needed at the outlet of the heat emitter 2. However, an increase in the pressure at the outlet of the heat emitter 2 is accompanied with an increase in the discharging pressure at the compressor 1, resulting in an increase in a compression work, i.e., an amount of a change in enthalpy, $\Delta L$ during a compression phase A-B by the compressor 1 as illustrated in a Mollier chart in FIG. 1. Thus, an increase in the enthalpy $\Delta L$ during the compression phase A-B larger than an increase in the enthalpy $\Delta_i$ during the evaporation phase D-A causes a coefficient of performance COP (=$\Delta_i/\Delta L$) of the refrigerating cycle using $CO_2$ to be necessarily reduced.

Figure 9:
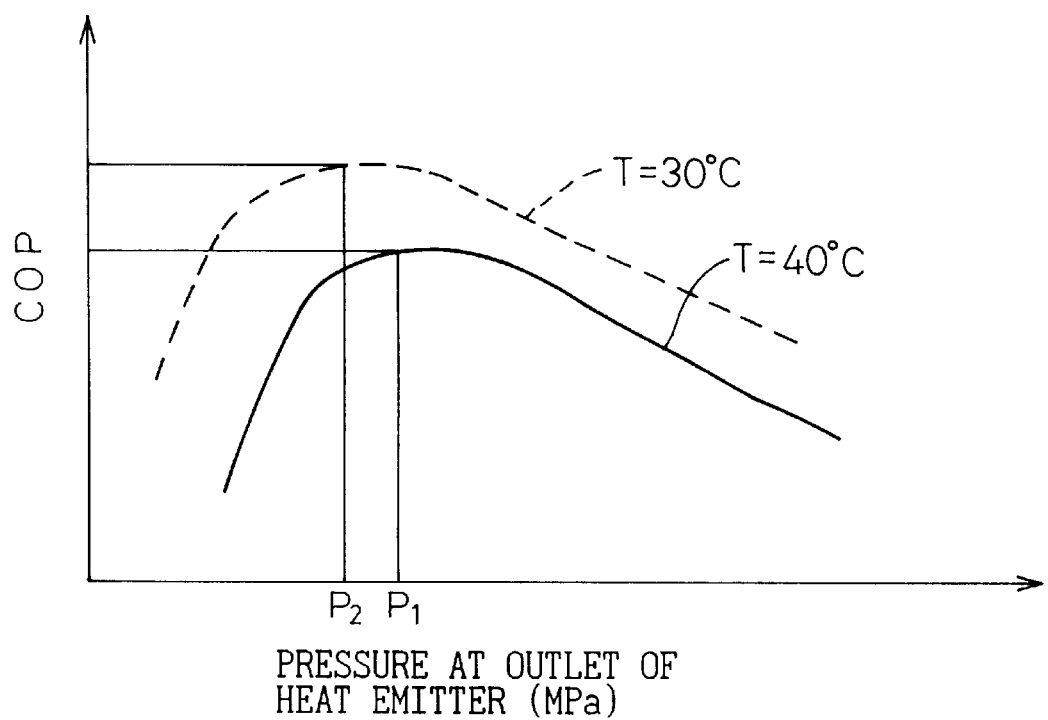
FIG. 9 shows relationships between the pressure at the outlet of a heat emitter and a coefficient of performance.

In FIG. 9, a solid curve shows a relationship between the pressure at the outlet of the heat emitter 2 and the value of the coefficient of performance which is calculated by using Mollier chart in FIG. 1, while assuming that the temperature of the refrigerant ($CO_2$) at the outlet of the heat emitter 2 is 40° C. As will clear from this curve, a maximum value of the coefficient of performance (COP) is obtained when the pressure is $P_1$, which is about 10 MPa. A dotted curve shows a similar relationship when the temperature of the refrigerant ($CO_2$) at the outlet of the heat emitter 2 is 30° C. A maximum value of the coefficient of performance is obtained when the pressure is $P_2$, which is about 8.0 MPa.

The above procedure as explained with reference to FIG. 9 is repeated for various value of the temperature at the outlet of the heat emitter for obtaining the pressure for obtaining the maximum values of the coefficient of performance, so that a thick solid line $\eta_{max}$ in FIG. 1, which is herein referred as a optimum control line, is obtained. According to the inventors, it is considered that, when calculating the optimum control line $\eta_{max}$, it is desirable that a degree of sub-cool at the inlet of the main pressure reducer 3 is in a range between 1 to 10° C. Thus, in FIG. 1, the optimum control line no is shown in the rectangular coordinate system when the pressure in the evaporator 7 is about 3.5 MPa (corresponding to the temperature of 0° C. at the evaporator 7) and the degree of sub-cool is about 3° C.

Furthermore, in the system in FIG. 2, the pressure loss between the inlet of the main pressure reducer 3 and the outlet of the heat emitter 2 is negligibly small. Thus, it is possible to consider that the pressure of $CO_2$ at the inlet of the pressure reducer 3 is equal to the pressure of $CO_2$ at the outlet of the heat emitter 2.

In the above explanation of the operation, by decreasing or increasing the degree of the opening of the main pressure reducer 3, the pressure at the outlet of the heat emitter 2 (the pressure at the inlet of the main pressure reducer 3) is increased or decreased. However, it should be noted that, strictly speaking, the pressure at the outlet of the heat emitter 2 is determined not only by the degree of the opening of the main pressure reducer 3 but also by the degree of the opening of the sub pressure reducer 4. However, the maximum and the minimum pressure during the execution of the refrigerating cycle are largely influenced by the degree of the opening of the main pressure reducer 3. Thus, it is practical to consider that the pressure at the outlet of the heat emitter 2 is substantially determined by the degree of the opening of the main pressure reducer 3.

Figure 10:
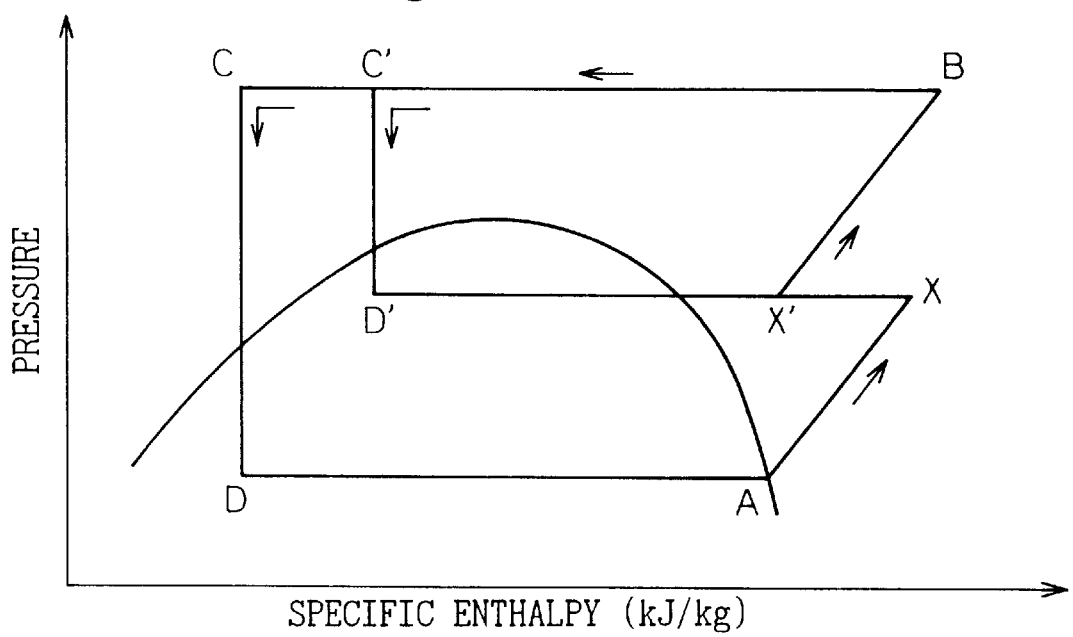
FIG. 10 shows schematic Mollier chart for illustrating an operation of the first embodiment.

Now, the advantages of the refrigerating system using $CO_2$ will be explained. In the $CO_2$ refrigerating system in this embodiment, a heat exchange occurres between the injecting $CO_2$ and the refrigerating $CO_2$, so that a reduction of a specific enthalpy of the refrigerating $CO_2$ at the inlet of the main pressure reducer 3 is obtained. Such a reduction of a specific enthalpy of the $CO_2$ at the inlet of the main pressure reducer 3, i.e., a reduction of a specific enthalpy of the $CO_2$ at the inlet of the evaporator 7 does not accompany any increase in the pressure of $CO_2$ at the outlet of the heat emitter 2. Thus, an increase in the difference in the specific enthalpy difference between the inlet and the outlet of the evaporator 7 is obtained, as shown in FIG. 10. Thus, according to the embodiment in FIG. 2, a reduction of the maximum operable pressure for executing refrigerating cycle using $CO_2$ is obtained without reducing a refrigerating capacity, thereby preventing various components such as a compressor 1 in the refrigerating system from being large sized, which is advantageous in that the refrigerating system is easily installed in a limited space in a vehicle.

According to the embodiment in FIG. 2, the flow of the refrigerant (injecting $CO_2$) in the passageway 28 is injected into the compressor 1 at a location where a compression is partly done in a well known manner. In FIG. 10 illustrating schematically a Mollier chart in such an injection system, a line B–C illustrates a heat emission by the heat emitter 2, a line C–D illustrates a pressure reduction by the main pressure reducer 3 and a line D–A illustrates an evaporation at the evaporator 7. A part of the $CO_2$ is diverted from the main passageway 27 at a location C' in FIG. 10 and is passed through the sub-passageway 28, so that a pressure is reduced to a point D' at the first pressure reducer 4. Then, the $CO_2$ in the passageway 28 is injected into the compressor 1. Such an injection of the $CO_2$ cases the temperature of $CO_2$ corresponding to a specific enthalpy to be reduced since a change in state in a Mollier chart from a point X to a point X' is generated as shown in FIG. 10. Thus, after oz the execution of the injection, the condition of the $CO_2$ in the compressor is varied along an isothermal line corresponding to a reduced temperature of the $CO_2$. As will be seen from FIG. 1, the isothermal line after injection has an increased gradient with respect to the specific enthalpy over the isothermal line prior to the injection. As a result, the present embodiment where the $CO_2$ injection is done to the compressor 1 when a compression is partially done can reduce a compression work over a case where no injection into the compression is done, i.e., a mere induction and compression of $CO_2$ is done. Thus, the present embodiment can provide an increased value of a coefficient of performance.

Figure 11:
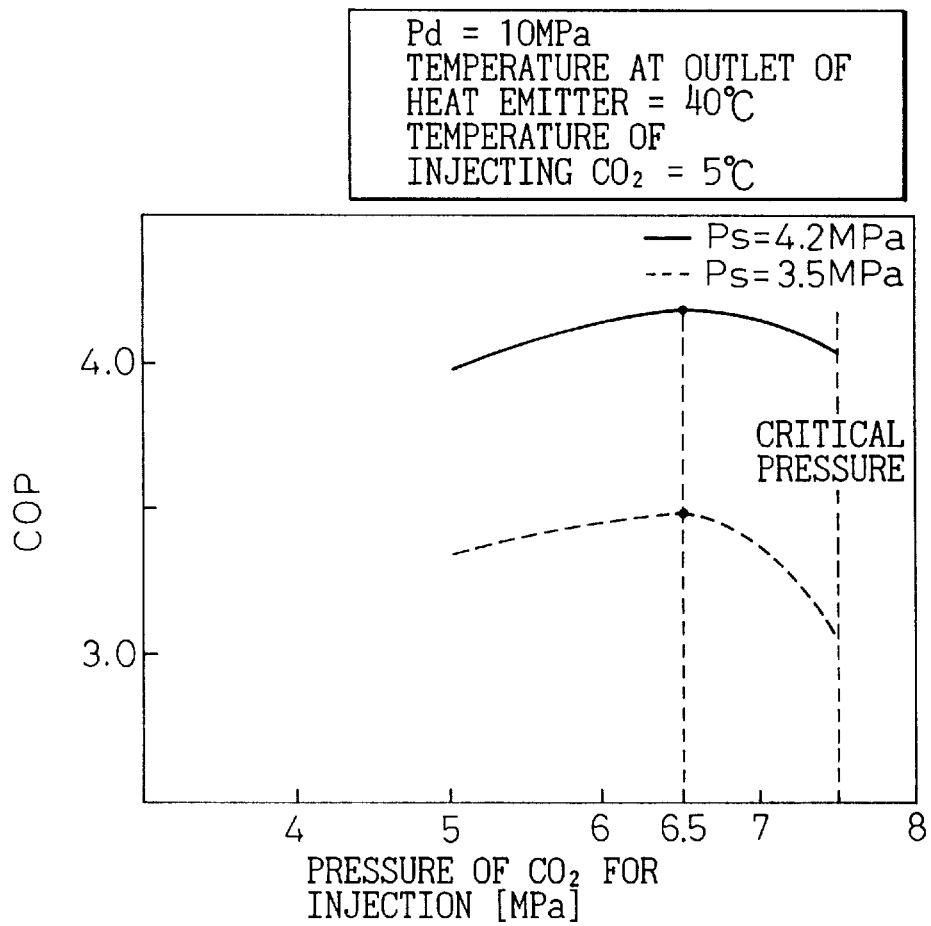
FIG. 11 is relationships between injected pressure and a coefficient of performance.

The coefficient of performance in the refrigerating system using $CO_2$ is varied in accordance with various operating conditions including the pressure at the inlet of the evaporator 7 (intake pressure), the pressure at the outlet of the heat emitter 2 (outlet pressure) and the pressure of $CO_2$ as injected. The inventors have conducted a test under a fixed pressure at the outlet of the heat emitter 2 of 10 MPa, while varying the pressure at the inlet of the evaporator 7 in a range between 3.5 to 4.2 MPa and varying the pressure of the injected $CO_2$. As shown in FIG. 11, irrespective of the value of the pressure at the inlet of the evaporator 7, the maximum value of the coefficient of performance is obtained when the pressure of the injected $CO_2$ is about 6.5 MPa.

In view of the above, the $CO_2$ refrigerating cycle is carried out while keeping an increased value of the coefficient of performance when a selection of the pressure $P_i$ of the $CO_2$ for injection is done so that a ratio of the pressure difference $\Delta P_s$ between the pressure $P_i$ of the injected $CO_2$ injected to the compressor 1 and the pressure $P_s$ of $CO_2$ sucked to the compressor 1 from the evaporator 7 to the pressure difference $\Delta P_d$ between the pressure $P_d$ of $CO_2$ discharged from the compressor 1 and the pressure $P_i$ of the injected $CO_2$, $\Delta P_s/\Delta P_d$ is maintained in a range between 0.6 to 0.9.

According to a result of a calculation by the inventors, when the pressure at the inlet of the evaporator 7 is 3.5 MPa and the pressure of the $CO_2$ for the injection is 5.2 MPa, a cooling capacity of 193.10 kJ/kg (43.13 kcal/kg) and a compression work by the compressor 1 of 56.22 kJ/kg (13.43 kcal/kg) were obtained. When the pressure at the inlet of the evaporator 7 is changed to 6.5 MPa, the cooling capacity of 163.80 kJ/kg (39.13 kcal/kg) and a compression work by the compressor 1 of 46.80 kJ/kg (11.18 kcal/kg) were obtained. Furthermore, when the pressure of the $CO_2$ as injected is changed to 7.3 MPa, the cooling capacity of 142.87 kJ/kg (34.13 kcal/kg) and a compression work by the compressor 1 of 43.83 kJ/kg (10.47 kcal/kg) were obtained.

According to the result of a calculation by the inventor, a 20% increase in the coefficient of performance is obtained when the pressure of the injected $CO_2$ is 6.5 MPa over the prior art refrigerating system using $CO_2$ where a control of the refrigerating capacity is done by controlling the pressure at the outlet of the heat emitter 2. In this test of the prior art $CO_2$ refrigerating system, the pressure at the inlet of the evaporator 7 was 3.5 MPa, the pressure at the outlet of the heat emitter 2 was 10 MPa and the temperature at the outlet of the heat emitter 2 was 40° C.

Furthermore, according to the first embodiment, by controlling the degree of the opening of the sub pressure reducer 4, a specific enthalpy of the $CO_2$ at the inlet of the evaporator 7, which corresponds to a degree of a sub-cool is controlled, resulting in an increase in the refrigerating performance of the refrigerating system using $CO_2$ without using an ON-OFF control of the electromagnetic clutch or a capacity control of a variable displacement type of compressor. Thus, a chance of an occurrence of ON-OFF operation of the electromagnetic clutch is reduced, which otherwise irritate a driver or passenger. Furthermore, use of a capacity control mechanism in a compressor is eliminated, thereby preventing the production cost from being increased.

Finally, in the above embodiment, a pressure and a temperature at the outlet side of the heat emitter 2 is controlled so that they follow the optimum control line $\eta_{max}$, which cooperates with the effect of a cooling capacity increase by the cooler (heat exchanger), thereby increasing the coefficient of performance while keeping an increased refrigerating performance of the refrigerating system executing a refrigerating cycle using $CO_2$.

In this embodiment, the pressure reducer 4 may constructed as an ON-OFF type valve, which is subjected to a duty control in a well known manner.

Second Embodiment

Figure 12:
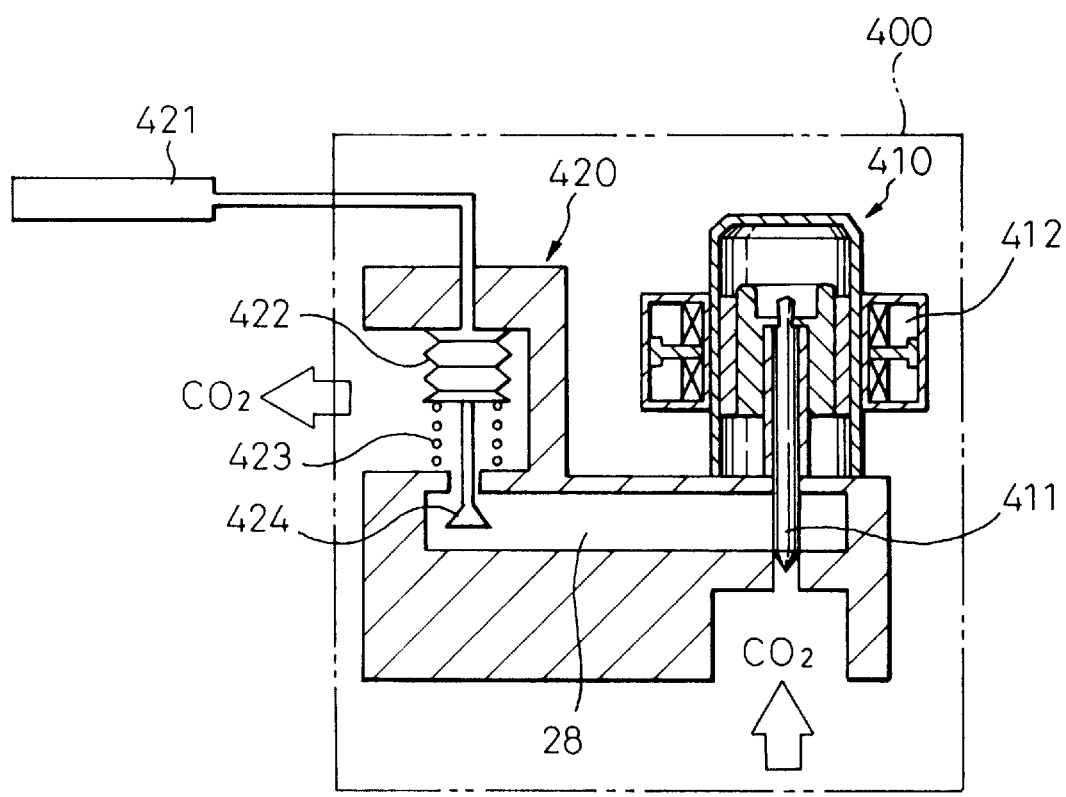
FIG. 12 shows a mechanical pressure reducer in the second embodiment.

This embodiment is directed to a construction of sub-pressure reducer 4 capable of eliminating the temperature sensor 12 and the pressure sensor 13 for detecting a temperature and the pressure of the $CO_2$ for the injection. Namely, as shown in FIG. 12, a pressure reducing device 400 is constructed by a pressure reducer unit 410, which has substantially the same construction as that of the pressure reducer 4 in the first embodiment in FIG. 2 and by a thermal expansion valve 420 which is similar construction to that used for a conventional type refrigerating system using flon. The pressure reducer 410 includes a valve member 411 located in the injection passageway 28 between the heat emitter 2 and the heat exchanger 5 as shown in FIG. 2. The thermal expansion valve 420 includes a heat sensing tube 421 located at a position suitable for detecting a temperature of $CO_2$ at the outlet of the cooler 5 in FIG. 2. In a well known manner, a gas such as $CO_2$ is sealingly stored in the heat sensing tube 421. The thermal expansion valve 420 is further provided with a bellows member 422 which has a chamber opened to the heat sensing tube 421, a return spring 423 urging the bellows member 422 upwardly, and a valve member 424 connected to the bellows member 422. The valve member 424 is located in the passageway 28 at a location downstream from the valve member 411.

In the above construction of the second embodiment, the bellows member 422 is displaced in accordance with the pressure at the outlet of the cooler 5 detected by the thermo-tube 421. In other words, the lift of the valve 424 is controlled in accordance with the pressure at the outlet of the cooler 5. Thus, a degree of super heating at the outlet of the cooler 5 is controlled mechanically by means of the thermo sensitive expansion valve 420. Thus, even in an occurrence of a malfunction in the controller 10, a suction of a refrigerant $(CO_2)$ under a liquid state is prevented, thereby enhancing a reliability of the $CO_2$ refrigerating cycle executed by the refrigerating system.

In the embodiment, in order to control the cooling capacity of the cooler 5, the valve member 411 is connected to a step motor 412, so that the valve member 411 is controlled continuously from a fully closed position to a fully opened condition by using the step motor 412. However, in place of the step motor 412, a mere ON-OFF type electromagnetic valve can be used. Namely, the electromagnetic valve is opened when an increased refrigerating capacity is necessary in summer season. Contrary to this, the electromagnetic valve is closed when a small refrigerating capacity is sufficient in winter season or a mere defrosting operation is done. Thus, an operation is simplified, thereby reducing, on one hand, a production cost and increasing a reliability during the execution of the $CO_2$ refrigerating cycle, on the other hand.

Furthermore, in place of an ON-OFF valve, the electromagnetic valve can be subjected to a duty control in accordance with the desired refrigerating capacity. In this case, the electromagnetic valve is controlled such that if a larger refrigerating capacity is required a larger duty ratio is provided.

Third Embodiment

Figure 13:
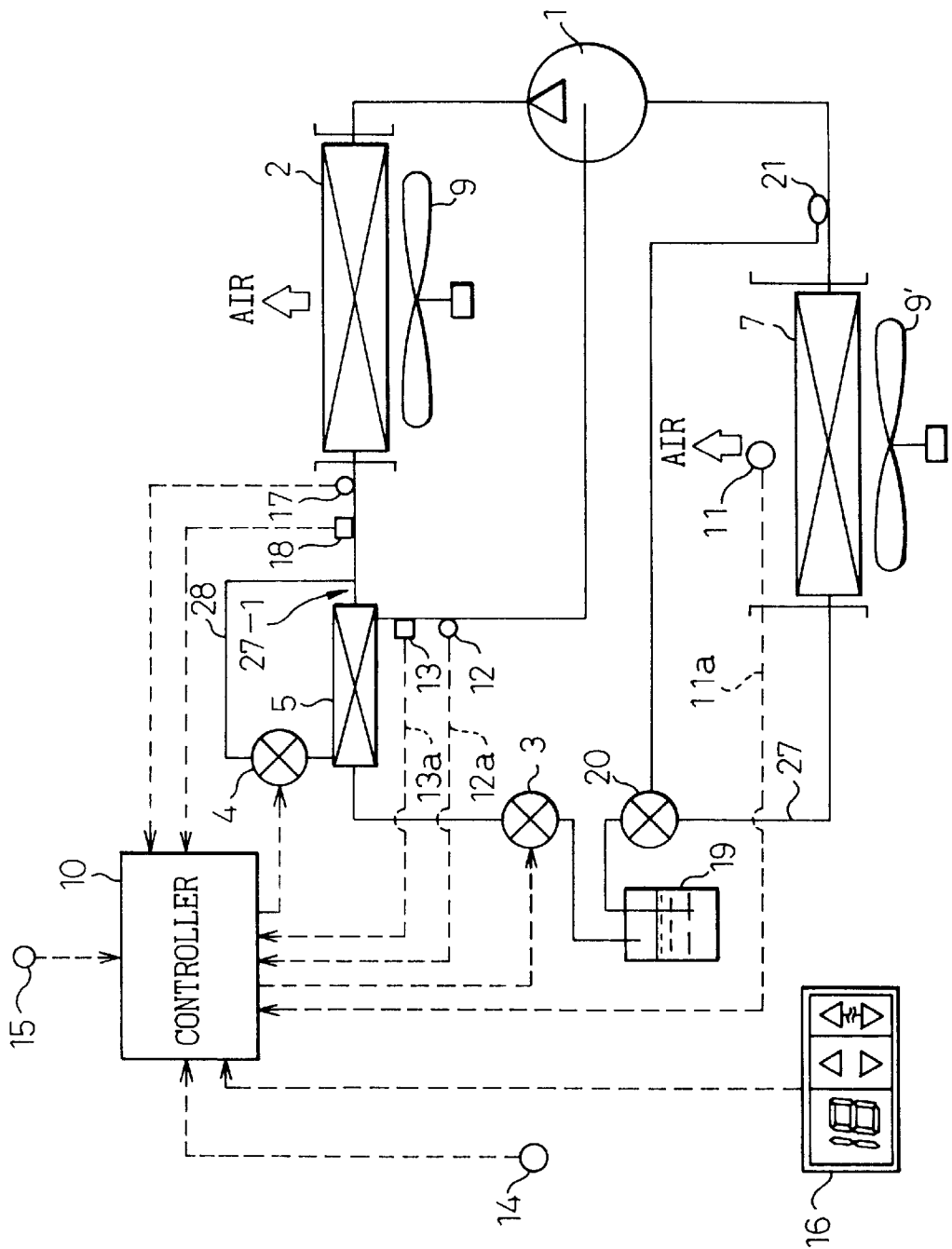
FIG. 13 shows a construction of the refrigerating system in a third embodiment.

FIG. 13 shows a third embodiment as shown in FIG. 13, which is different from the first embodiment in FIG. 2 in that, in place of the accumulator 8 in FIG. 1, a receiver 19 is arranged in the refrigerant recirculating passageway at a location downstream from the main pressure reducer 3, so that, at the receiver 19, the $CO_2$ issued from the main pressure reducer 3 is separated to a gaseous phase and a liquid phase and in that a third pressure reducer 20 is arranged at the outlet of the receiver 19, so that a pressure of the liquid state $CO_2$ from the receiver 19 is reduced and a mass flow amount of the $CO_2$ is controlled in such a manner that the degree of the super heating at the inlet of the compressor 1, i.e., at the outlet of the evaporator 7, is controlled to a predetermined value.

The third pressure reducer 20 is of the same structure at that of an expansion valve used in a conventional refrigerating system using as a refrigerant flon. Namely, the third pressure reducer is provided with a heat sensitive tube 21 at the outlet of the evaporator 7, so that the degree of the opening of the third pressure reducer 20 is controlled in accordance with the pressure inside the heat sensitive tube.

Now, an operational characteristic of the third embodiment will be explained. In a compression device used for a vapor compression type refrigerating system including a refrigerating system using $CO_2$, it is usual that an oil pump for feeding a lubricant to sliding parts in the compressor is eliminated, which is for making the size of the system to be smaller and a construction of the system to be simple. In such a refrigerating system eliminated with an oil pump, a lubricant for a lubrication of sliding parts in the compressor is mixed with the refrigerant. Thus, the lubricant mixed to refrigerant is subjected to a recirculation in the refrigerating system.

On the other hand, in order to prevent a liquid phase of the $CO_2$ from being sucked into the compressor, which would cause the compressor to be damaged, the Japanese Examined Patent Publication No. 7-18602 proposes an accumulator arranged at the outlet side of the evaporator 14 which functions to separate the liquid phase and the gaseous phase, so that only the gaseous phase of the $CO_2$ is fed to the compressor 10. Thus, in this system using the accumulator, a lubricant of an increased density compared to the gaseous phase $CO_2$ is likely to be held in the accumulator.

In order to combat this problem, the above mentioned '602 patent proposes an arrangement of the accumulator for preventing a shortage of the lubricant in the compressor such that a phase separation is done at the accumulator, while the lubricant is taken out at a lower portion of the accumulator under the effect of a gravity by utilizing a fact that the lubricant has an increased density over the liquid phase of the $CO_2$, and the lubricant as taken out is returned back to the inlet side of the compressor as well as to the outlet side of the accumulator.

In comparison with the above mentioned '602 patent, in the embodiment in FIG. 13, blocking of an introduction of the liquid state $CO_2$ to the compressor 1 is done by controlling a predetermined value of the degree of super heating at the inlet of the compressor 1. Thus, an arrangement of the accumulator at the outlet side of the evaporator is not necessary, as is case in the '602 patent. Furthermore, a phase separation of $CO_2$ at the accumulator at the outlet side of the evaporator is not done, which allows lubricant to be entrained by a flow of the gaseous $CO_2$ of an increased flow speed, which allows a sufficient amount of the lubricant to be sucked into the compressor 1.

In short, according to the third embodiment, sucking of a liquid phase of the $CO_2$ to the compressor, which causes the compressor to be damaged, and seizing of the compressor due to a lack of the lubricant is prevented, while maintaining an increased efficiency of the refrigerating cycle using the $CO_2$.

Fourth Embodiment

This embodiment is directed to a mechanical control of the first and second pressure reducers so that the number of parts is reduced. Namely, in FIG. 14, a sub pressure reducer 430 is arranged so that the degree of the opening of the pressure reducer 430 is controlled in accordance with the pressure $P_L$ at the side of the evaporator 7. In more detail, as shown in FIG. 15, the sub pressure reducer 430 is constructed by a diaphragm 431, a housing 432 for holding the diaphragm 431 at its outer peripheral portion, so that a first pressure chamber 433 is formed above the diaphragm 431 and a second chamber 433' is formed, below the diaphragm 431, which is opened to the atmosphere via a hole 434. The valve 430 is further provided with a rod 435 connected to the diaphragm 431, a valve port 438, a valve ball 439 contacting with the rod 435, a spring 436 which urges the valve ball 439 upwardly, and a passageway 437 for the $CO_2$ arranged between the outlet side of the heat emitter 2 and the heat exchanger 5. As LU shown in FIG. 15, the connecting rod 435 passes through the valve port 435 and is contacted with the valve member 439 which is urged upwardly by the coil spring 436. A sum of the spring force by the spring 436 and a force by the atmospheric pressure in the diaphragm chamber 433', which is referred herein below as a valve closing force $F_S$, acts on the valve member 439 in such a manner that a degree of the opening of the valve port 438 is reduced. On the other hand, the pressure $P_L$ in the diaphragm chamber 433 generates a force, which is acts on the valve member 439 in a direction opposite to the direction of the valve closing force FS and which is referred herein below as a valve opening force $F_O$.

In an operation of the pressure reducer 430, an increase in a thermal load in the evaporator 7 causes a pressure PL to be increased at the side of the evaporator 7, thereby increasing the valve opening force FO, which finally causes the latter to overcome the valve closing force FS. As a result, the degree of the opening of the sub pressure reducer 430 is increased, which results in an increase in the amount of $CO_2$ injected into the compressor 1 via the passageway 28. Contrary to this, a decrease in a thermal load in the evaporator 7 causes a pressure PL to be reduced at the side of the evaporator 7, thereby reducing the valve opening force FO, which finally causes the latter to be smaller than the valve closing force FS. As a result, the degree of the opening of the sub pressure reducer 430 is decreased, which results in a decrease in the amount of $CO_2$ injected into the compressor 1 via the passageway 28.

In this embodiment, in order to prevent liquid phase of the $CO_2$ from being sucked into the compressor 1, an accumulator 8' is arranged also at the outlet of the cooler 5. However, in place of the accumulator 8', a thermal expansion valve 420 may be arranged at a location downstream of the sub pressure reducer 430, including a location downstream of the cooler 5, similar to the second and fifth embodiments.

Figure 14:
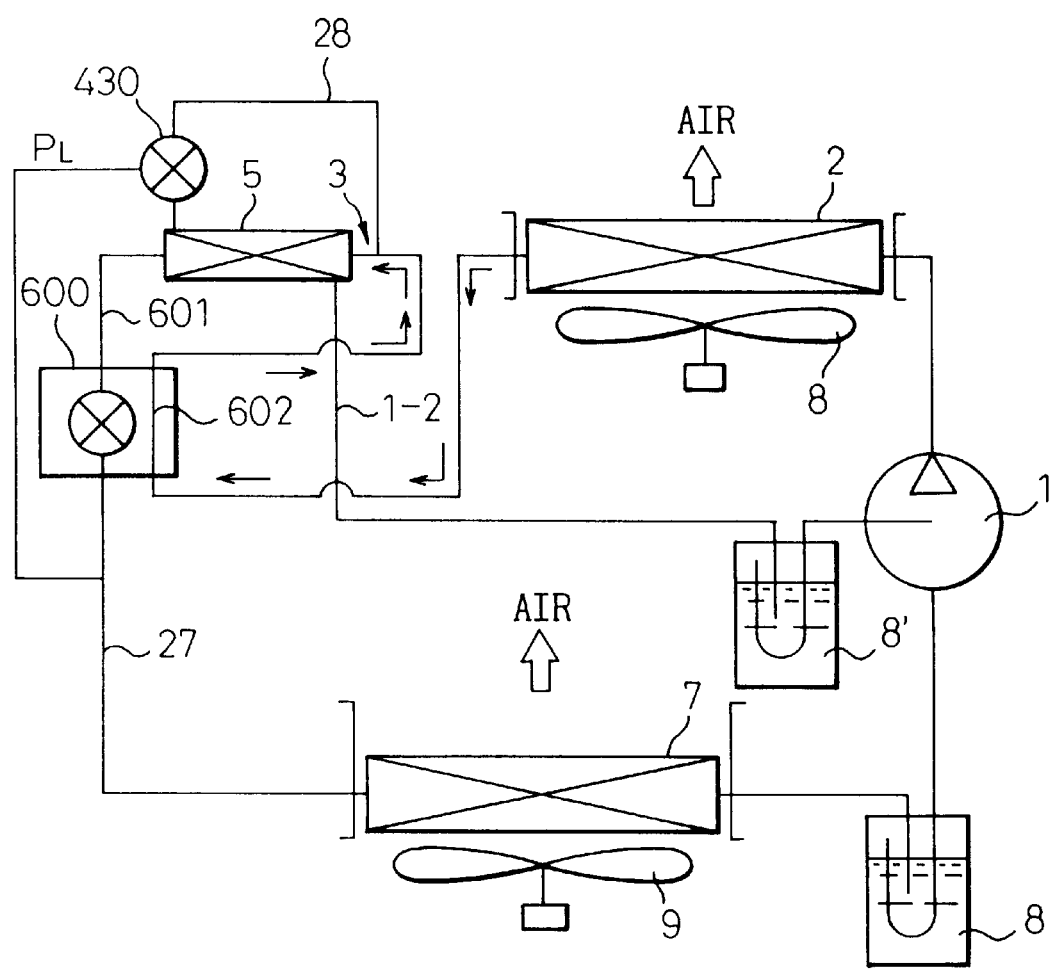
FIG. 14 shows a construction of the refrigerating system in a fourth embodiment.
Figure 15:
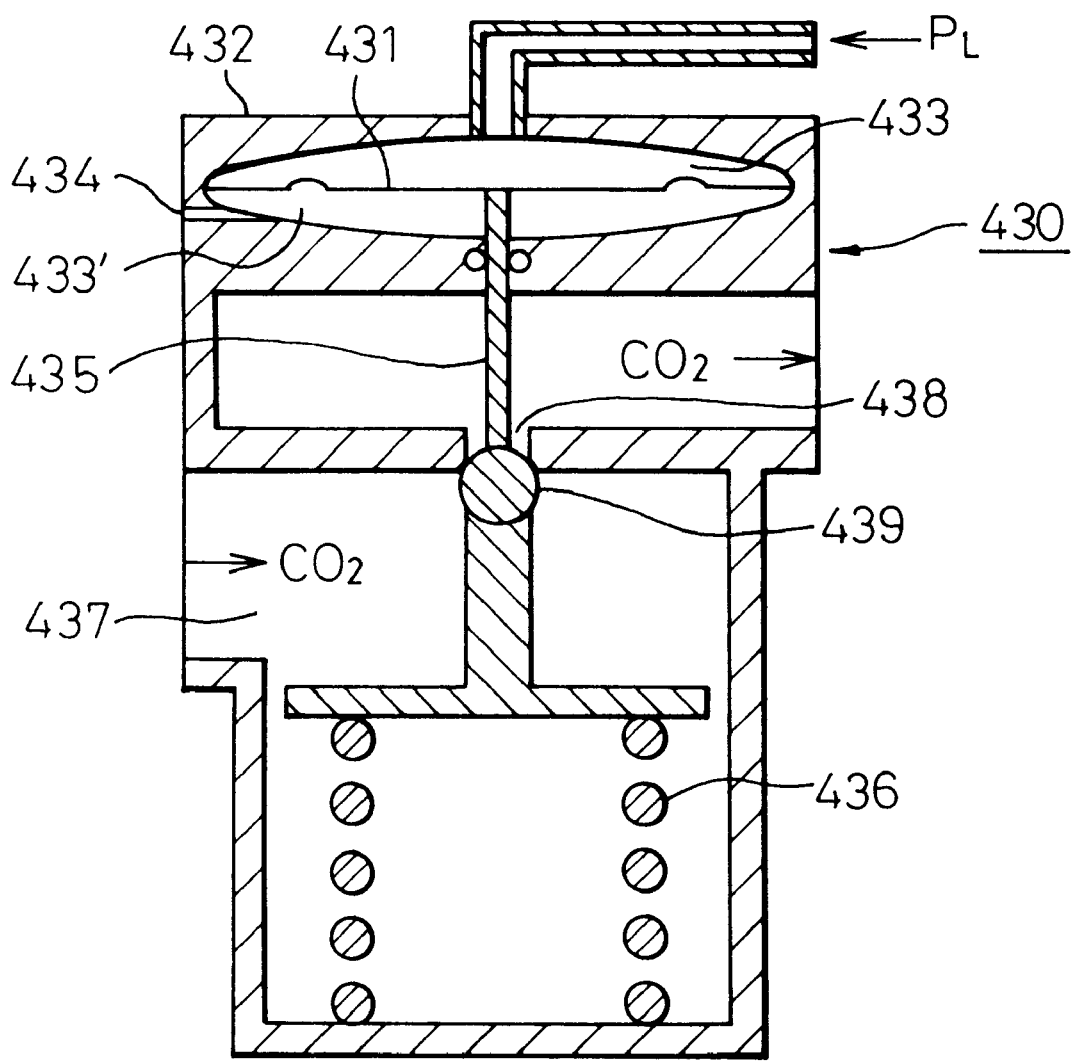
FIG. 15 is a cross sectional view showing a construction of a sub pressure reducer in FIG. 14.
Figure 16:
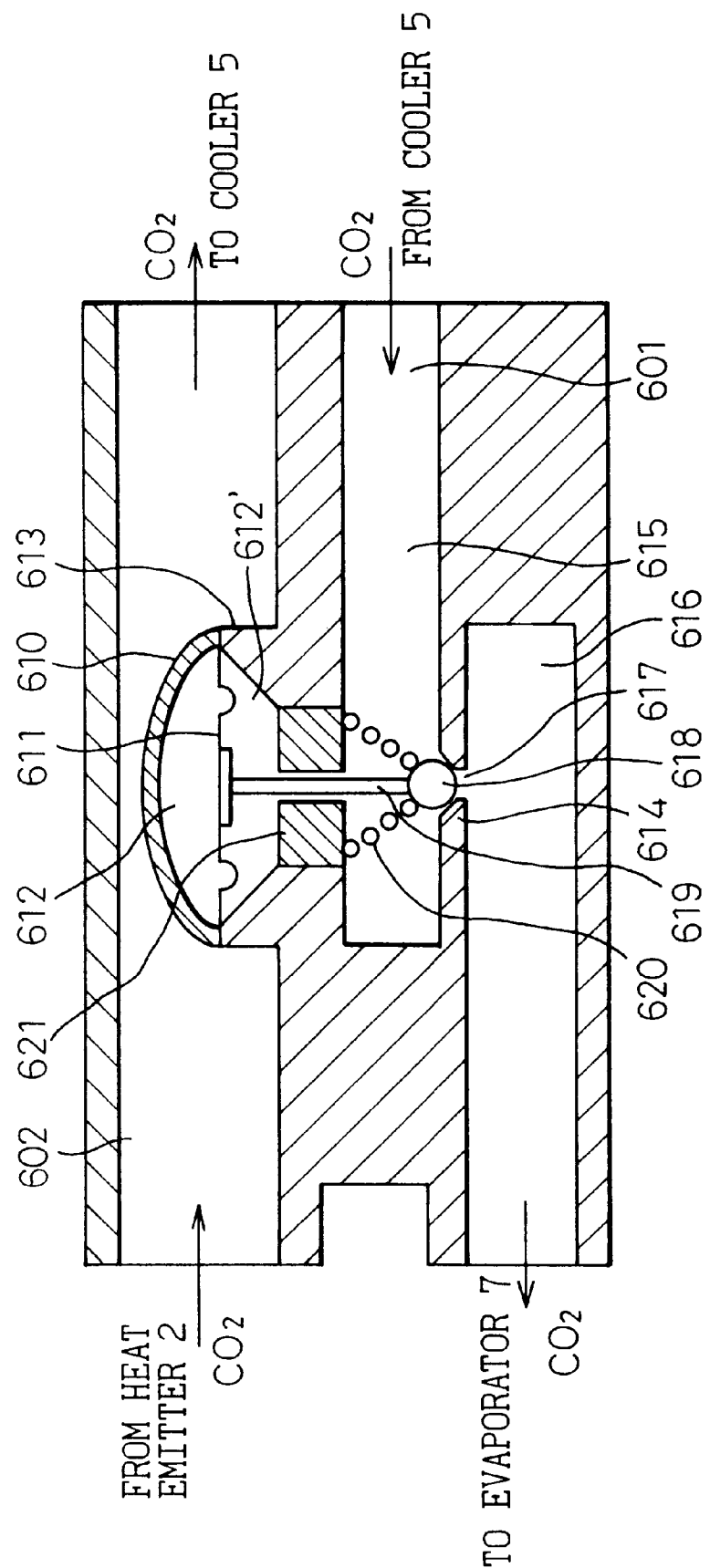
FIG. 16 is a cross sectional view showing a construction of a main pressure reducer in FIG. 14.

In FIG. 14, a reference numeral 600 denotes a main pressure reducer in this embodiment. In FIG. 16 which illustrates a detail of the main pressure reducer 600, the latter includes a housing 613 defining a passageway 601 for connecting the cooler 5 with the evaporator 7 and a passageway 602 for connecting the heat emitter 2 with the cooler 5, a valve cover 610, a diaphragm 611, a closed diaphragm chamber 612 between the housing and the cover 610, an opened diaphragm chamber 612', an upstream chamber 615, a downstream chamber 616, a valve port 617, a valve member 618, a valve rod 619, a return spring 620 and a spacer 621. In the closed space 612, the $CO_2$ is stored at a density of about 600 kg/cm³ with respect to the volume of the closed chamber 612 under a closed condition of the valve port 617. The housing 613 is further formed with a partition 614 dividing the chamber 615 and 616 with each other and forming the valve port 617, which is opened or closed by the valve member 618.

The valve member 618 is connected to the diaphragm 611 via the rod 619, while an arrangement of the spring 620 is such that the valve member 618 is seated on the valve port 617 under the force of the spring 620. The pressure in the closed chamber 612 generates a force for urging the diaphragm 611 to move downwardly against the force of the spring 620. Thus, the degree of the opening of the valve port 617 is determined by the lift of the valve member 618 which is determined in accordance with the difference between a downwardly directed force as a sum of a force of the spring 620 and a force of the pressure in the closed space 612 and an upwardly directed force of the pressure at the chamber 615, which is opened to the lower diaphragm chamber 612'. The spacer 621 is for controlling an initial load of the spring 620, which allows a predetermined load to be generated in the spring 620. In the illustrated embodiment, the value of co the initial set force of the spring 620 corresponds to one which corresponds to a pressure of 1MPa generated in the diaphragm 611.

Now, an operation of the second pressure reducer 612 will be explained. In the closed chamber 612, the $CO_2$ is sealingly stored under a pressure of about 600 kg/m³, which causes the pressure and the temperature in the chamber 612 to be varied along the isobaric pressure line of 600 kg/m³ as shown in FIG. 1. Thus, as will be easily seen from FIG. 1, when the temperature inside the sealed chamber 612 is 20° C., the inner pressure is about 5.8 MPa. Furthermore, the inside pressure in the closed chamber 612 and the initial set force of the coil spring 620 are simultaneously applied to the valve member 618. Thus, the total force applied to the valve member 618 is about 6.8 MPa. Thus, when the pressure at the chamber 615 on the side of the heat emitter 2 is lower than 6.8 MPa, the valve member 618 moves downwardly to close the valve port 617, while when the pressure at the chamber 615 exceeds 6.8 MPa, the valve member 618 moves upwardly to close the valve port 617.

Similarly, when the temperature inside the sealed chamber 612 is 40° C., the inner pressure is about 9.7 MPa. Thus, the total force applied to the valve member 618 is about 10.7 MPa. Thus, when the pressure at the chamber 615 on the side of the heat emitter 2 is lower than 10.7 MPa, the valve member 618 moves downwardly to close the valve port 617, while when the pressure at the chamber 615 exceeds 10.7 MPa, the valve member 618 moves upwardly to open the valve port 617.

As will be understood from FIG. 1, in the super critical area, the isobaric line of 600 kg/m³ substantially coincides with the above mentioned optimum control line $\eta_{max}$. Thus, the main pressure reducer 600 according to this embodiment can increase the pressure at the outlet side of the heat emitter 2 to those which are substantially located along the optimum control line $\eta_{max}$, which allows the refrigerating cycle using $CO_2$ to be effectively executed.

On the other hand, it is also clear from FIG. 1 that, in a region below the super critical point, i.e., a condensing area, the isobaric line of 600 kg/m³ below the super critical point is largely spaced from the optimum control line $\eta_{max}$. However, in this condensing area, the pressure inside the sealed space 612 is varied along the saturated liquid line SL. Furthermore, the coil spring 620 is provided for creating a initial set force in the valve member 618, so that a degree of super cooling of about 10° C. is obtained. Thus, even at the pressure below the critical pressure an effective operation of the refrigerating cycle using $CO_2$ is executed.

It is desirable that the density of the $CO_2$ stored at the closed space 612 is, from the practical view point, in a range from a value of a density of the saturated liquid when the temperature of $CO_2$ is 0° C. to a value of a density of the saturated liquid at the critical point of $CO_2$, and, in detail, in a range between 450 kg/m³ and 950 kg/m³.

As will be clear from the above operation of this embodiment, similar to the first embodiment, this embodiment can maintain an increased value of a coefficient of performance, while increasing a refrigerating performance and reducing a number of parts constructing the refrigerating system. In other words, an increased reliability is obtained, while reducing the production cost.

As will be understood from the above operation of this embodiment, it is desirable that the temperature at the closed space 612 of the main pressure reducer 600 is varied, without any accompanying delay, in accordance with the temperature at the outlet side of the heat emitter 2, which corresponds to the temperature of the $CO_2$ at the conduit 602. In view of this, in this embodiment, the valve cover 610 and the valve housing 613 are located in the passageway 602.

Furthermore, in this embodiment, it is desirable that, in order to obtain a heat conduction amount which is as large as possible, the valve cover 610 and the valve housing 613 must have a coefficient of a heat conduction of as large as possible and a thickness as large as possible. In view of this, in this embodiment, the valve cover 610 and the valve housing 613 are made of brass, and the diaphragm 611, a valve member 618, the coil spring 620 and the spacer 621 are made of a stainless steel. Furthermore, it may be possible that fins may be provided for increasing a heat transfer coefficient between the $CO_2$ in the passageway 602 and the valve cover 621.

Fifth Embodiment

In the fourth embodiment as described above, at the outlet of the cooler, the accumulator 8' is arranged in order to prevent liquid phase $CO_2$ being sucked into the compressor. The fifth embodiment features that the accumulator 8' is eliminated.

Figure 17:
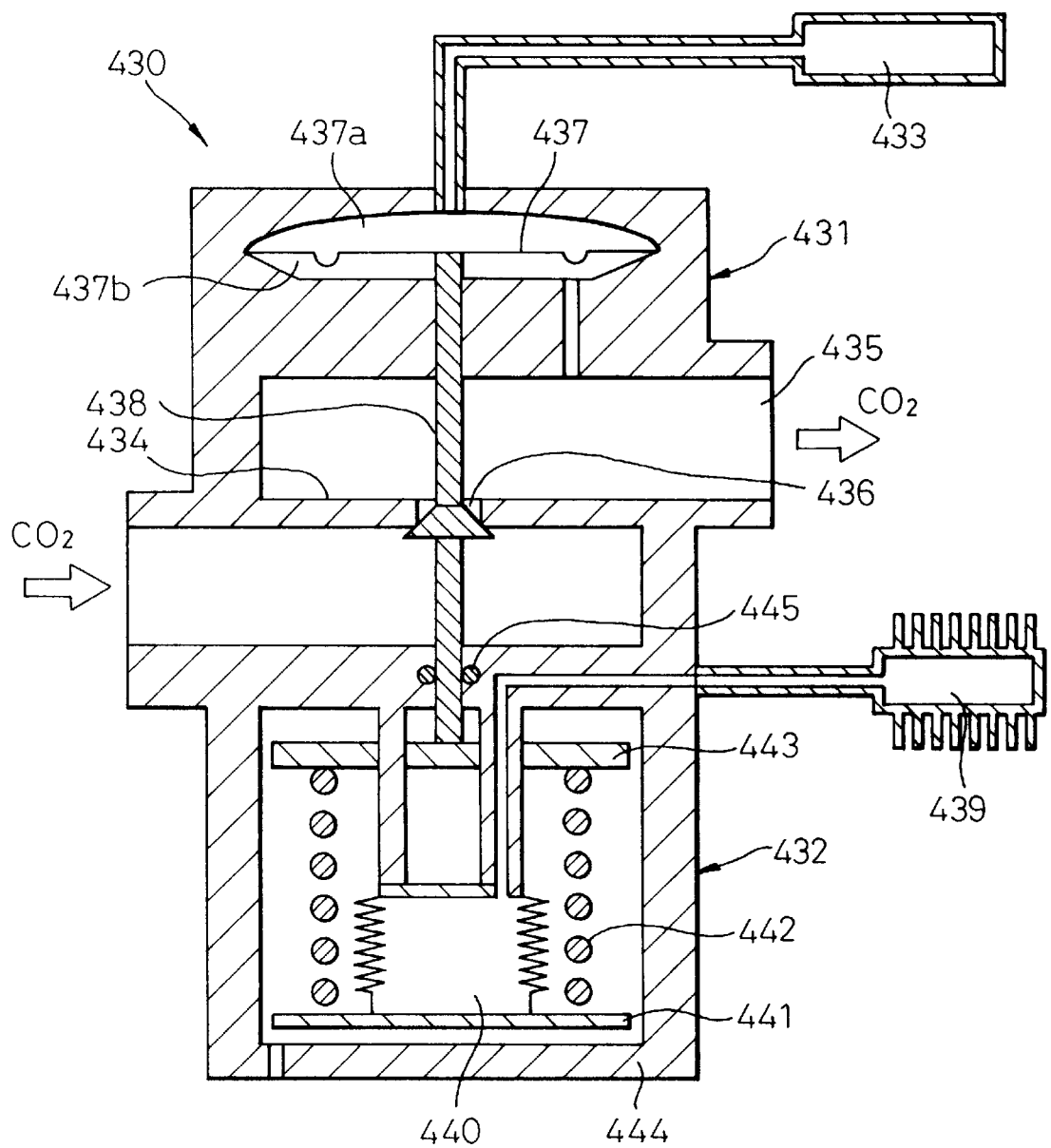
FIG. 17 illustrates a cross sectional view of a pressure reducer valve in a fifth embodiment.

Namely, the system in this fifth embodiment, as shown in FIG. 17 includes a sub pressure reducer 430, which is constructed by a device for controlling the degree of the opening of a controller 431 of the sub pressure reducer 430 in such a manner that the degree of a heating at the outlet side of the cooling device 5 does not exceed a predetermined value and a load responding part 432 which is for controlling the degree of the opening of the sub pressure reducer 430 in accordance with the thermal load in the evaporator 7.

Now, a construction of the sub pressure reducer 430 in the fifth embodiment will be explained. As shown in FIG. 17, the controller of the degree of the heating comprises a heat sensitive tube 433, which is arranged at the outlet side of the cooler 5 for detecting the temperature of CO, at the outlet side of the cooler 5, and a housing having a partition wall 434 for dividing the passageway for the $CO_2$ to be injected into an upstream portion and a downstream portion. The partition wall 434 is formed with a valve port 436, which is located between the upstream portion and the downstream portions. A diaphragm 437, which is responsive to the change in the pressure (temperature) at the heat sensitive tube 433, is provided and is connected to a valve member 438.

In the construction in FIG. 17, the diaphragm 437 forms, at its one side, a chamber 437a which is opened to the space inside the thermo sensitive tube 433 and, at its other side, a chamber 437b in communication with the passageway 435 downstream from the valve port 436. The pressure at the chamber 437a urges, via the diaphragm 437. The valve member 438 to move so that the degree of the opening of the valve port 436 is increased. Contrary to this, the pressure in the chamber 437b together with the spring 442 causes the valve member 438 to move so that the degree of the opening of the valve port 436 is reduced.

Now, a construction of the load sensing section 432 will be explained. A reference numeral 439 denotes a thermo-sensitive tube arranged at a location downstream from the evaporator in the air flow or at a location at the outlet of the $CO_2$ from the evaporator 7. Inside the thermo-sensitive tube 439, a gas such as a flon or propane is sealingly stored at a predetermined density. The gas sealed space of the thermo-sensitive tube 439 is in communication with a bellows 440. A first plate 441 is connected to the bellows 440 at its one end in a direction of a contraction or expansion movement of the bellows 440. To the opposite side of the bellows 440, a second plate 443 is arranged, so that the second plate 443 is connected to the first plate 441 via a spring 442. Connected to the second plate 443 is the valve member 438 of the heating degree controller 430. The spring 442 generates a spring force, which causes the valve member 438 to be moved so that the valve port 436 is closed by the valve member 438. Finally, the bellows 440 is, at its upper end, fixedly connected to a part of the housing 444, so that the space inside the bellows 440 is in a communication with the space inside the thermo-sensitive tube 439 via a passageway in the housing 444. The arrangement of the bellows 440 is such that, the more the bellows 440 stretched, smaller the force of the spring 442, thereby reducing the degree of the heating at the outlet side of the cooler 5. Finally, in FIG. 17, a reference numeral 445 is an O-ring which prevents the pressure in the $CO_2$ passageway 435 from being opened to the chamber in which the bellows 440 is arranged.

Now, operation of the sub pressure reducer 430 in the fifth embodiment will be explained. An increase in a thermal load of the evaporator 7 causes the pressure to be increased at the space inside thermo-sensitive tube 439, which causes the bellows member 440 to be extended, resulting in an upward movement of the first plate 441. Due to this upward movement of the first plate 441, the degree of the opening of the valve port 436 is increased, which causes the degree of the super-heat to be decreased at the outlet side of the cooler 5. A further increase in the thermal load at the evaporator 7 finally causes the first plate 441 to contact the housing 444, which prevents the degree of heating from being reduced further increased, i.e., the minimum value of the degree of heating is obtained.

Contrary to this, a decrease in a thermal load of the evaporator 7 causes the pressure to be reduced at the space inside thermo-sensitive tube 439, which causes the bellows member 440 to be contracted, resulting in a downward movement of the first plate 441. Due to this downward movement of the first plate 441, the degree of the opening of the valve port 436 is decreased, thereby reducing a flow amount of $CO_2$, which reduces the enthalpy difference between the inlet and the outlet of the evaporator 7.

In this aspect of the invention as explained with reference to FIGS. 1 to 18, the compression by the compressor 1 is executed by a series of compressors. In this case, a ratio of the volume $V_d$ of the second compressor to the volume $V_s$ of a first stage compressor, in a range 0.8 to 1, corresponds to the ratio of the pressure difference $\Delta P_s$ to the pressure difference $\Delta P_d$, in a range 0.6 to 0.9.

On the other hand, a single compressor may have a first operating chamber adjacent the evaporator 7 and a second operating chamber adjacent the heat emitter. In this case, the ratio of the volume $V_d'$ of the second (high pressure) operating chamber adjacent to the heat emitter to the volume $V_s'$ of the first (low pressure) operating chamber adjacent the evaporator 7 may be in a range 0.8 to 1.

Second Aspect of the Invention

Sixth Embodiment

A sixth embodiment of the present invention, which will now be explained, is directed to a second aspect of the present invention, which is directed to an increase in a cooling capacity. Namely, as explained with reference to FIG. 1 regarding the first embodiment of the present invention, the coefficient of a performance is a ratio of the change in the enthalpy, $\Delta i$ at the evaporator to the compression work $\Delta L$. Thus, the maximum value of the coefficient of performance does not necessarily provide a cooling capacity for obtaining a desired cooling effect in the cabin. In order to combat this problem, it is the key idea in this aspect of the invention that a control of a pressure reducer is done so that a desired cooling capacity is obtained. Now, a detail of the embodiment will be explained with reference to FIG. 18.

Figure 18:
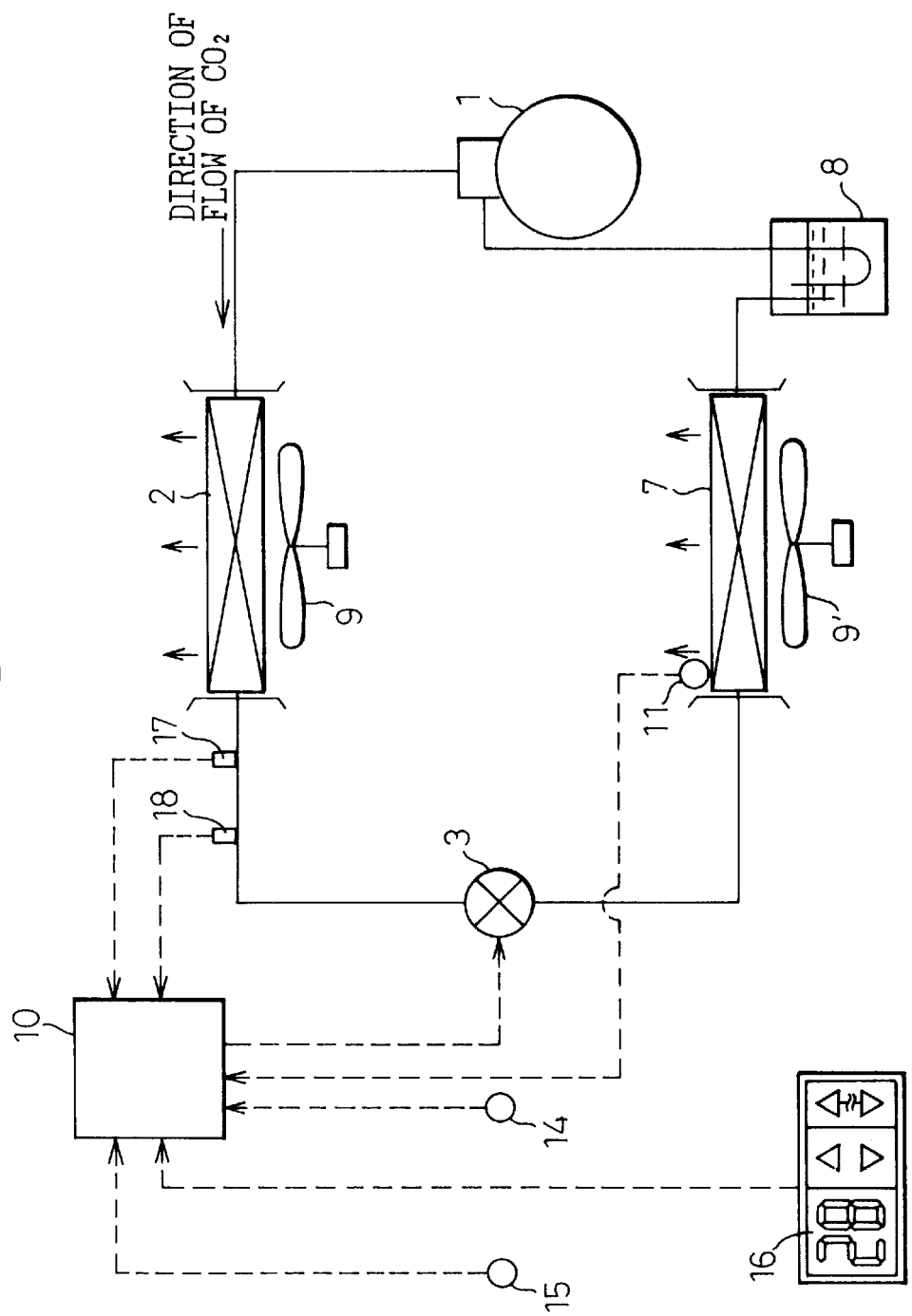
FIG. 18 shows a construction of the refrigerating system in a sixth embodiment.

In FIG. 18 showing a construction of the refrigerating system in the embodiment and parts with functions to similar those in the first embodiment (FIG. 2) are indicated by the same reference numerals. Namely, the refrigerating system is basically constructed by the compressor 1, the heat emitter 2, the pressure reducer 3, the evaporator 7 and the accumulator 8. Unlike the first embodiment, the refrigerating system in FIG. 18 is not provided with the sub pressure reducer 4, and the heat exchanger 5 and the $CO_2$ injection conduit.

In this embodiment, the pressure reducer 3 functions also as a pressure control means for controlling the pressure at the outlet side of the heat emitter 2 in accordance with the pressure at the outlet side of the temperature of the $CO_2$. Namely, as will be fully explained later, the pressure at the outlet side of the heat emitter 2 is increased to a predetermined value and then reduced, thereby producing a gas-liquid combined state of the $CO_2$. A detailed construction of the pressure reducer 3 is similar to that is shown in FIG. 3 with reference to the sub pressure reducer in the first embodiment.

As in the first embodiment, the control circuit 10 is connected to the evaporator-downstream air sensor 11, the cabin air temperature sensor 14, the outside air temperature sensor 15, the temperature setter 16, the emitter outlet $CO_2$ temperature sensor 17 and the emitter outlet pressure sensor 18 and functions to control the operation of the pressure reducer 3 as will be fully explained later. The control circuit also functions, in a well known manner, to control an air mix door (not shown) and the fan 9', so that an amount and a temperature of the air discharged to the cabin are controlled.

In FIG. 1, the pressure at the outlet of the heat emitter 2 located on the optimum control line A=o (FIG. 1) is not univocally determined by the temperature of the $CO_2$ at the outlet of the heat emitter 2 but by a variation in the pressure in the evaporator 7, i.e., a variation in a heat amount imparted to the evaporator 7, which corresponds to a thermal load of the evaporator 7. On the other hand, in vapor compression type refrigerating systems, including one using $CO_2$, a continuation of an operation causes the cabin temperature to be gradually stabilized to an equalized value which is determined by the evaporating temperature of the refrigerant, the heat exchanging capacity of the evaporator 7 and a heat inflow from the atmosphere to the cabin. In other words, the pressure variation on the side of the evaporator 7 is gradually stabilized. Thus, under a continuating operation of a refrigerating system except for a cool-down operation, the pressure at the evaporator 7 is prevented from being rapidly changed so long as a rapid change of the atmospheric air temperature does not occur. Thus, it will be practically sufficient if a determination of the optimum control line $\eta_{max}$ is done in accordance with the pressure at the evaporator 7 which corresponds to the evaporating temperature of the $CO_2$ in the evaporator 7. As explained with reference to the first embodiment, FIG. 8 shows a target pressure (a first target pressure) with respect to the inlet side pressure of the pressure reducer 3, i.e., pressure at the outlet of the heat emitter 2, when the pressure at the evaporator 7 is 3.5 MPa which corresponds to the $CO_2$ evaporating temperature (0° C.). In this regard, according to a test by the inventor, under a condition that the pressure at the outlet of the heat emitter is below the critical pressure, an increased coefficient of a performance for a desired operating of the refrigerating system using the $CO_2$ is obtained when the degree of a sub-cool at the inlet of the pressure reducer 3 is in a range of 1 to 10° C. Thus, the calculation of the line in FIG. 8 is done so as to obtain a degree of super heating of 3° C.

During a rapid cooling operation, the pressure at the evaporator 7 is increased, which causes the temperature of the $CO_2$ in the evaporator 7 as well as the pressure at the evaporator 7 to be increased. As a result, a sufficient refrigerating capacity for a desired refrigerating capacity of the refrigerating system using $CO_2$ cannot be obtained by the target pressure for the maximum value of the coefficient of a performance at the pressure of the evaporator of 3.5 MPa.

In order to combat this problem, in an increased condition of the thermal load in the evaporator 7 such as a rapid cooling (cool-down) condition, the sixth embodiment increases, in accordance with the increase in the load, the target pressure to a value larger than the first target value by reducing the degree of the opening of the pressure reducer 3, thereby increasing the refrigerating capacity.

Figure 19:
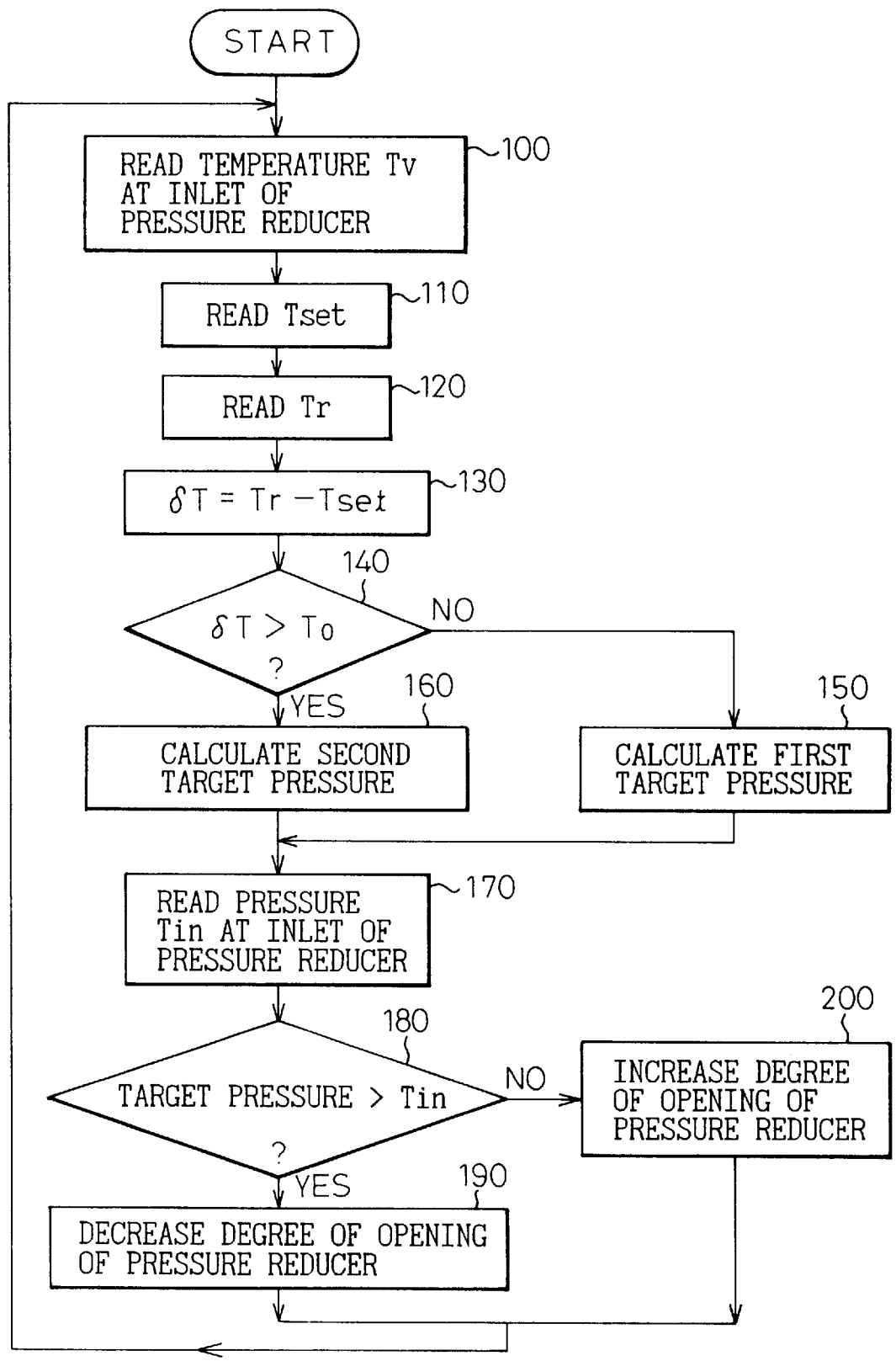
FIG. 19 is a flow chart illustrating an operation of the embodiment in FIG. 18.

Now, an operation of the sixth embodiment will be explained with reference to the flow chart in FIG. 19. In FIG. 19, an energization of a not shown switch causes the $CO_2$ refrigerating system to be operated, thereby commencing the routine in FIG. 19. At step 100, a temperature $T_v$ of the $CO_2$ at the inlet of the pressure reducer 3 measured by the temperature sensor 17 is read out. At step 110, a temperature $T_{set}$ set by the setter 16 manipulated by a driver or passenger is read out. At step 120, a temperature $T_r$ of the cabin detected by the room temperature sensor 14 is read out. At step 130, a difference $\delta T$ between the room temperature and the set temperature, $T_r - T_{set}$ is calculated. At step 140, a determination is done that the temperature difference $\delta T$ is larger than a predetermined value $T_0$. A result of a determination of $\delta T \leq T_0$ indicates that the thermal load of the evaporator 7 is smaller than a predetermined value and the routine goes to step 150, where a calculation of the first target value is done by using a table corresponding to the relationship between the temperature at the inlet of the pressure reducer 3 and the target value of the pressure of the $CO_2$ at the inlet of the pressure reducer 3, as shown in FIG. 8. Namely, an interpolation using the map is done to calculate the first target value corresponding to the temperature $T_v$ at the inlet of the pressure reducer 3 detected by the temperature sensor 17.

Figure 20:
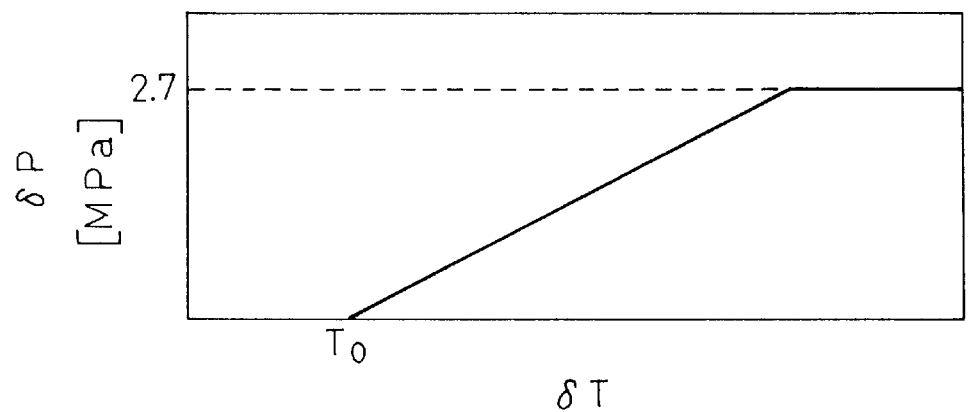
FIG. 20 is a relationship between the temperature difference $\delta T$ between the cabin temperature $T_r$ and the set temperature $T_{set}$ and the pressure increase $\delta T$.

A result of a determination of $\delta T > T_0$ at step 140 indicates that the thermal load of the evaporator 7 is larger than a predetermined value, i.e., a rapid cooling mode and the routine goes to step 160, where a calculation of the second target value is done as the first target value plus a pressure increase. Namely, FIG. 20 shows a relationship between the temperature difference $\delta T$ between the cabin temperature $T_r$ and the set temperature $T_{set}$ and the pressure increase $\delta T$. This relationship is stored in a memory in the control circuit 10 and an interpolation using the map is done to calculate the pressure increase $\delta P$ corresponding to the value of the pressure difference $\delta T$ obtained at the step 130. Then, the second target pressure is obtained by adding the calculated pressure difference $\delta P$ to the first target value calculated by the temperature $T_v$ at the inlet of the pressure reducer 3 in the similar way as that in step 150 by using the map in FIG. 8.

At step 170, a pressure $T_{in}$ at the inlet of the pressure reducer 3 detected by the pressure sensor 18 is read out. Then, at step 180, it is determined if the first or second target pressure calculated at step 150 or 160 is larger than the detected pressure $T_{in}$ at the inlet of the pressure reducer 3 by the sensor 18. A determination that the target pressure is larger than $T_{in}$ causes the routine flows into a step 190, where the pressure reducer 3 is controlled so that the degree of the opening is reduced. Contrary to this, a determination that the target pressure is equal to or smaller than the detected pressure $T_{in}$ causes the routine to go to step 200, where the pressure reducer 3 is controlled so that the degree of the opening is increased. After the step 190 or 200, the above steps are repeated.

It should be noted that an unlimited increase in $\delta P$ causes the coefficient of a performance to be highly reduced. Thus, according to present invention, $\delta P$ has the maximum value of 2.7 MPa as shown in FIG. 20.

As explained above, according to this embodiment, when a decision is obtained that the thermal load of the evaporator is stable due to the fact that the load of the evaporator 7 is equal to or smaller than the predetermined value, i.e., a NO result at step 140, the pressure at the inlet of the pressure reducer 3 is controlled so that it is equal to the first target value (step 150). Thus, the $CO_2$ refrigerating cycle is executed while maintaining an increased coefficient of performance. On the other hand, when a decision is obtained that a rapid refrigerating operation is required, i.e., a YES result at step 140, the pressure at the inlet of the pressure reducer 3 is controlled so that it is equal to the second target value (step 160). Thus, the degree of the opening the pressure reducer 3 is decreased in accordance with the increase in the thermal load, thereby increasing the pressure of $CO_2$ at the inlet of the pressure reducer 3. Thus, a desired refrigerating capacity is obtained even if the refrigerating load is increased in the rapid refrigerating operation. In short, according to present invention, the $CO_2$ refrigerating system is executed with a high efficiency, while obtaining a sufficient cooling capacity even under a high load condition such as a rapid refrigerating mode.

Furthermore, in the vapor compression type refrigerating system where, during an execution of the refrigerating cycle, a refrigerant such as a flon is under a pressure lower than the critical pressure, a variation in the outlet pressure is small compared to the $CO_2$ refrigerating system. Thus, in the flon refrigerating system, an increase or decrease in the refrigerating capacity is mainly determined by an increase or decrease by an amount of the refrigerant (flon) recirculated in the system. In other words, the refrigerating capacity of the system is determined substantially only by the maximum flow amount of the flon. Thus, an increase in the flow amount of the refrigerant for increasing the refrigerating capacity necessarily causes the size of the compressor to be increased.

Contrary to this, in the refrigerating system using the $CO_2$ according to present invention, an increase or decrease of the refrigerating capacity is done by an increase or decrease of the pressure at the outlet of the heat emitter 2, i.e., the pressure at the inlet of the pressure reducer 3. Thus, a capacity of the compressor 1 is decided based on the mass flow amount of the $CO_2$ under a thermally stable condition of the evaporator 7, thereby preventing the size of the compressor 1 from being increased.

Seventh Embodiment

In the sixth embodiment, the thermal load of the evaporator 7 is determined by detecting the difference $\delta T$ in the temperature $T_r$ in the cabin and the set temperature $T_{set}$. However, in this embodiment, a temperature setting means in FIG. 18 constructed by the sensor 12 for detecting the room temperature 12 and the temperature setter 16 is eliminated in order to reduce the production cost.

Figure 21:
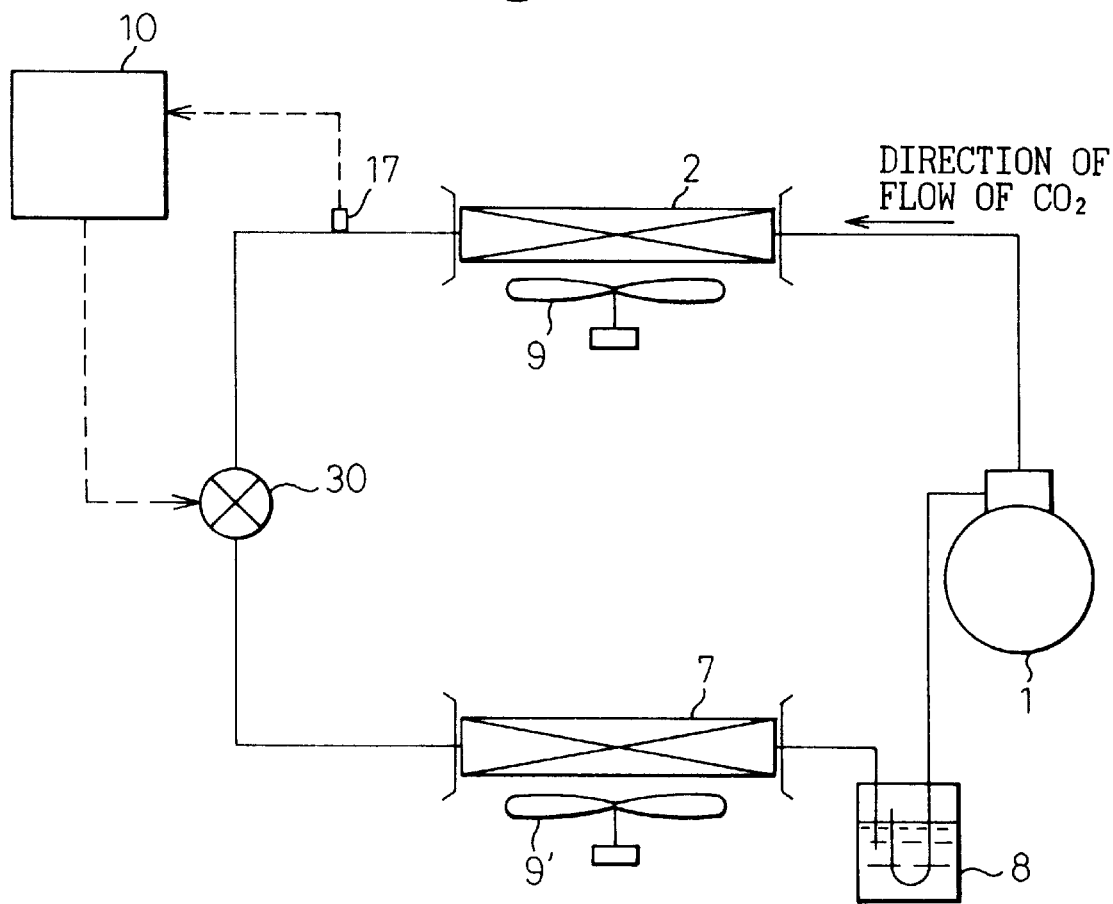
FIG. 21 shows a construction of the refrigerating system in a seventh embodiment.

Thus, in the seventh embodiment, as shown in FIG. 21, a pressure reducer 30 is provided. A means is provided for controlling the degree of the opening of the pressure reducer 30 such that the difference $\Delta P$ between the pressure at the outlet of the heat emitter 2, i.e., the inlet of the pressure reducer 30 and the pressure at the inlet of the evaporator 7, i.e., the outlet of the pressure reducer 30 is controlled to a target pressure difference which is determined in accordance with the temperature of the $CO_2$ at the outlet of the heat emitter 2 (the inlet of the pressure reducer 30).

Now, a detail of a construction of the pressure reducer 30 will be explained with reference to FIG. 22. Namely, the pressure reducer 30 includes a housing 50 defining an inlet port 51A connected to the heat emitter 2, an outlet port 51B connected to the evaporator 7, a valve port 52, a valve member 54 facing the valve port 52, a spring 56 urging the valve member 54 to close the valve port 52, a step motor 58 for generating a rotating movement and a shaft 60 for adjusting a spring force of the spring 56. The coil spring 56 is at its one end rested on a first spring seat 62, which is connected to the valve member 54 and at its other end rested on a second spring seat 64 for adjusting the spring force of the spring 56. The second spring seat 64 is formed with a female screw thread 64a, to which a male screw portion 60a of the screw shaft 60 engages and with an axial groove to which a key 66 is engaged. As a result, a rotating movement of the adjusting shaft 60 by the step motor 58 causes the second spring seat 64 to be axially moved, thereby changing the spring force of the spring 56. An O-ring 68 is arranged co between the housing 50 and the shaft 60 for a desired sealing function. The refrigerating system executing the refrigerating cycle using $CO_2$ generates a pressure which is about eight times larger than that in the conventional refrigerating system using flon. Thus, it is desirable that the O-ring 68 is located at a position as near as possible to the outlet port 51B. Finally, the step motor 58 is subjected to a control so that a target pressure difference is obtained in accordance with the temperature of $CO_2$ at the inlet of the pressure reducer 30.

Now, an operation of the seventh embodiment will be explained. At the side of the inlet 51A of the valve member 54, the pressure at the inlet 51A of the pressure reducer 30 generates a force $F_1$ in the valve member 54 for causing it to be moved upwardly to open the valve port 53. On the side of the outlet 51B, the pressure at the inlet of the evaporator 7 and the spring 56 generate a force $F_2$ in the valve member 54 to cause it to be moved downwardly to close the valve port 52. Thus, when the force $F_2$ is larger than the force $F_1$, the valve member 54 is moved downwardly to reduce the degree of the opening of the valve port 52. Contrary to this, when the force $F_2$ is smaller than the force $F_1$, the valve member 54 is moved upwardly to increase the degree of the opening of the valve port 52. Since the valve member 54 is stopped at a position where the forces $F_1$ and $F_2$ are equalized, the degree of the opening of the valve port 52 is determined in accordance with the spring force 56 generated in the spring 56. In other words, a pressure difference $\Delta P$ between a space 70A adjacent the inlet 51A and a space 70B adjacent the outlet 51B corresponds to the spring force applied to the valve member 54 from the spring 56. Furthermore, a lift of the valve member 54 is relatively small, so that a change in the spring force applied to the valve member 35 from the coil spring 36 is substantially negligible. Thus, a pressure difference $\Delta P$ between the spaces 70A and 70B is considered to be constant.

The following is a discussion of the pressure difference $\Delta P$. When the pressure in the evaporator 7 is reduced lower than an icing point (0° C.), the evaporator 7 becomes covered with frost, which causes the refrigerating capacity to be reduced at the evaporator 7. Thus, it is desirable that the temperature at the evaporator 7 is higher than the icing point. However, a mere increase in the temperature of the evaporator 7 causes a cooling of the discharged air to be less effective. Thus, in an operation of this seventh embodiment, as in the sixth embodiment, the pressure difference $\Delta T$ is one which is obtained between the spaces 70A and 70B when the inlet of the evaporator 7 is at a vapor pressure corresponding the evaporating temperature of the $CO_2$ (3.5 MPa at 0° C. as shown in FIG. 1) and the pressure at the outlet of the heat emitter 2 is at the pressure on the optimum control line $\eta_{max}$ (the first target pressure). In other words, an operation the pressure reducer 30 by the control circuit 10 is such that the first target value is calculated in accordance with the temperature of the $CO_2$ by using the map in FIG. 8, and the step motor 58 of the pressure reducer 30 is operated to adjust the force of the spring 56 in order to obtain a pressure difference $\Delta P$ which corresponds to the difference between the calculated first target value and the evaporating pressure with respect to the evaporating temperature of $CO_2$ (0° C. at 3.5 MPa).

Figure 23:
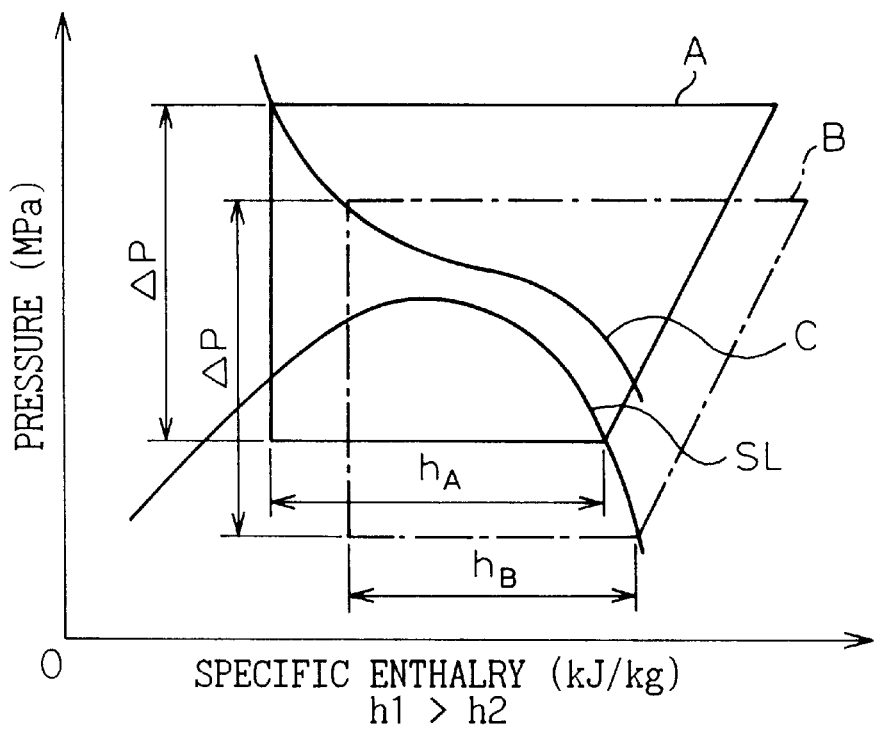
FIG. 23 shows schematically a Mollier chart of the system in FIG. 21.
Figure 24:
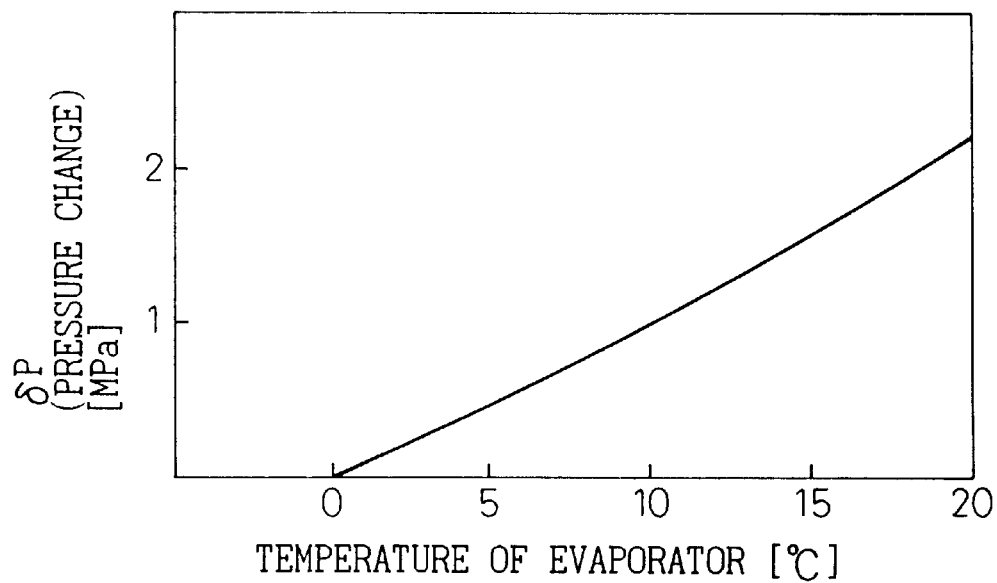
FIG. 24 shows a relationship between the temperature at the evaporator and a pressure difference.

FIG. 23 shows relationships between a specific enthalpy and the pressure (Mollier chart) in the refrigerating system according to the seventh embodiment of the present invention. A solid line A is produced when the refrigerating capacity (thermal load) is high, while a dotted line p is produced when the refrigerating capacity is low. A solid line SL indicates a saturated liquid line, and a solid line C is an isothermal line. In case of the large thermal capacity shown by the curve A, the temperature of the air cooled by the evaporator 7 is high. In other words, in accordance with the increase in the thermal load increases, the temperature at the evaporator 7 is increased and the pressure in the evaporator 7 and the evaporating pressure of the $CO_2$ are increased. See FIG. 24. As a result, an increase in the force $F_2$ is obtained for urging the valve member 54 to move downward, thereby reducing the degree of the opening of the valve port 52, so that the pressure at the outlet of the heat emitter 2, i.e., the pressure at the inlet of the pressure reducer 3 is increased.

Thus, an increased difference in a specific enthalpy between the inlet and the outlet of the evaporator 7 is obtained as shown by $h_A$ in FIG. 23, thereby increasing the refrigerating capacity. The thermal load in the evaporator 7 is gradually stabilized to the evaporating pressure 3.5 MPa corresponding to the evaporating temperature of $CO_2$, which causes the force $F_2$ to be reduced while the degree of the opening of the valve port 34 is decreased. Thus, the pressure at the outlet of the heat emitter 2 is reduced to a condition as shown by the curve B, which causes the pressure at the outlet of the heat emitter 2 to approach the pressure (first target value) on the optimum control line $\eta_{max}$. Thus, according to the present invention, the refrigerating cycle using $CO_2$ is executed at an increased efficiency, while generating a sufficient refrigerating capacity suitable for an operation of an increased thermal load, such as a rapid cooling mode.

In the seventh embodiment, in order to detect the thermal load on the evaporator 7, both of the temperature sensor and the temperature setter in the sixth embodiment are eliminated and a similar function is obtained by controlling an execution of the $CO_2$ refrigerating cycle by a simple means for controlling a degree of an opening of the valve port 52 so that a predetermined value of a pressure difference is obtained between the outlet of the heat emitter 2 and the inlet of the evaporator 7. Thus, a reduction of a production cost of the refrigerating system is realized.

Figure 22:
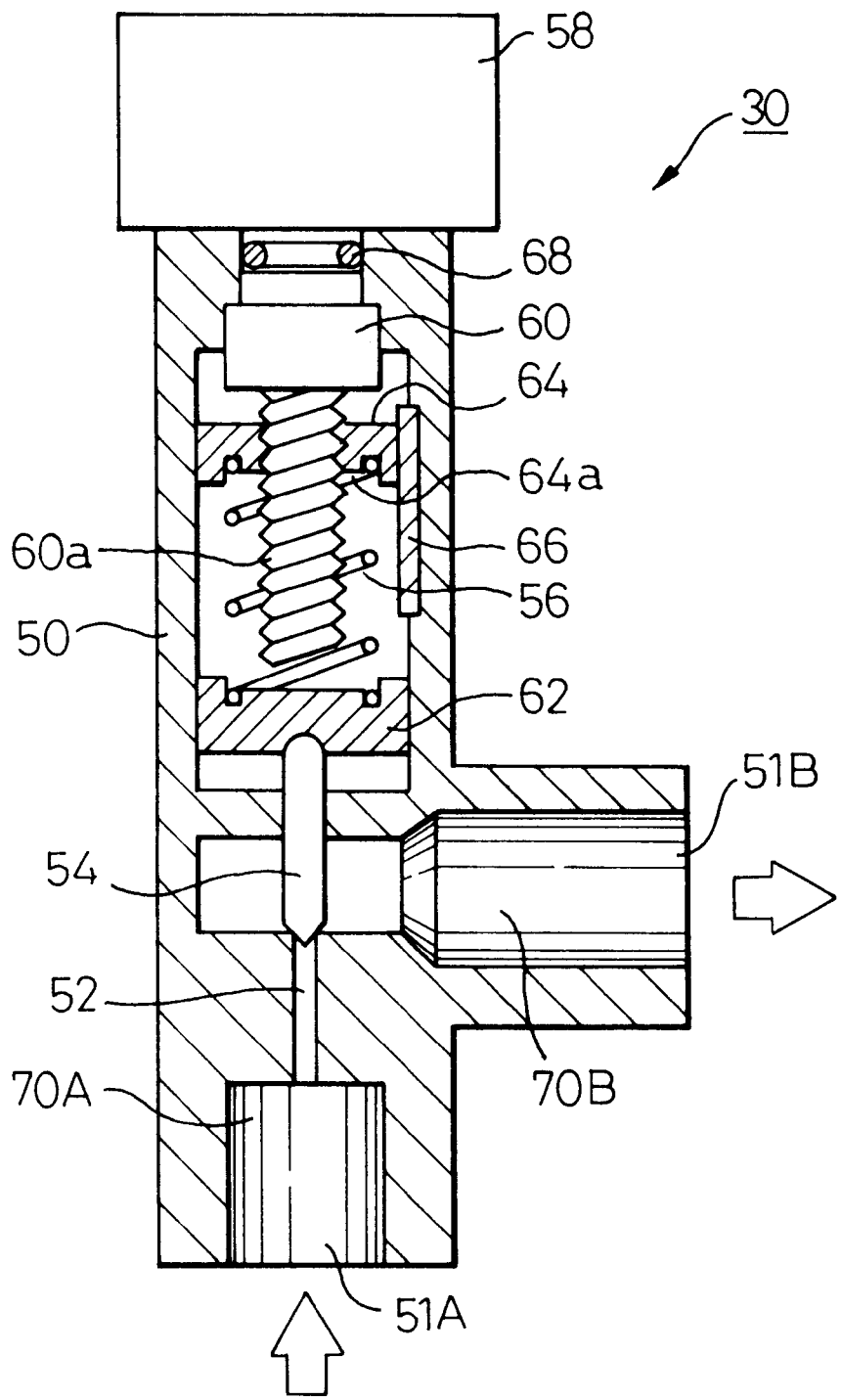
FIG. 22 is a detail of pressure reducer in FIG. 21.

In FIG. 22, the pressure of the $CO_2$ recirculated in the system is directly applied. However, a pressure at the outlet or inlet of the evaporator 7 is taken out by a capillary tube, and is used for operating the valve member 54 via a diaphragm.

Eighth Embodiment

Figure 25:
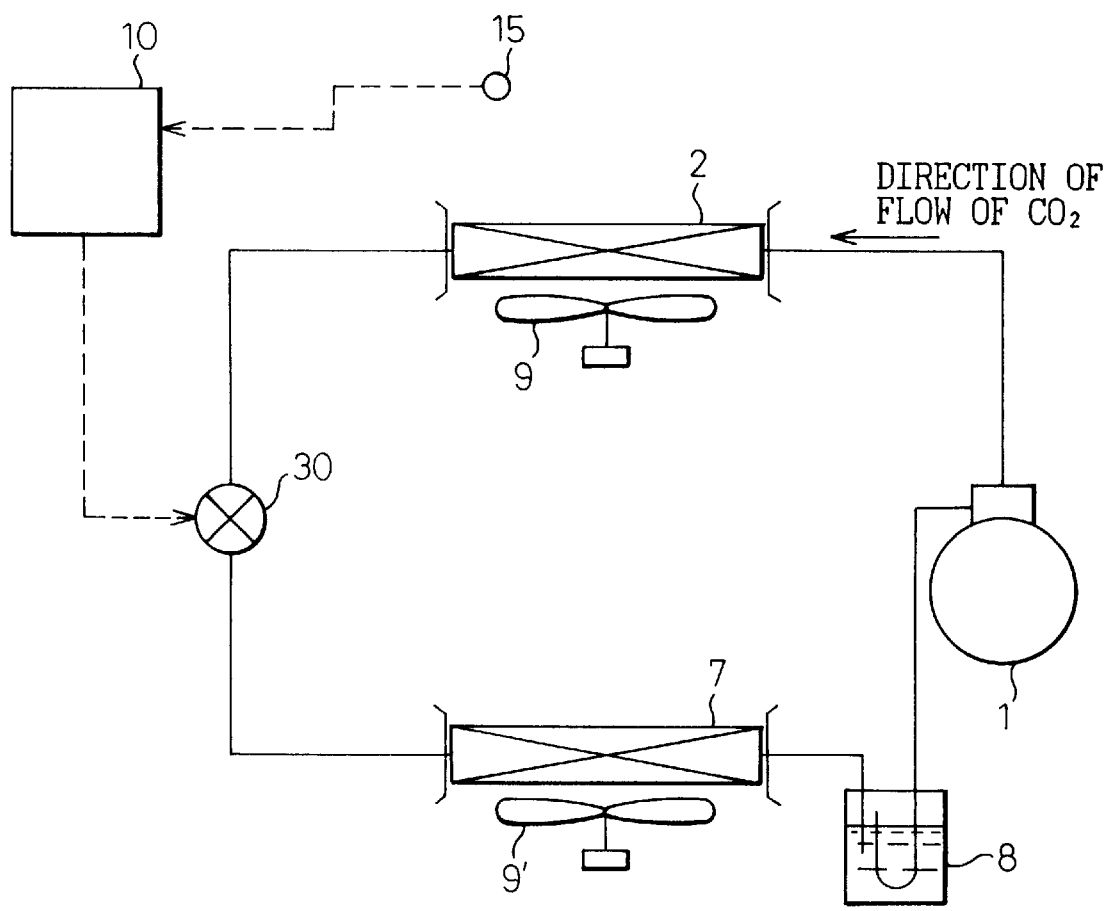
FIG. 25 shows a construction of the refrigerating system in an eighth embodiment.

In the seventh embodiment, a temperature of the $CO_2$ at the outlet of the heat emitter 2 is detected by the temperature sensor. Contrary to this, in this eighth embodiment, the temperature sensor is eliminated. Namely, in place of detecting the temperature of the $CO_2$ at the outlet of the heat emitter 2, an estimation of the temperature is done based on the temperature of the cabin detected by the sensor 15 as shown in FIG. 25 and the estimated temperature of the $CO_2$ at the outlet of the heat emitter is used for controlling the execution of the refrigerating cycle. In more detail, the temperature of $CO_2$ at the outlet of the heat emitter 2 is substantially determined by the outside air temperature and the refrigerating capacity of the heat emitter 2. Thus, a test is done to obtain a relationship between the outside air temperature and the temperature of $CO_2$ at the outlet of the heat emitter 2. Such a relationship is stored in a map in the computer 10, and a map interpolation calculation is done in order to calculate the temperature of the $CO_2$ at the outlet of the heat emitter 2 which corresponds to the detected outside air temperature sensed by the outside air temperature sensor 15 in FIG. 25.

In the construction of the seventh embodiment, in order to detect a temperature of the $CO_2$ at the outlet of the heat emitter 2, it is necessary that the sensor is arranged at a location adjacent the outlet of the heat emitter 2, while the temperature sensor is provided with an insulator for thermally insulating the sensor from the outside atmosphere. Thus, a cost for the material for the heat insulation is added and working steps for attaching the temperature sensor and the heat insulating material is necessary, which increases the production cost of the refrigerating system. Contrary to this, according to this eighth embodiment, the provision of the temperature sensor is eliminated, which, on one hand, prevents a cost for the heat insulating material from being added and working steps for the attachment of the temperature sensor and the heat insulating material are eliminated, on the other hand. As a result, an increase in the production cost is prevented.

Furthermore, according to this eighth embodiment, for the sensor 15 for detecting an outside air temperature, an outside air temperature sensor is used, which is an essential part for a conventional air conditioning system for executing an automatic air control. In other words, a separate sensor 15 is unnecessary, which also serves for further reducing the production cost.

In the embodiment in FIG. 22, the force of the spring 56 is controlled by the step motor 58. In place of this, a pressure at the evaporator 7 is introduced into the pressure reducer, so that the pressure operates a pressure responsive member such as a diaphragm for CD controlling the spring force of the coil spring 56.

Furthermore, in place of controlling the pressure difference by the spring 56, a pressure at the LU evaporator 7 is detected, and an electric actuator is operated for controlling a degree of opening of the valve.

Furthermore, the pressure sensor 18 can detect the pressure at the inlet of the heat emitter 2. However, it is necessary to compensate for the pressure loss in the case where the pressure loss is large.

In the second aspect of the invention, the accumulator 8 is eliminated. In this case, the refrigerant in the evaporator 7 is sucked and operates in the same way as the $CO_2$ recirculating system including an accumulator 8 does.

Third Aspect of the Invention

Ninth Embodiment

A ninth embodiment of the present invention, which is directed to a third aspect of the present invention, where a degree of a super heating at the inlet of the compressor 1 is controlled, will be described.

Figure 26:
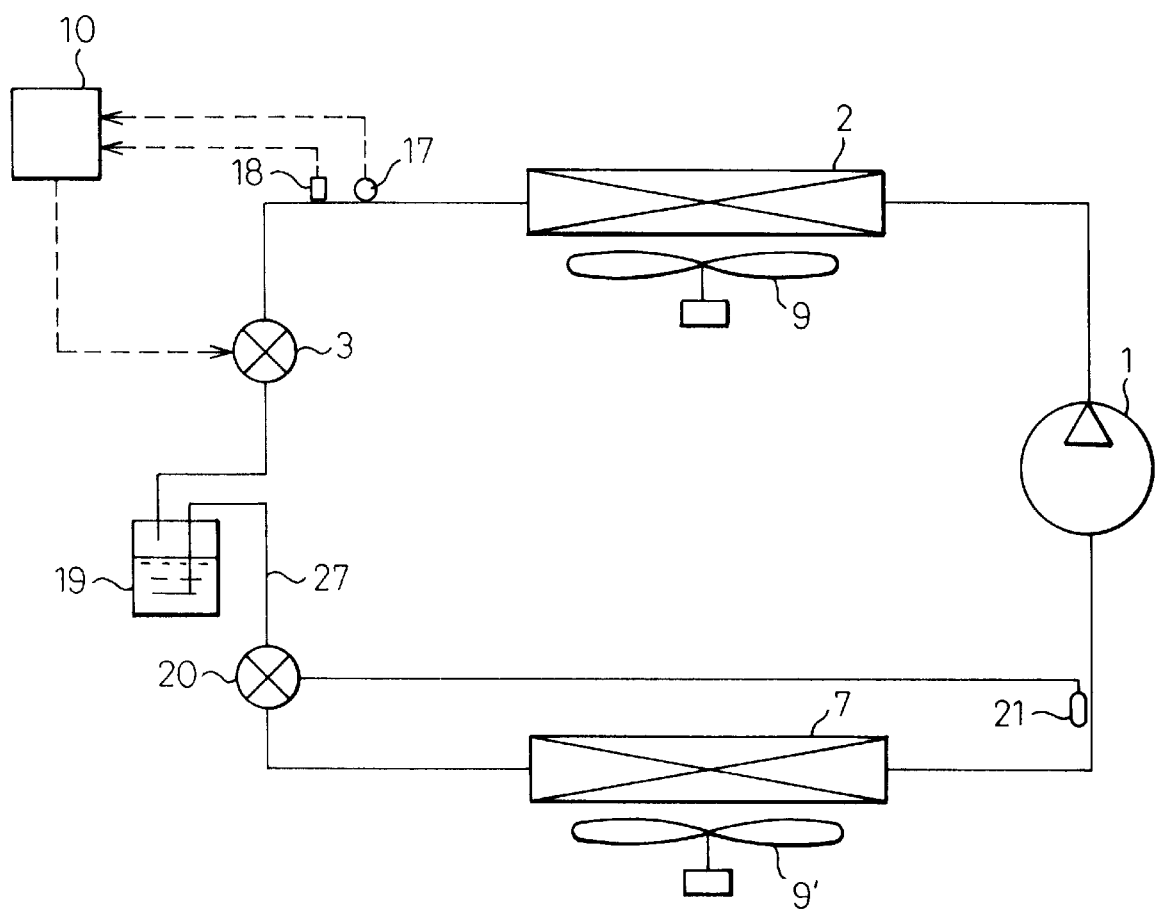
FIG. 26 shows a construction of the refrigerating system in a ninth embodiment.

FIG. 26 shows a construction of the refrigerating system using $CO_2$ in this embodiment, which is, basically, constructed by a compressor 1, a heat emitter 2, a first stage pressure reducer 3, a receiver 19, a second stage pressure reducer 20 and an evaporator 7. The pressure reducer 3 is of the same structure as that in FIG. 3 which is explained with reference to the first embodiment. The first stage pressure reducer 3 reduces the $CO_2$ issued from the heat emitter 2 and controls the pressure at the outlet of the heat emitter 2 in accordance with the temperature of the $CO_2$ at the outlet of the heat emitter 2.

As shown in FIG. 26, as in the first embodiment, at the outlet of the heat emitter 2, a temperature sensor 17 and a pressure sensor 18 are arranged. The control circuit 10 controls the degree of the opening of the first pressure reducer 3 in accordance with the temperature of $CO_2$ detected by the sensor 17, so that the pressure at the outlet of the heat emitter 2 is controlled along the optimum line $\eta_{max}$ in FIG. 1 as explained with reference to the first embodiment FIG. 1.

Figure 27:
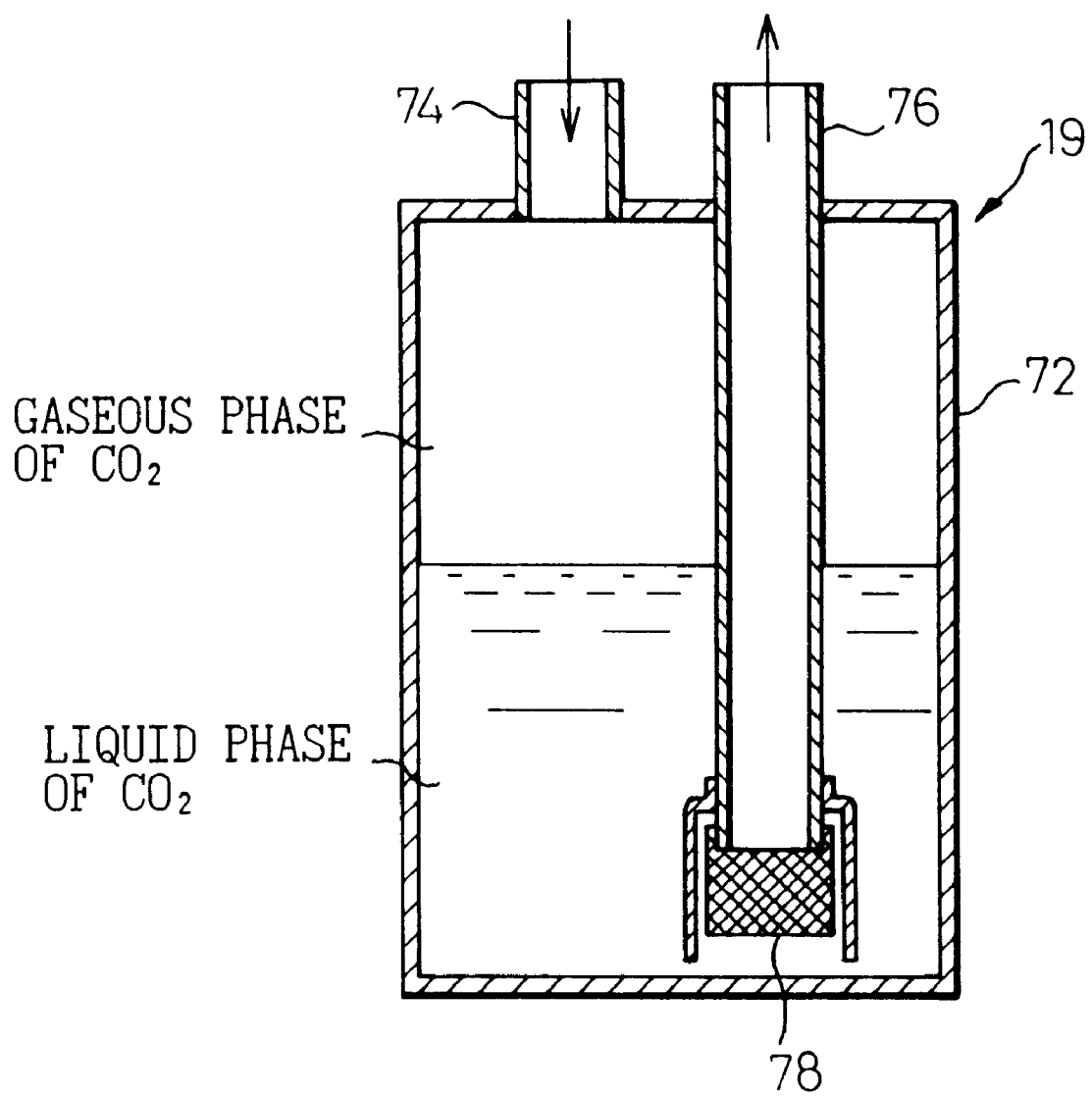
FIG. 27 shows a construction of an accumulator in FIG. 26.

In FIG. 26, similar to the third embodiment in FIG. 13, the receiver 19 is arranged between the first and second pressure reducers 3 and 20 and functions to execute a phase separation of the $CO_2$ issued from the pressure reducer 3 between the liquid phase and the gaseous phase. As shown in FIG. 27, the receiver 19 is constructed by a tank 72 for storing $CO_2$, an inlet pipe 74 connected to the outlet of the pressure reducer 3 and an outlet pipe 76 which is connected to the inlet of the second pressure reducer 20. In the vertical direction, the inlet pipe 74 is opened to the space inside the tank 72 at an upper part, where a gaseous phase of the $CO_2$ is located while the outlet pipe 76 is opened to the space inside the tank 72 at a lower part, where a liquid phase of $CO_2$ is located. In the tank 72, a strainer 78 is arranged so that the liquid state $CO_2$ in the tank is cleaned and is directed to the outlet pipe 76.

In FIG. 26, the additional pressure reducer 20 is for reducing the pressure of the $CO_2$ issuing from the receiver 19 and for controlling the mass flow rate of $CO_2$ in such a manner that the degree of super heating of $CO_2$ is controlled to a predetermined value at the inlet of the compressor 1. In a well known manner, a thermo-sensitive tube 21, in which $CO_2$ is sealingly stored at a predetermined density, is arranged at the inlet of the compressor 1 for detecting a change in the temperature of the $CO_2$. The construction of the additional pressure reducer 20 is of the similar structure which is used for as a temperature type expansion valve in a conventional vapor pressure compression type refrigerating system !R using flon. Furthermore, the degree of the opening of the additional pressure reducer 20 is controlled in accordance with the pressure of $CO_2$ in the thermo-sensitive tube 21.

Finally, compressor 1 is connected to a driving source such as an internal combustion engine or an electric motor. The heat emitter 2 is arranged at a front part of the vehicle so that a temperature difference as large as possible is obtained between the atmospheric air and the $CO_2$ in the heat emitter 2.

Figure 28:
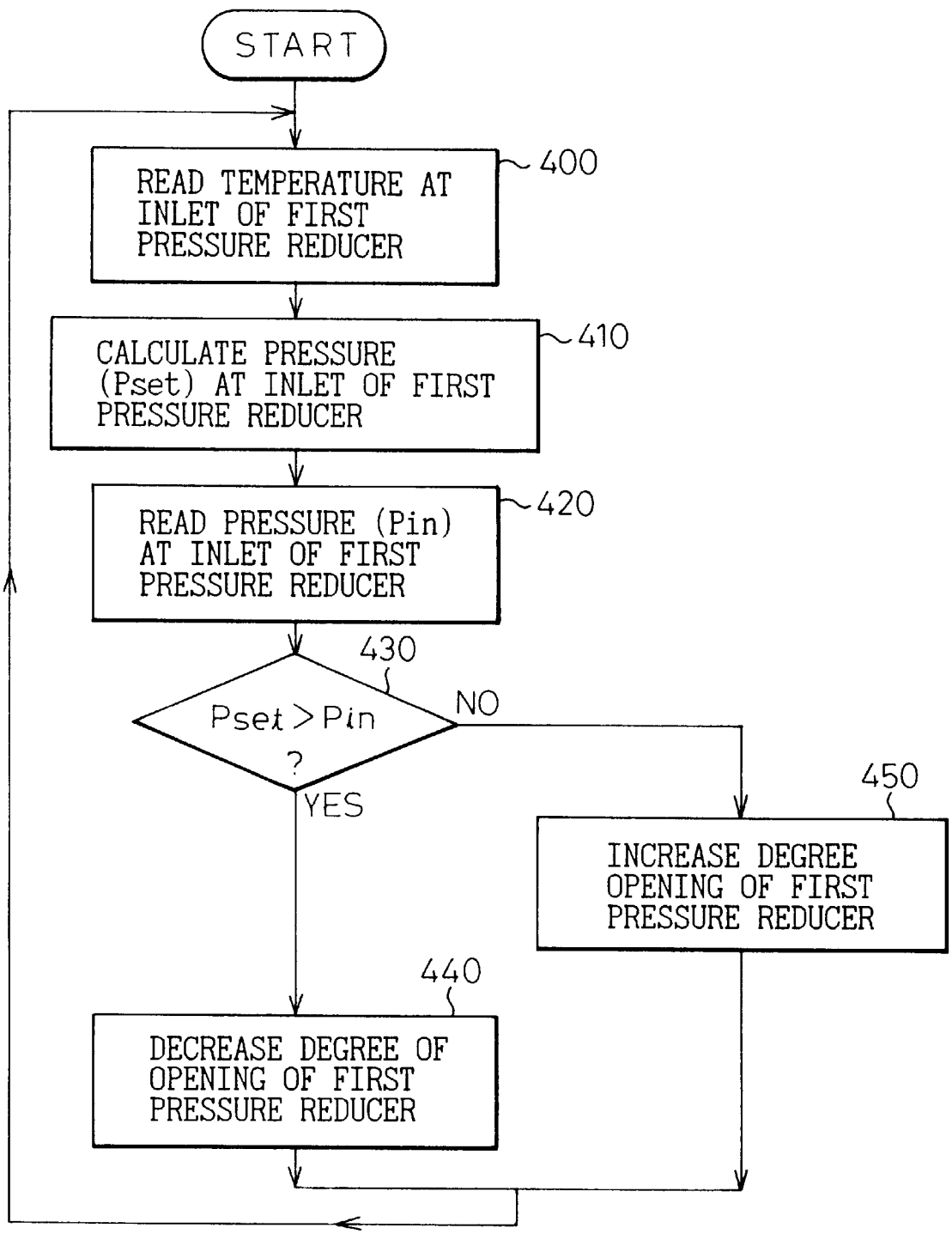
FIG. 28 is a flow chart illustrating an operation of the system in FIG. 26.

Now, an operation of the ninth embodiment will be explained with reference to the flow chart in FIG. 28. An energization of a start switch (not shown) for the refrigerating system causes the routine to commence. At step 400, the temperature of the $CO_2$ at the inlet of the pressure reducer 3 detected by the sensor 17 is read out, and at step 410, a calculation of a set pressure $P_{set}$ at the inlet of the pressure reducer 3 is done. Namely, a relationship between the temperature and the pressure at the inlet of the pressure reducer 3 as shown in FIG. 8 in the first embodiment is stored in ROM, and a map interpolation is done in order to obtain a value of $P_{set}$ which corresponds to the detected temperature at step 400.

At step 420 a pressure $P_{in}$ of the $CO_2$ at the inlet of the additional pressure reducer 20 is read out by the pressure sensor 18. Then, at step 430, a determination is done if the target pressure $P_{set}$ calculated at the step 410 is larger than the detected pressure Pin at the step 420. A result of determination that $P_{set} > P_{in}$ causes the routine to go to step 440, where the degree of the opening of the pressure reducer 3 is decreased. Contrary to this, a result of determination $P_{set} \leq P_{in}$ causes the routine to go to step 450 where the degree of the opening of the pressure reducer 3 is increased.

Due to the above control of the pressure reducer 3, the relationship between the temperature and the pressure of the $CO_2$ at the outlet of the heat emitter 2 is controlled along the optimum control line $\eta_{max}$ in FIG. 1. It should be noted that the pressure loss between the outlet of the heat emitter 2 and the inlet of the pressure reducer 3 is negligibly small. Thus, it is considered that the pressure of $CO_2$ at the inlet of the pressure reducer 3 is substantially identical with the pressure at the outlet of the heat emitter 2.

In the operation of the refrigerating system in the ninth embodiment in FIG. 26, in a situation of an increase in the thermal load at the evaporator 7 (increase in the room temperature), the control circuit 10 operates so that the degree of the opening of the main pressure reducer 3 is decreased for obtaining a target pressure at the inlet of the pressure reducer 3 as shown in FIG. 8. In other words, the pressure at the inlet of the pressure reducer 3 is correspondingly increased. On the other hand, due to the increase in the degree of the opening of the second stage pressure reducer 20, the pressure at the inlet of the compressor 1 is increased, so that the degree of the superheat at the inlet of the compressor 1 is controlled to a predetermined value, which is in a range between 5 to 10° C. As a result, an increase in the density of the $CO_2$ at the inlet of the compressor 1 is obtained as shown in FIG. 1, which allows the liquid state $CO_2$ stored in the receiver 19 to commence its recirculation. As a result, a mass flow of the $CO_2$ recirculated in the refrigerating system is increased, which causes, in cooperation with an increase in a difference in a specific enthalpy between the inlet and the outlet of the evaporator 7, an increase in the refrigerating capacity at the evaporator 7.

On the other hand, in a situation of a reduction in the thermal load at the evaporator 7 (decrease in the room temperature), the control circuit 10 operates so that the degree of the opening of the pressure reducer 3 is increased for obtaining a target pressure at the inlet of the pressure reducer 3, thereby decreasing the pressure at the inlet of the pressure reducer 3. Due to the decrease in the degree of the opening of the valve 3, the pressure at the inlet of the compressor 1 is decreased, so that the degree of the superheat at the inlet of the compressor 1 is controlled to the predetermined value. As a result, a decrease in the density of the $CO_2$ at the inlet of the compressor 1 is obtained as shown in FIG. 1, which causes the liquid state $CO_2$ to be stored in the receiver 19, thereby reducing a mass flow of the $CO_2$ recirculated in the refrigerating system, which causes, in cooperation with a decrease in a difference in a specific enthalpy between the inlet and the outlet of the evaporator 7, to decrease the refrigerating capacity at the evaporator 7.

In the above mentioned operation of the refrigerating system in the ninth embodiment, a relationship between the temperature and the pressure of the CO, at the outlet of the heat emitter 2 is controlled so that the refrigerating system operates along the optimum control line $\eta_{max}$, thereby maintaining an increased efficiency of the execution of the refrigerating cycle.

Furthermore, a predetermined value of the degree of the superheat of the $CO_2$ at the inlet of the compressor 1 is maintained by the operation of the additional pressure reducer 20, which prevents a liquid phase of the $CO_2$ from being sucked into the compressor, thereby preventing the compressor from being damaged.

Furthermore, according to the ninth embodiment, a sucking of the liquid phase of the $CO_2$ by the compressor 1 is prevented by above mentioned control of the degree of the superheat at the inlet of the compressor 1. Thus, similar to the third embodiment as already explained with reference to FIG. 13, an arrangement of an accumulator at the outlet of the evaporator 7 is eliminated as is the case in the prior art (Japanese Examined Patent Publication No. 7-18602). Thus, as also explained with reference to the third embodiment, a phase separation does not occur at the outlet of the evaporator 7, which allows sufficient lubricant to be sucked to the compressor 1 entrained with the high speed of flow of the gaseous state of the $CO_2$.

In short, according to the embodiment, a sucking of the liquid state $CO_2$, which would otherwise cause the compressor to be seized or damaged, is prevented, while maintaining a high efficiency of the execution of the $CO_2$ refrigerating cycle.

Tenth Embodiment

A tenth embodiment of the present invention will be explained with reference to FIG. 29. This embodiment is directed to the third aspect of the present invention but is modified in that a cooler for cooling the $CO_2$ issued from the heat emitter 2, as explained in the first aspect of the present invention, is used.

Figure 29:
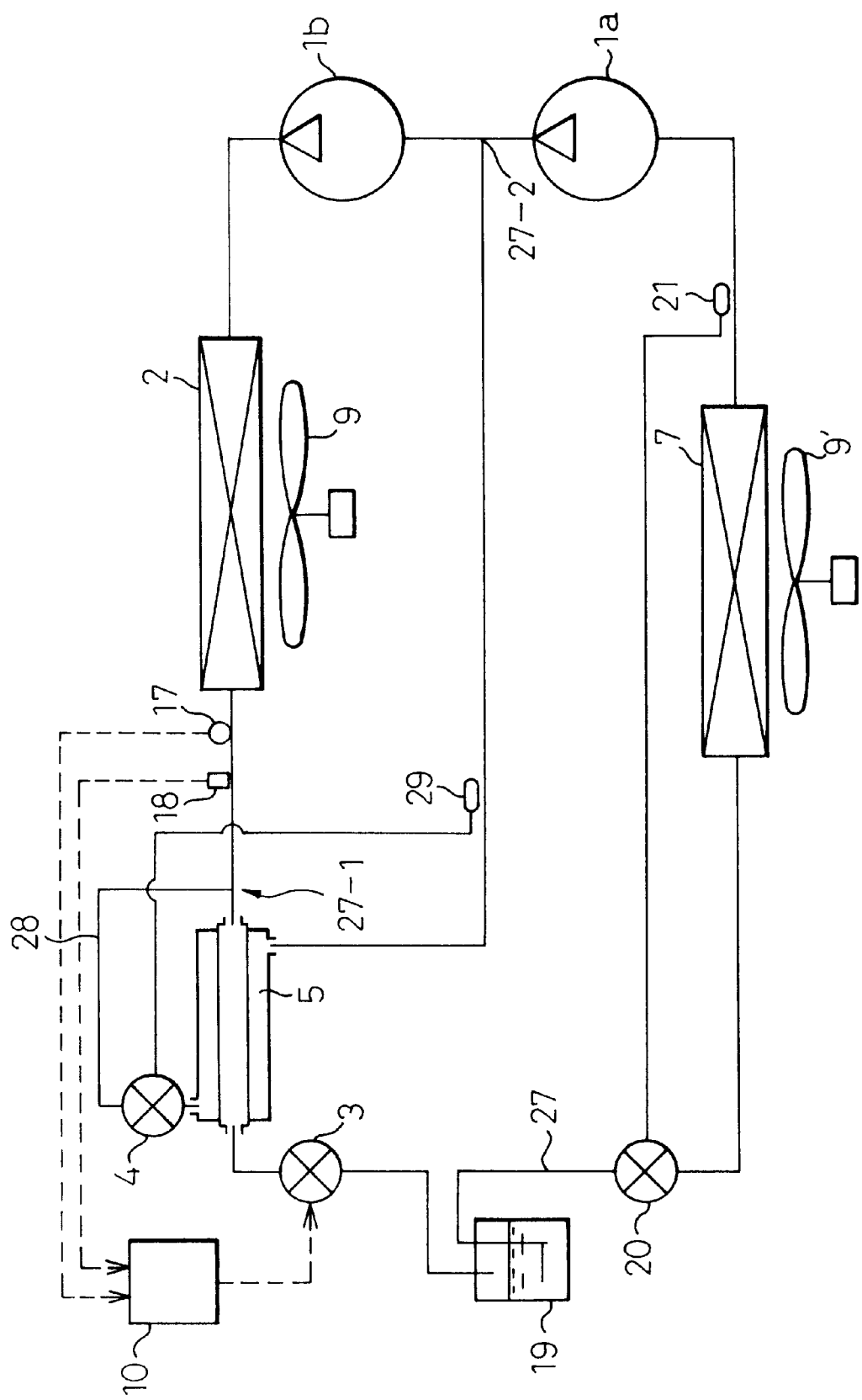
FIG. 29 shows a construction of the refrigerating system in a tenth embodiment.

In FIG. 29, in addition to the first stage pressure reducer 3 and the second stage pressure reducer 20 in the recirculating passageway 27, a sub-pressure reducer 4 is arranged on the sub recirculation passageway 28 branched from the main recirculation passageway 27 at a branch point 27-1. A cooler 5 is arranged in the sub recirculation passageway 28 at a location downstream from the pressure reducer 4.

In this embodiment, a first and a second compressors 1a and 1b which are arranged in series are arranged in the main recirculating passageway 27. The first stage compressor 1a compresses the refrigerant from a pressure at the evaporator 7 to an intermediate pressure in a range between about 6.0 to 6.6 MPa and the second stage compressor 1b compresses the refrigerant from the intermediate pressure to the pressure at the heat emitter 2. The sub recirculation passageway 28 is, at its downstream end, connected to the main recirculation passageway at a point 27-2 located between the compressors 1a and 1b. Thus, the $CO_2$ is subjected to a pressure reduction at the pressure reduction valve 4 and is injected to the inlet of the second stage compressor 1b. Similar to the thermo-sensitive tube 21 for the pressure reducer 20, a thermo-sensitive tube 29 is provided also for the pressure reducer 4, so that a degree of the opening of the pressure reducer 4 is controlled in accordance with the temperature at the inlet of the compressor 1b, so that the degree of the super heat at the inlet of the compressor 1b is controlled to a predetermined value, thereby preventing a liquid phase of the $CO_2$ from being sucked by the second stage pressure reducer 1b.

Construction of the cooler (heat exchanger) 5 is the same as shown in FIGS. 4 and 5. In the embodiment, the $CO_2$ issued from the heat emitter 2 is subjected to a cooling at the cooler 5, which reduces the specific enthalpy at the inlet of the main pressure reducer 3, thereby increasing a difference in the specific enthalpy between the inlet and the outlet of the evaporator 7, thereby increasing a refrigerating capacity.

In addition to this, similar to the ninth embodiment, a gas-liquid separator for separating a gaseous phase is unnecessary at the inlet of the compressor 1a, which allows a sufficient amount of the gaseous phase of the refrigerant to be fed to the compressor 1a at an increased flow speed. Furthermore, the pressure reducer 4 on the sub recirculation passageway reduces the pressure to the intermediate pressure and is injected to the inlet of the second stage compressor 1b. Thus, the second stage compressor 1b executes a compression work by the $CO_2$ under the intermediate pressure. As a result, a coefficient of performance of the $CO_2$ refrigerating cycle is increased.

In this embodiment, in place of using the compressors 1 and 2, which are in series connection, a single stage compressor 1, as shown in FIG. 2 in reference to the first embodiment of the present invention, can be used.

Eleventh Embodiment

In the description of the tenth embodiment, it is stated that the cooler may constructed as a double tube structure similar to the structure shown in FIGS. 4 and 5 as explained with reference to the first embodiment. In the eleventh embodiment shown in FIGS. 30 and 31, the cooler 5 is constructed as a double spiral structure having a first and second spiral shaped walls 80A and 80B forming a spiral shaped passageways 81A and 81B therebetween, and a top and bottom covers 82 and 84. The first spiral passageway 81A is for the $CO_2$ of a low pressure from the pressure reducer 4, i.e., the sub recirculating passageway 28. Namely, the pressure reducer 4, i.e., the sub recirculating passageway 28. Namely, $CO_2$ at a low temperature from the pressure reducer 4 is introduced into the passageway 81A at its central pipe 85A, flows in the spiral passageway 81A outwardly, is issued at an outer end 86A and is injected to the compression passageway in the compressor. Contrary to this, $CO_2$ at a high temperature direct from the heat emitter 2 is introduced into the passageway 81B at its outer end 86B, flows inwardly, in the spiral passageway 81A issues from the central pipe 85B and is directed to the main pressure reducer 3.

In short, in the eleventh embodiment, the low pressure $CO_2$ introduced from the center of the spiral shape flows outwardly while being subjected to heating. On the other hand, the high pressure $CO_2$ introduced from the outer end of the spiral shape flows inwardly while being subjected to cooling.

Figure 30:
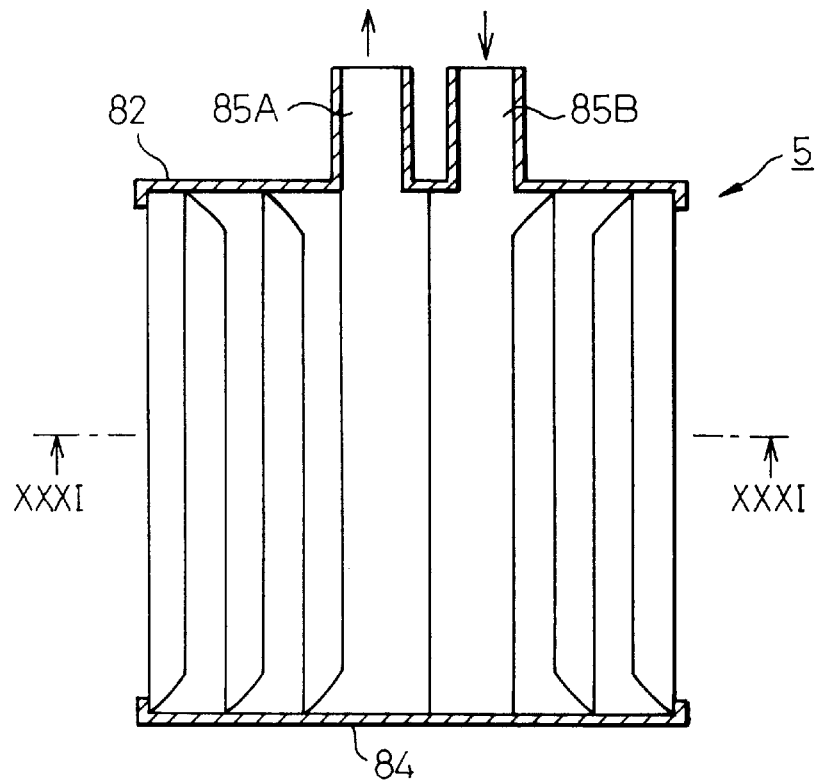
FIG. 30 is longitudinal cross sectional view of the cooler in eleventh embodiment.
Figure 31:
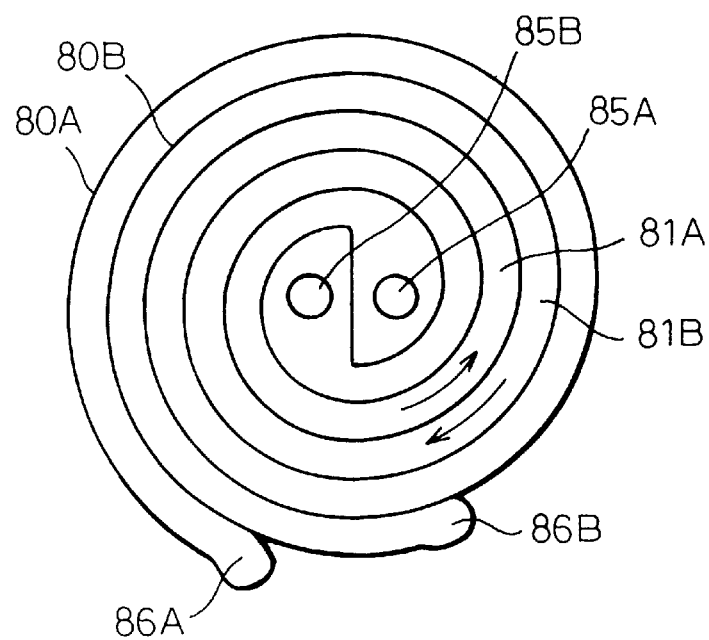
FIG. 31 is a transverse cross-sectional view of a cooler in FIG. 29, taken along line XXXI—XXXI in FIG. 30.
Figure 32:
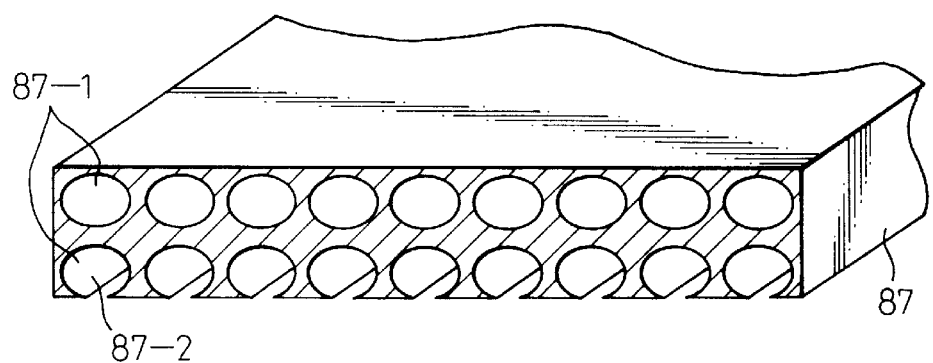
FIGS. 32 and 33 illustrate how the structure of the cooler in FIGS. 30 and 31 is produced.
Figure 33:
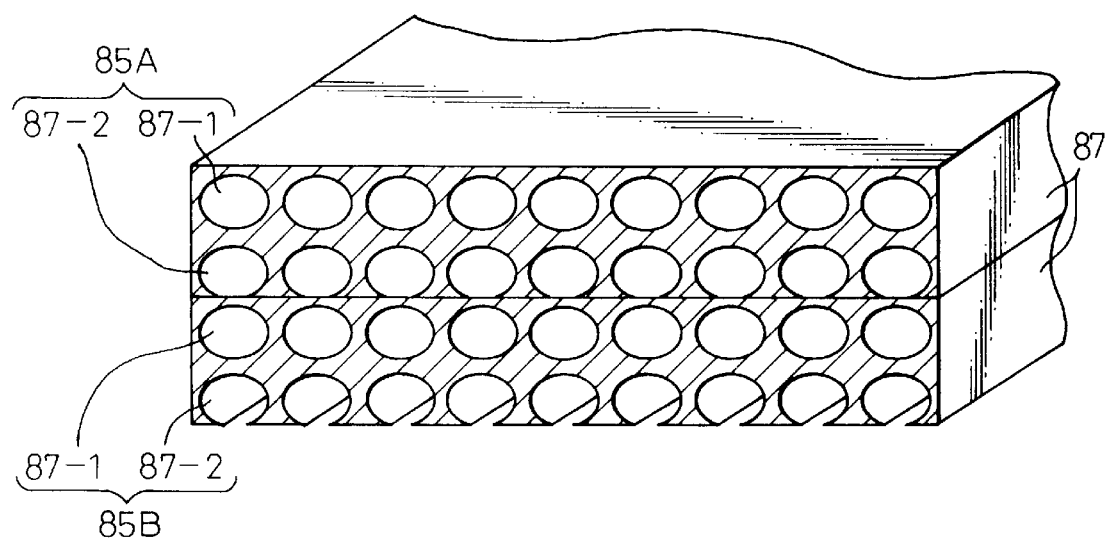

In this embodiment, in order to produce the double spiral structure in FIGS. 30 and 31, an extruded strip 87 of an aluminum having an upper row of holes 87-1 and a lower row of holes 87-2, each extending along the length of the strip therethrough, is prepared as shown in FIG. 32. Then, as shown in FIG. 33, two of such strips 87 are, under a side by side condition, soldered and are wound to a spiral shape. As a result, under a spirally wound condition, the holes 87-1 and 87-2 of the one of the strips 87 form the first spiral passageway 81A, while the holes 87-1 and 87-2 of the other strip 87 form the second spiral passageway 81B.

Twelfth Embodiment

Figure 34:
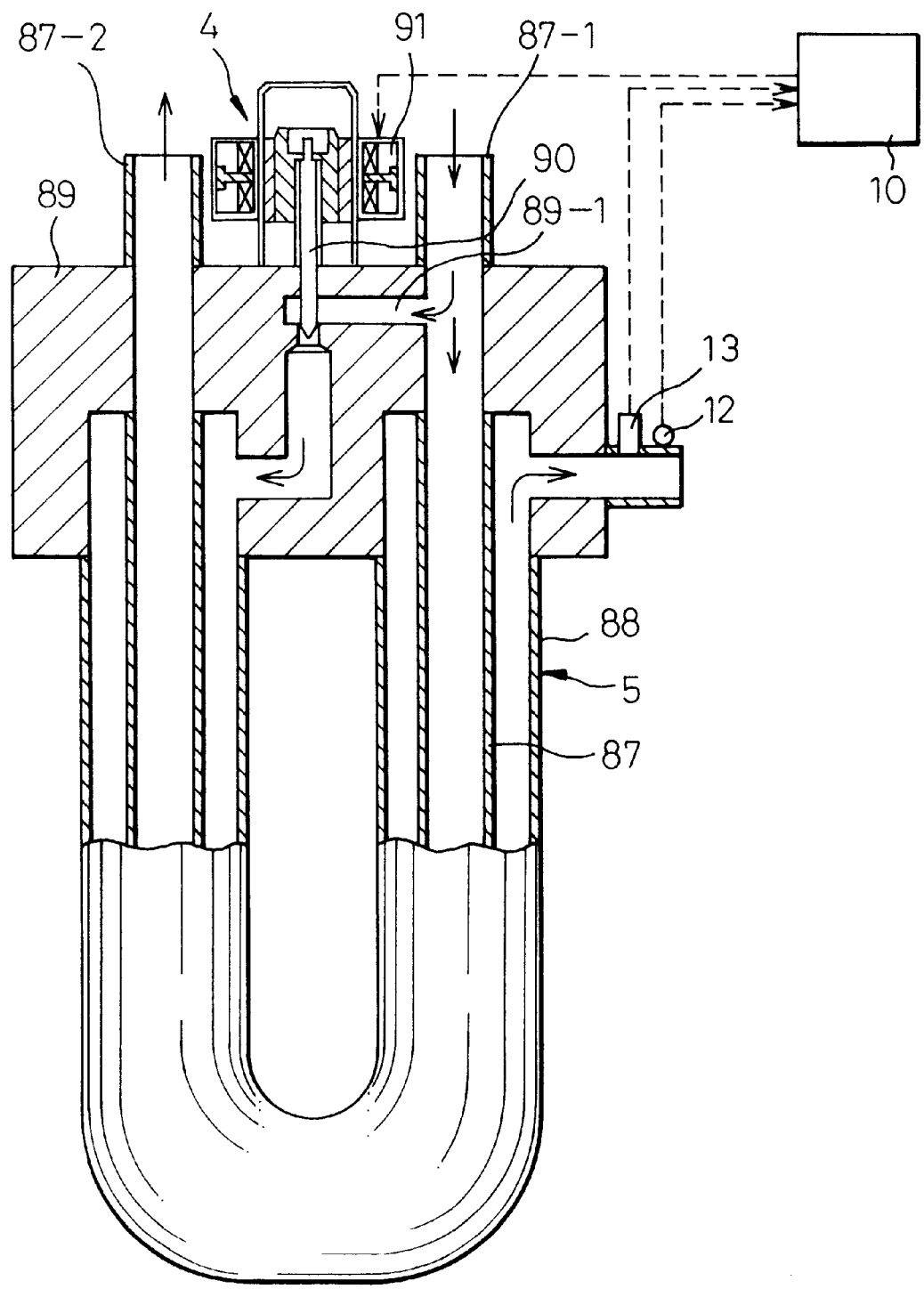
FIGS. 34 and 35 illustrate a cooler integrated with a pressure reducer in a twelfth and a thirteenth embodiments.

In the embodiment shown in FIG. 34, the sub-pressure reducer 4 and the cooler 11 are integrated. Namely, in this embodiment, the cooler 5 is constructed by an inner U-shaped pipe 87 and an outer U-shaped pipe 88 and a connection block 89 made of an aluminum material, to which ends of the pipes 87 and 88 are connected. The inner pipe 87 has a first end 87-1 connected to the heat emitter 2 in FIG. 29 for receiving the $CO_2$ and a second end 87-2 connected to the main pressure reducer 3 in FIG. 3 issuing the $CO_2$. As shown in FIG. 34, the end connection block 89 is formed with a passageway 89-1 diverting a part of the $CO_2$ in the main recirculation passageway (27 in FIG. 29) constructed by the inner pipe 87 to the sub recirculation passageway (28 in FIG. 29) constructed by the outer pipe 88. The pressure reducing valve 4 includes a valve member 90 located at the passageway 89-1 and a step motor 91 for controlling the position of the valve member 90. A temperature sensor 12 and a pressure sensor 13 are arranged at the outlet of the outer tube 88 in a similar way as that in FIG. 2. The detecting signals from the sensors 29 and 29' are supplied to the control circuit 10.

In the operation of the twelfth embodiment, based on the signals from the temperature sensor 12 and the co pressure sensor 13, the degree of super heat at the inlet of the second stage compressor 1b in FIG. 29 is in calculated. Control of the step motor 91 is done so that a position of the needle 90, i.e., a degree of the opening of the pressure reducing valve 4, is adjusted so that a predetermined value of the degree of a super heat of $CO_2$ is obtained at the inlet of the compressor 1b.

Thirteenth Embodiment

Figure 35:
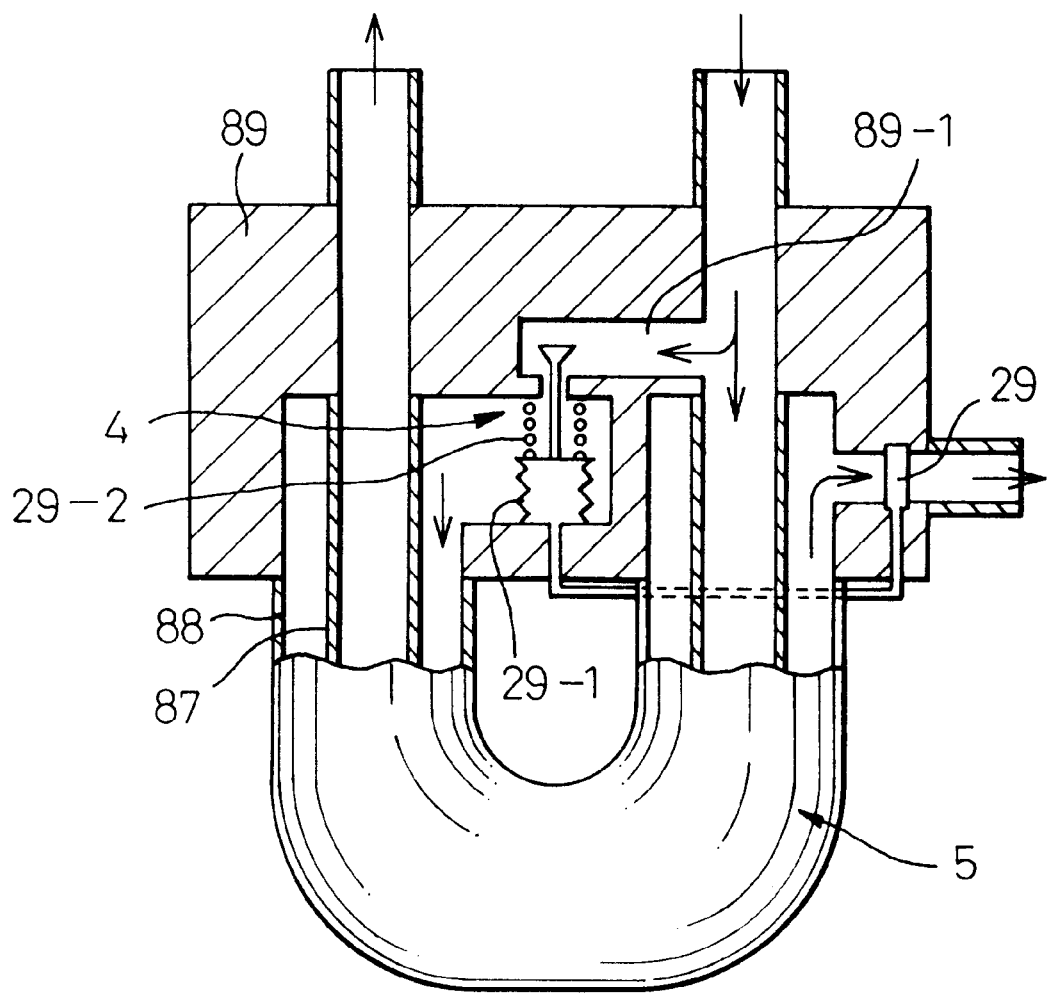

In a thirteenth embodiment shown in FIG. 35, the pressure reducer 4 having a mechanical thermo-sensitive tube 29 and the cooler 5 of a double tube type constructed by the inner and outer tubes 87 and 88 in FIG. 34 are integrated. The pressure sensitive tube 29 is opened to a bellows member 29-1 which is connected to the valve 4. Thus, in accordance with the pressure at the thermo-sensitive tube 29, the bellows member 29-1 is subjected to shrinkage or expansion against the force of the spring 29-2, thereby controlling the position of the valve 4, i.e., the degree of the opening of the valve 4.

The predetermined value of the super heat at the inlet of the compressor 1b in FIG. 29 is determined by the set force of the spring 29-2 which urges the valve 4 to take a closed position.

Fourteenth Embodiment

In this embodiment, the double tube type cooler 5 and the electrically controlled sub pressure reducer 4 in FIG. 34 are integrated with the electrically controlled main pressure reducer 4 controlled by the temperature sensor 17 and the pressure sensor 18 in FIG. 29.

Fifteenth Embodiment

Figure 37:
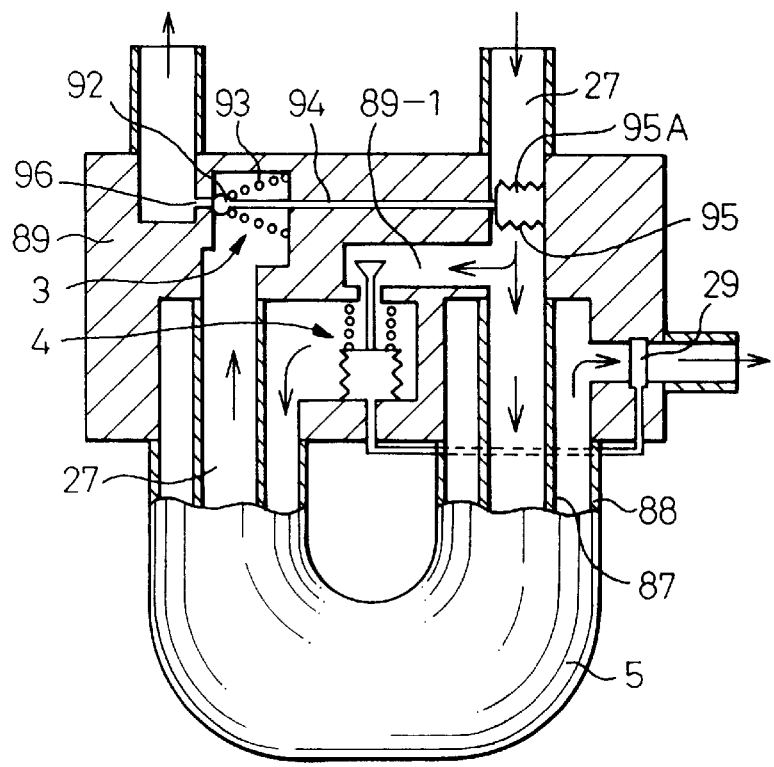
FIG. 37 illustrates a cooler integrated with a main and sub pressure reducer of mechanically operated type in a fifteenth embodiment.

FIG. 37 shows the double tube type cooler 5 and the mechanically operated sub-pressure reducer 4 in FIG. 37, to which the pressure reducer 3 of a mechanically operated type is integrated. The pressure reducer 3 is constructed by a valve member 92, a spring 93 urging the valve member 92 to take a closed position, a rod 94 extending from the valve member 92 and a bellows member 95 connected to the rod 94 and arranged in the main recirculating passageway at a location upstream from the passageway 89-1. In the valve member 92, a force due to the spring 93 and a force due to the pressure in the sealed space 95A of the bellows member 95 cause the valve member 92 to take a closed position to close a valve port 96. On the other hand, due to the pressure of the $CO_2$ at the recirculating passageway 27 a force is generated in the bellows member 95 to cause it to be contracted, i.e., the valve member 92 to be lifted. Thus, the lift of the valve member 92 is determined by the pressure difference between the sealed space 95A and the recirculating passageway 27.

In the space 95A inside the bellows, $CO_2$ is sealingly stored at a density of about 600 kg/m³ with respect to the inner volume of the space 95A when the valve 92 closes the valve port 96, while the initial set force of the spring is about 1 MPa. It is desirable that the sealing density of the $CO_2$ is in a range between the saturated liquid density when the temperature of the $CO_2$ is 0° C. to the saturated liquid density at the critical point of the $CO_2$ and is practically in a range between 450 to 950 kg/m³.

Now, an operation of the mechanical pressure reducer valve 3 in FIG. 37 will be explained. Since the $CO_2$ is sealingly stored in the closed space 95A at a density of about 600 kg/m³, the pressure and the temperature at the closed space 95A varies along the isobaric line of 600 kg/m³ in FIG. 1. Thus, when the temperature at the space 95A is, for example, 20° C., the pressure at the space 95A is about 5.8 MPa. Furthermore, in addition to the pressure at the space 95A, the force of the spring 93 acts on the valve member 92, which makes the total force applied to the valve member to be increased to, for example, about 6.8 MPa.

In view of the above construction, when the pressure at the heat emitter is 6.8 MPa or less, the valve co member 92 closes the valve port 96. Contrary to this, when the pressure at the heat emitter larger than 6.8 MPa, the valve member 92 opens the valve port 96.

In the similar manner, when the temperature at the space 95A is 40° C., the pressure at the space 95A is about 9.7 MPa, and thus, the total force applied to the valve member is about 10.7 MPa. Thus, when the pressure at the heat emitter is 10.7 MPa or less, the valve member 92 closes the valve port 96. Contrary to this, when the pressure at the heat emitter larger than 10.7 MPa, the valve member 92 opens the valve port 96.

As explained above, the isobaric line of 600 kg/m$^3$ substantially conforms to the optimum control line $\eta_{max}$ in FIG. 1. Thus, the operation of the pressure reducer 3 causes the pressure at the outlet of the heat emitter 2 to increase to the pressure located adjacent the optimum control line $\eta_{max}$, thereby allowing the refrigerating cycle using $CO_2$ to be operated at a high efficiency even at the super critical zone.

In the region below the critical point, the isobaric line of 600 kg/M$^3$ is spaced from the optimum control line $\eta_{max}$, and is moved into a condensing zone. Thus, the pressure inside the space 95A is moved along the saturated liquid line SL. Furthermore, a set force of the spring 93 causes the system to be operated in a condition of sub-cooling of about 10° C. Thus, even at a condition below the critical point, the $CO_2$ refrigerating cycle can be operated at a high efficiency.

Finally, this embodiment is advantageous in its simplicity of the structure that the space 95A inside the bellows member 95 sealingly stores the $CO_2$, resulting in a reduction of total number of parts of the system, thereby reducing a production cost, while allowing the pressure at the outlet of the heat emitter to be Co controlled along the optimum control line $\eta_{max}$.

Sixteenth Embodiment

Figure 38:
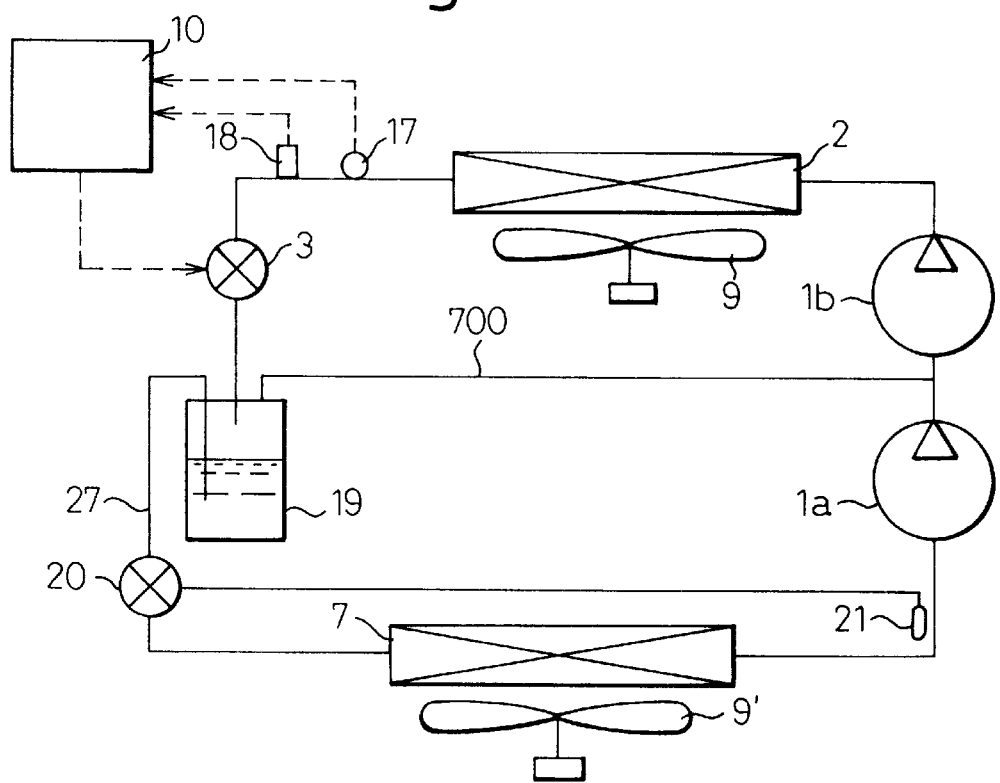
FIG. 38 shows a construction of the refrigerating system in a sixteenth embodiment.

In the embodiment shown in FIG. 38, a cooler 5 for cooling the gaseous $CO_2$ to be injected into the inlet of the second stage compressor 1b is eliminated. In order to execute the gas injection, a conduit 700 is provided, which has an upstream end opened to the space inside the receiver 19 above the liquid level of the $CO_2$ and a second end connected to the main recirculating passageway 27 at a location between the compressors 1a and 1b.

Figure 39:
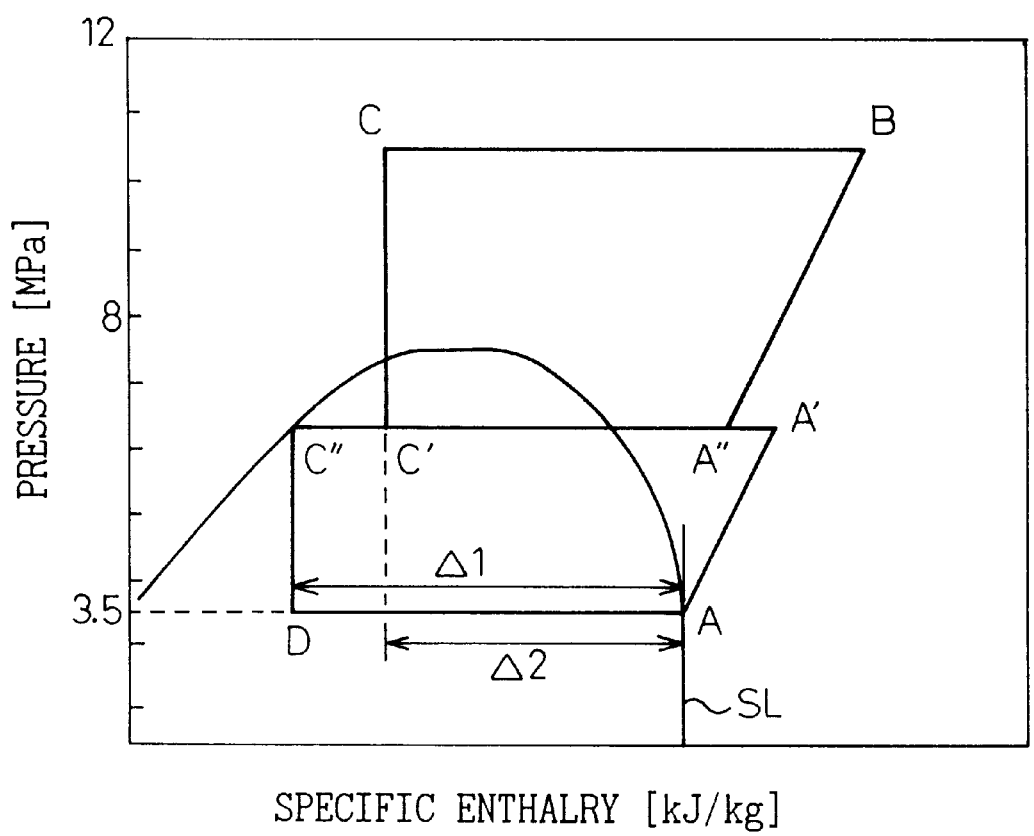
FIG. 39 is a Mollier chart in the system of FIG. 38.

In the construction of this embodiment, a liquid phase of the $CO_2$ of a value of specific enthalpy lower than that at the saturated liquid results in an increased difference of the specific enthalpy between the inlet and the outlet of the evaporator 7. Namely, in FIG. 39 showing a Mollier chart of this system, the line A–A' is a first stage compression by the compressor 1a, the line A"–B is a second stage compression by the compressor 1b, the line B–C is heat emission, the line C–C' is the first stage expansion by the pressure reducer 3, the line C–A" is a gas injection from the conduit 700, the line C'–C" is liquidation at the receiver 19, the line C"–D is a second stage expansion by the pressure reducer 20, the line D–A is evaporation at the evaporator 7. The difference of the specific enthalpy between the inlet and the outlet of the evaporator 7 is Δl, which is increased over that in the system in FIG. 29 expressed by Δ2.

Furthermore, in the system in FIG. 38, the gaseous stage $CO_2$ is injected to the second compressor 1b, resulting in a reduction in the compression work by the second stage compressor 1b.

In short, according to this embodiment, an increase in the difference in the specific enthalpy between the inlet and the outlet of the evaporator 7 is obtained, while preventing compression work from being increased in, the compressor 1b, thereby increasing a refrigerating co capacity by the execution of the $CO_2$ according to this embodiment. Therefore, an increase in the difference in the specific enthalpy between the inlet and the outlet of the evaporator 7 is obtained, while keeping a reduced compression work done by the compressor 1b, thereby increasing a refrigerating capacity as well as a coefficient of performance during the execution of the $CO_2$ refrigerating cycle.

In the operation of the system in FIG. 38, similar to the previous embodiments, the degree of the opening of the pressure reducer 3 is controlled by the controller 10 in accordance with the detected values of the temperature sensor 17 and the pressure sensor 18. The degree of the opening of the pressure reducer 20 is controlled in accordance with the pressure of the $CO_2$ sealingly stored in the thermo-sensitive tube 21.

Figure 40:
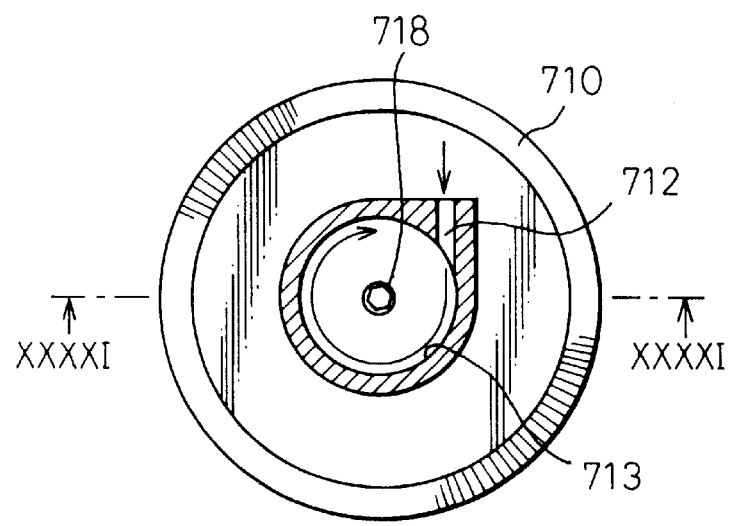
FIG. 40 is a transverse cross-sectional view of a separator in FIG. 38, taken along a line XXXX—XXXX in FIG. 41.
Figure 41:
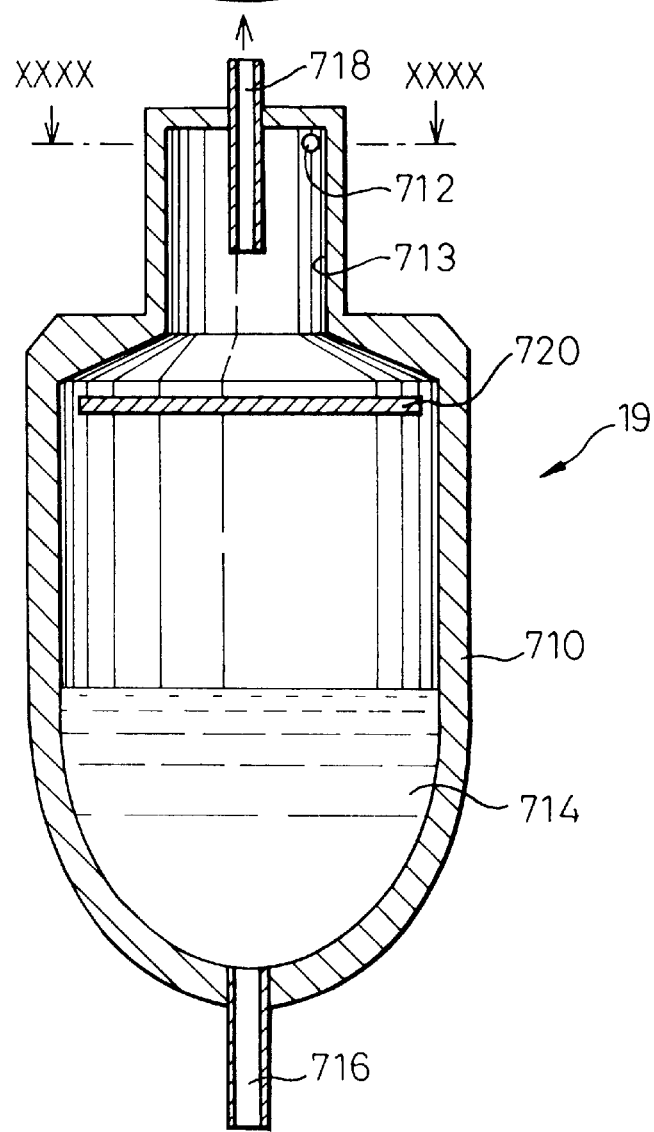
FIG. 41 is a longitudinal cross sectional view taken along line XXXXI—XXXXI in FIG. 40.

FIGS. 40 and 41 illustrate an actual structure of the receiver 19 in FIG. 38. The receiver 19 includes a container 710 having at its top a pipe 712 for connection with the outlet of the pressure reducer 3 for receiving the $CO_2$. The receiver 19 includes a container 710 having at its top a pipe 712 for connection with the outlet of the pressure reducer 3 for receiving the $CO_2$ therefrom. Namely, the gas-liquid combined state $CO_2$ from the inlet 712 is tangentially introduced into the container 710, so that the flow of $CO_2$ is rotated along an inner cylindrical wall 713 of the container 710. During the movement of the $CO_2$, the liquid phase of $CO_2$ has an increased density over the gaseous phase of $CO_2$. As a result, the liquid phase of the $CO_2$ is subjected to an increased centrifugal force over the gaseous phase of $CO_2$, so that the liquid phase of $CO_2$ is attached to the inner surface of the container 710, is moved downwardly thereon and is stored at the storage part 714. At the bottom of the container, a liquid outlet pipe 716 is provided, from where the liquid phase of the $CO_2$ is fed to the second stage pressure reducer 20 in FIG. 38. On the other hand, at the top of the container 710, a gas outlet pipe 718 is provided for discharging the gaseous $CO_2$ toward the injection pipe 700 in FIG. 38. In FIG. 41, a baffle plate 720 is arranged in the container 710 so that it extends horizontally at a position above the level of the liquid phase of the $CO_2$. The baffle plate 720 functions to prevent the liquid phase of $CO_2$, when subjected to an agitating force, from being directed to the inner wall 713.

Seventeenth Embodiment

Figure 36:
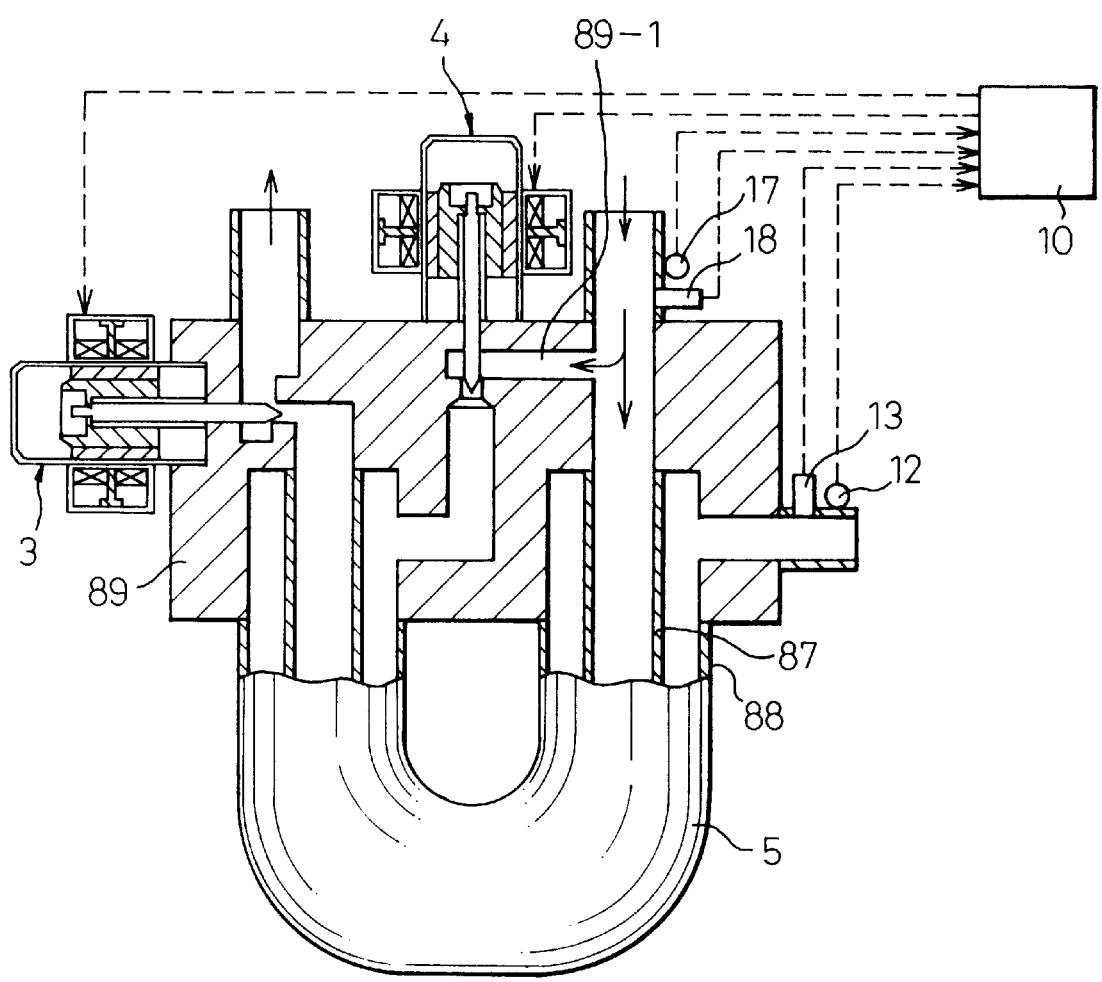
FIG. 36 illustrates a cooler integrated with a main rn and sub pressure reducers in a fourteenth embodiment.
Figure 42:
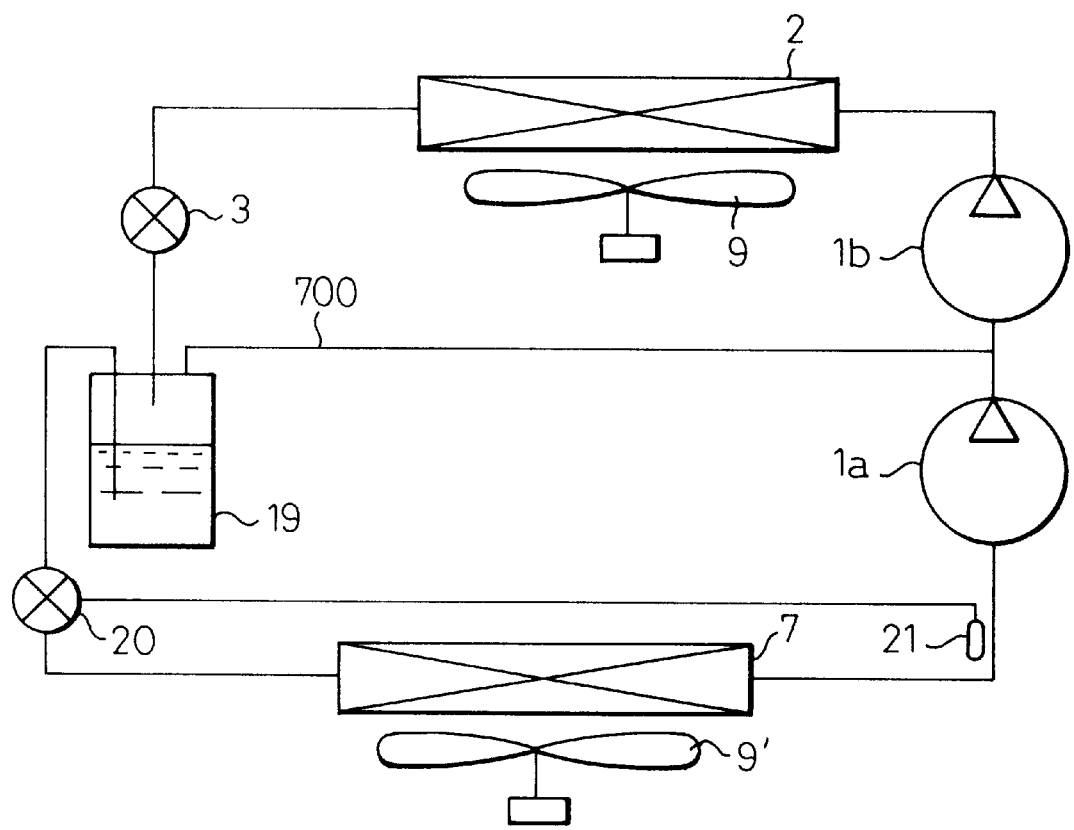
FIG. 42 shows a construction of the refrigerating system in a seventeenth embodiment.
Figure 43:
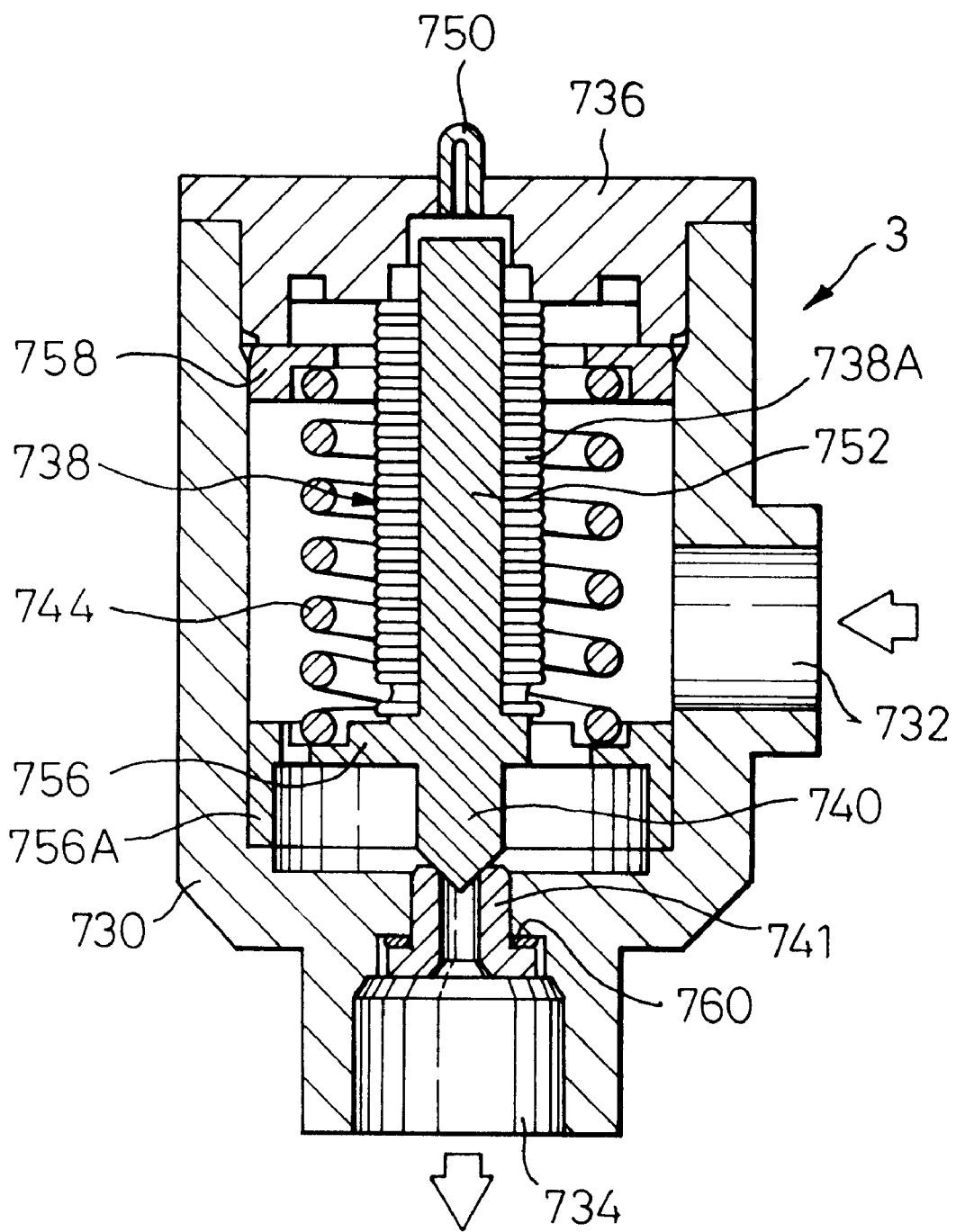
FIG. 43 is a longitudinal cross-sectional view of a pressure reducer in FIG. 42.

FIG. 42 shows a seventeenth embodiment, where the sixteenth embodiment in FIG. 36 is modified in that, similar to the embodiment in FIG. 37, a mechanical type first stage pressure reducer 3 is employed. FIG. 43 shows an actual construction of the mechanical pressure reducer 3. Namely, the pressure reducer 3 in this embodiment includes a casing 730 includes an inlet 732 connected to the heat emitter 2 and an outlet 734 connected to the receiver 19 and a top cover 736. A bellows member 738 and a valve member 740 are arranged in the casing 730. The bellows member 738 has a top end fixedly connected to the cover 736 and a bottom end connected to the valve member 740 faced with a valve port 741 in the casing 730. The bellows member 738 has a closed chamber 738A, in which the $CO_2$ is sealingly stored at the density of about 600 kg/M$^3$ with respect to the volume of the space 738A under the closed condition of the valve port 741 by the valve member 740. A spring 744 urges the valve member 740 downwardly so that a force for closing the valve port 741, corresponding to a pressure of 1 MPa, is generated.

A cap 750 is provided at the top cover 736 for obtaining the sealed condition of the chamber 738A inside the bellows member 738. After the introduction of the $CO_2$, the cap 750 is sealingly connected to the cover 736 by means of welding or soldering.

A stopper rod 752 is integrally formed with the valve member 740 and is faced with the top cover 736 at a distance with respect thereto. A lifting movement of the valve member 740 finally causes the stopper 752 to contact the cover 736, thereby limiting a upward displacement of the valve member 740, i.e., the maximum degree of the opening of the valve port 741. This stopper construction also serves to prevent the bellows from being excessively deformed, thereby preventing its durability from being reduced.

The spring 744 is at the bottom end engaged with a support plate 756 which is integral with the valve member 740 and is at the top end contacted with a spring seat plate 758. The thickness of the spring seat plate 758 is such that a desired spring set force is generated for causing the valve member 740 to move downwardly.

Furthermore, a spacer 760 is arranged between the valve port member 741 and the casing 730, which allows the position of the valve port member 741, with respect to the bellows member 738, to be varied in accordance with the thickness of the spacer 760. As a result, a variation in the length between different bellows members 738 is absorbed by a selection of a suitable thickness of the spacer 760, thereby keeping a predetermined opening characteristic of the pressure reducer valve 3 irrespective of a tolerance.

Finally, the supporting member 756 is formed with a guide part 756A, which is slidably inserted to the casing 730, thereby obtaining a smooth vertical movement of the valve member 740.

Eighteenth Embodiment

In the above embodiments, the second stage pressure co reducer 3 is the one which is mechanically operated by the thermo-sensitive tube 31. FIG. 44 shows a modification, where the second stage pressure reducer valve 20 is the one which is electrically operated by electric signals from the sensor 782 for detecting the temperature of the $CO_2$ at the outlet of the evaporator 7 and the sensor 784 for detecting the pressure of the $CO_2$. The control circuit 10 operates so that a desired degree of the super heat is obtained at the inlet of the compressor 1.

In the embodiments the degree of the opening of the second pressure reducer 20 is controlled by the mechanical thermo-tube 21. However, the pressure reducer 20 may be controlled electrically similar to the first pressure reducer 3 by using a temperature sensor and pressure sensor arranged at the inlet of the compressor 1 and connected to a controller 10.

In case of the pressure reducer 3, the pressure sensor 18 may be arranged at the inlet of the heat emitter 2 in place of arranging it at the outlet of the heat emitter 2. However, in this case, a situation may occur that a compensation of the pressure loss across the heat emitter 2 is necessary.

Finally, in the third aspect of the invention, when a second electrically operated pressure reducer 20 is used, the pressure sensor is arranged at the inlet of the evaporator if compensation of the pressure loss across the evaporator 7 is done by the control circuit 10.

In the present invention, the application is not necessarily limited to the refrigerating system using carbon dioxide. The present invention can be used for a refrigerating system operated at in super critical area using a refrigerant such as ethylene, ethane, and nitrogen oxide.

What is claimed is:

1. A refrigerating system comprising:

a compressor for compressing the refrigerant;

a heat emitter for cooling the refrigerant compressed at the compressor, the pressure in the heat emitter being higher than a critical pressure of the refrigerant;

a pressure reducing means for reducing the pressure of the refrigerant from the heat emitter;

an evaporator for evaporating the refrigerant from the pressure reducing means;

means for operating said pressure reducing means such that the temperature and the pressure of the refrigerant at an outlet of the heat emitter are controlled along the optimum control line to maximize a coefficient of performance $COP=_\Delta i/_\Delta L$ of the refrigerating cycle, and;

means, in relation to said pressure reducing means, for additionally controlling a condition of the refrigerant, thereby obtaining a desired operation of the refrigerating system, comprising:

an additional pressure reducing means arranged downstream from said pressure reducer, and;

means for controlling the additional pressure reducing means for controlling a degree of a super heat at the inlet of the compressor.

2. A system according to claim 1, wherein said additional controlling means comprise:

a branching means for diverting, from a first flow of the refrigerant directed to the first pressure reducing means, a second flow of the refrigerant which is injected to the compressor, and;

a cooler for obtaining a heat exchange between said first and second flows for cooling the first flow of the refrigerant directed to the pressure reducing means.

3. A system according to claim 1, wherein said additional controlling means comprise:

means for detecting a predetermined condition of the refrigerating system where a thermal load of the system is high, and;

means for modifying the operation of the pressure reducing means when said predetermined condition is detected, thereby obtaining a desired refrigerating capacity.

4. A refrigerating system comprising:

a compressor for compressing the refrigerant;

a heat emitter for cooling the refrigerant compressed at the compressor, the pressure in the heat emitter being higher than a critical pressure of the refrigerant;

a first pressure reducer for reducing the pressure of the refrigerant from the heat emitter, the first pressure reducer being for controlling the pressure at the outlet of the heat emitter in accordance with the temperature of the refrigerant at the outlet of the heat emitter;

a separating means for separating the refrigerant issued from the first pressure reducer between a gaseous phase and a liquid phase;

a second pressure reducer for reducing the pressure from the separating means, the second pressure reducer being for controlling the flow amount of the refrigerant in such a manner that a degree of a super heat at the inlet of the compressor is controlled to a predetermined value, and;

an evaporator for evaporating the refrigerant from the second pressure reducer.

5. A refrigerating system according to claim 4, further comprising a conduit for introducing, into the compressor, a gaseous phase of the refrigerant separated at the separating means at a pressure between a pressure inside the heat emitter and a pressure at the evaporator.

6. A refrigerating system according to claim 4, further comprising:

a branching conduit for diverting, from a first flow of the refrigerant directed from the heat emitter to the first pressure reducer, a second flow of the refrigerant which is reintroduced into the system;

a third pressure reducer for reducing the pressure of the second flow of the refrigerant, and;

a heat exchanger for obtaining a heat exchange between the first flow of the refrigerant directed to the first pressure reducer and the second flow, after being subjected to a pressure reduction by the third pressure reducer, thereby cooling the first flow of the refrigerant.

7. A refrigerating system according to claim 4, further comprising a conduit for introducing, into the compressor, a gaseous phase of the refrigerant separated at the separator at a pressure between a pressure inside the heat emitter and a pressure at the evaporator.

8. A refrigerating system according to claim 4, further comprising:

a branching means for diverting, from a first flow of the refrigerant directed from the heat emitter to the first pressure reducer, a second flow of the refrigerant which is re-introduced into the system;

a third pressure reducer for reducing the pressure of the second flow of the refrigerant, and;

a cooling means for obtaining a heat exchange between the first flow of the refrigerant directed to the first pressure reducer and the second flow, after being subjected to a pressure reduction by the third pressure reducer, thereby cooling the first flow of the refrigerant.

9. A refrigerating system according to claim 8, wherein said cooling means is integrated with at least one of the first, second and third pressure reducers.

10. A refrigerating system according to claim 8, wherein said heat exchanger is integrated with at least one of the first, second and third pressure reducers.

11. A refrigerating system comprising:

a compressor for compressing the refrigerant;

a heat emitter for cooling the refrigerant compressed at the compressor, the pressure in the heat emitter being higher than a critical pressure of the refrigerant;

an adjustable pressure reduction valve for reducing the pressure of the refrigerant from the heat emitter;

an evaporator for evaporating the refrigerant from the pressure reduction valve;

a microprocessor for operating said pressure reduction valve such that the temperature and the pressure of the refrigerant at an outlet of the heat emitter are controlled along the optimum control line to maximize a coefficient of performance $COP=_\Delta i/_\Delta L$ of the refrigerating cycle, and;

an additional refrigerant control system for additionally controlling a condition of the refrigerant, thereby obtaining a desired operation of the refrigerating system, comprising:

an additional adjustable pressure reduction valve arranged downstream from said pressure reduction valve, and;

a microprocessor for controlling the additional pressure reduction valve for controlling a degree of a super heat at the inlet of the compressor.

12. A refrigerating system as in claim 11, wherein the microprocessor for operating the pressure reduction valve and the microprocessor for controlling the additional pressure reduction valve are the same microprocessor.

13. A refrigerating system comprising:

a compressor for compressing the refrigerant;

a heat emitter for cooling the refrigerant compressed at the compressor, the pressure in the heat emitter being higher than a critical pressure of the refrigerant;

a first pressure reducer for reducing the pressure of the refrigerant from the heat emitter, the first pressure reducer being for controlling the pressure at the outlet of the heat emitter in accordance with the temperature of the refrigerant at the outlet of the heat emitter;

a refrigerant gas/liquid separator for separating the refrigerant issued from the first pressure reducer between a gaseous phase and a liquid phase;

a second pressure reducer for reducing the pressure from the separator, the second pressure reducer being for controlling the flow amount of the refrigerant in such a manner that a degree of a super heat at the inlet of the compressor is controlled to a predetermined value, and;

an evaporator for evaporating the refrigerant from the second pressure reducer.

* * * * *